(12) United States Patent
Tanaka et al.

(10) Patent No.: US 7,589,715 B2
(45) Date of Patent: Sep. 15, 2009

(54) COORDINATE INPUT APPARATUS, CONTROL METHOD THEREOF, AND PROGRAM

(75) Inventors: Atsushi Tanaka, Fuchu (JP); Hajime Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 11/401,372

(22) Filed: Apr. 11, 2006

(65) Prior Publication Data
US 2006/0232568 A1 Oct. 19, 2006

(30) Foreign Application Priority Data
Apr. 15, 2005 (JP) .............................. 2005-118981

(51) Int. Cl.
*G06F 3/042* (2006.01)
(52) U.S. Cl. ....................................... 345/175; 345/174
(58) Field of Classification Search ......... 345/173–179; 178/18.01–18.09, 19.01–19.07, 20.01–20.04
See application file for complete search history.

(56) References Cited

U.S. PATENT DOCUMENTS

| | | | |
|---|---|---|---|
| 4,507,557 A | 3/1985 | Tsikos | ......................... 250/341 |
| 4,613,964 A | 9/1986 | Ichikawa et al. | |
| 4,886,943 A | 12/1989 | Suzuki et al. | |
| 4,897,510 A | 1/1990 | Tanaka et al. | |
| 4,931,965 A | 6/1990 | Kaneko et al. | |
| 5,017,913 A | 5/1991 | Kaneko et al. | |
| 5,070,325 A | 12/1991 | Tanaka et al. | |
| 5,097,102 A | 3/1992 | Yoshimura et al. | |
| 5,097,415 A | 3/1992 | Yoshimura et al. | |
| 5,142,106 A | 8/1992 | Yoshimura et al. | |
| 5,210,785 A | 5/1993 | Sato et al. | |
| 5,231,394 A | 7/1993 | Sato | |
| 5,239,138 A | 8/1993 | Kobayashi et al. | |
| 5,500,492 A | 3/1996 | Kobayashi et al. | |
| 5,517,553 A | 5/1996 | Sato | |
| 5,539,678 A | 7/1996 | Tanaka et al. | |
| 5,565,893 A | 10/1996 | Sato et al. | |
| 5,621,300 A | 4/1997 | Sato et al. | |
| 5,714,698 A | 2/1998 | Tokioka et al. | |
| 5,724,647 A | 3/1998 | Sato | |
| 5,726,686 A | 3/1998 | Taniishi et al. | |
| 5,736,979 A | 4/1998 | Kobayashi et al. | |
| 5,751,133 A | 5/1998 | Sato et al. | |
| 5,805,147 A | 9/1998 | Tokioka et al. | |
| 5,818,429 A | 10/1998 | Tanaka et al. | |

(Continued)

FOREIGN PATENT DOCUMENTS

JP 2896183 5/1999

(Continued)

*Primary Examiner*—Vijay Shankar
(74) *Attorney, Agent, or Firm*—Fitzpatrick, Cella, Harper & Scinto

(57) ABSTRACT

A signal change range generated by a pointing operation of a pointer on a coordinate input region is specified in correspondence with the initial detection signal distribution of a detection unit in an initial state without pointing on the coordinate input region. Pieces of end information of the specified signal change range are detected. The validity of a detection state in the end information detection step is determined by using the plurality of pieces of detected end information. On the basis of the determination result, the coordinates of the point position of the pointer are calculated from the plurality of pieces of end information.

16 Claims, 39 Drawing Sheets

U.S. PATENT DOCUMENTS

| | | | |
|---|---|---|---|
| 5,831,603 A | 11/1998 | Yoshimura et al. | |
| 5,933,149 A | 8/1999 | Mori et al. | |
| 5,936,207 A | 8/1999 | Kobayashi et al. | |
| 6,415,240 B1 | 7/2002 | Kobayashi et al. | |
| 6,429,856 B1 | 8/2002 | Omura et al. | 346/175 |
| 6,570,103 B1 | 5/2003 | Saka et al. | 178/18.01 |
| 6,862,019 B2 | 3/2005 | Kobayashi et al. | |
| 6,965,377 B2 | 11/2005 | Yanagisawa et al. | |
| 6,965,378 B2 | 11/2005 | Tanaka | |
| 7,015,894 B2 * | 3/2006 | Morohoshi | 345/156 |
| 7,075,514 B2 | 7/2006 | Tanaka | |
| 7,075,524 B2 | 7/2006 | Kobayashi et al. | |
| 7,443,387 B2 | 10/2008 | Tanaka et al. | 345/173 |
| 2003/0071858 A1 * | 4/2003 | Morohoshi | 345/856 |
| 2005/0041013 A1 | 2/2005 | Tanaka | |
| 2006/0202973 A1 | 9/2006 | Kobayashi et al. | |
| 2006/0232568 A1 | 10/2006 | Tanaka et al. | |

FOREIGN PATENT DOCUMENTS

| | | |
|---|---|---|
| JP | 2000-105671 | 4/2000 |
| JP | 2001-142642 | 5/2001 |
| JP | 2002-055770 | 2/2002 |
| JP | 2003-303046 | 10/2003 |
| JP | 2004-069483 | 3/2004 |
| JP | 2005-258811 | 9/2005 |

* cited by examiner

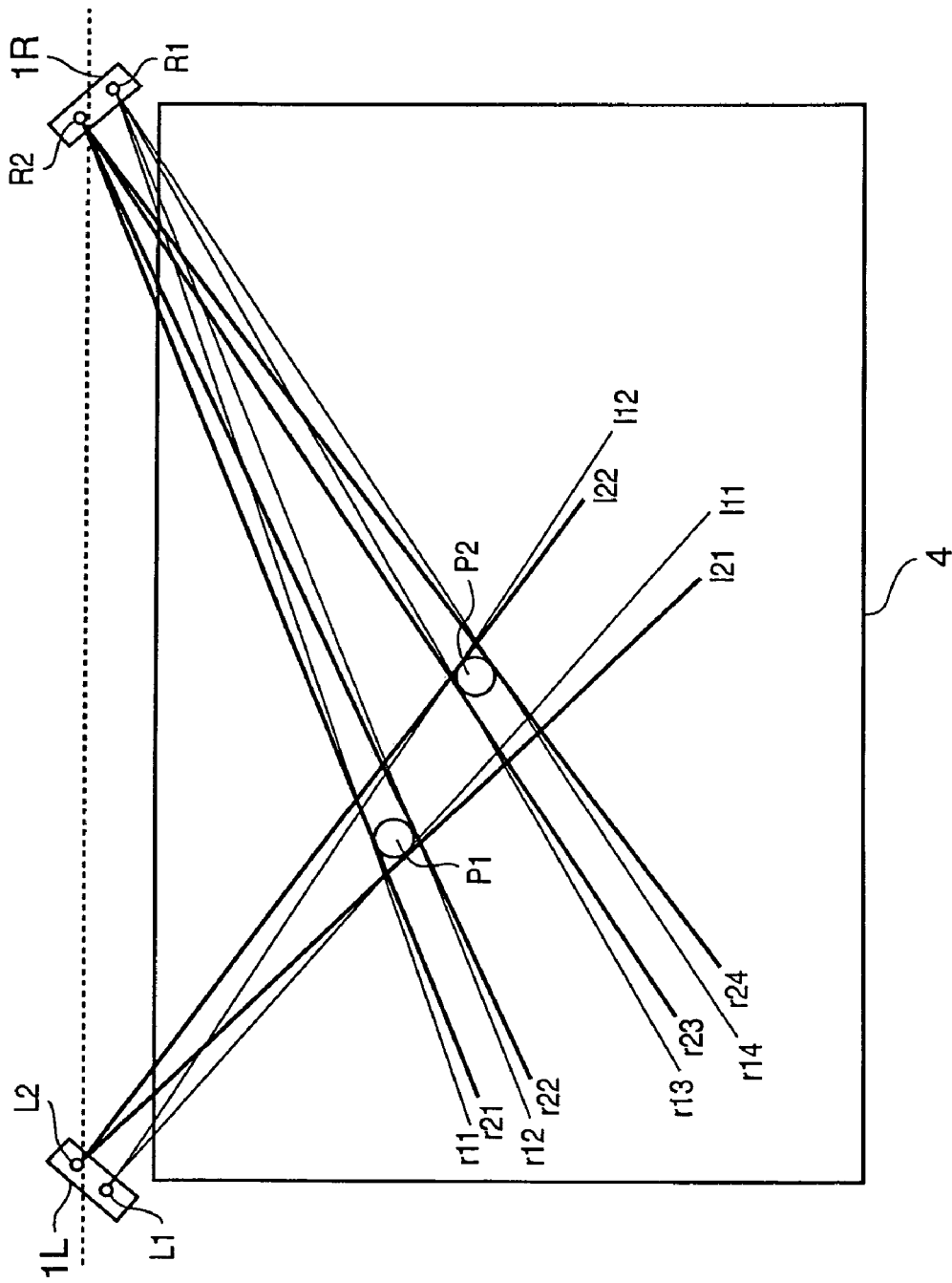

FIG. 20

|  | L1 | L2 | R1 | R2 |
|---|---|---|---|---|
| NO INPUT | 0 | 0 | 0 | 0 |
| SINGLE POINT INPUT | 1 | 1 | 1 | 1 |
| MULTIPLE POINT INPUT | 1 | 1 | 1 | 2 |
|  | 1 | 1 | 2 | 1 |
|  | 1 | 1 | 2 | 2 |
|  | 1 | 2 | 1 | 1 |
|  | 1 | 2 | 1 | 2 |
|  | 1 | 2 | 2 | 1 |
|  | 1 | 2 | 2 | 2 |
|  | 2 | 1 | 1 | 1 |
|  | 2 | 1 | 1 | 2 |
|  | 2 | 1 | 2 | 1 |
|  | 2 | 1 | 2 | 2 |
|  | 2 | 2 | 1 | 1 |
|  | 2 | 2 | 1 | 2 |
|  | 2 | 2 | 2 | 1 |
|  | 2 | 2 | 2 | 2 |

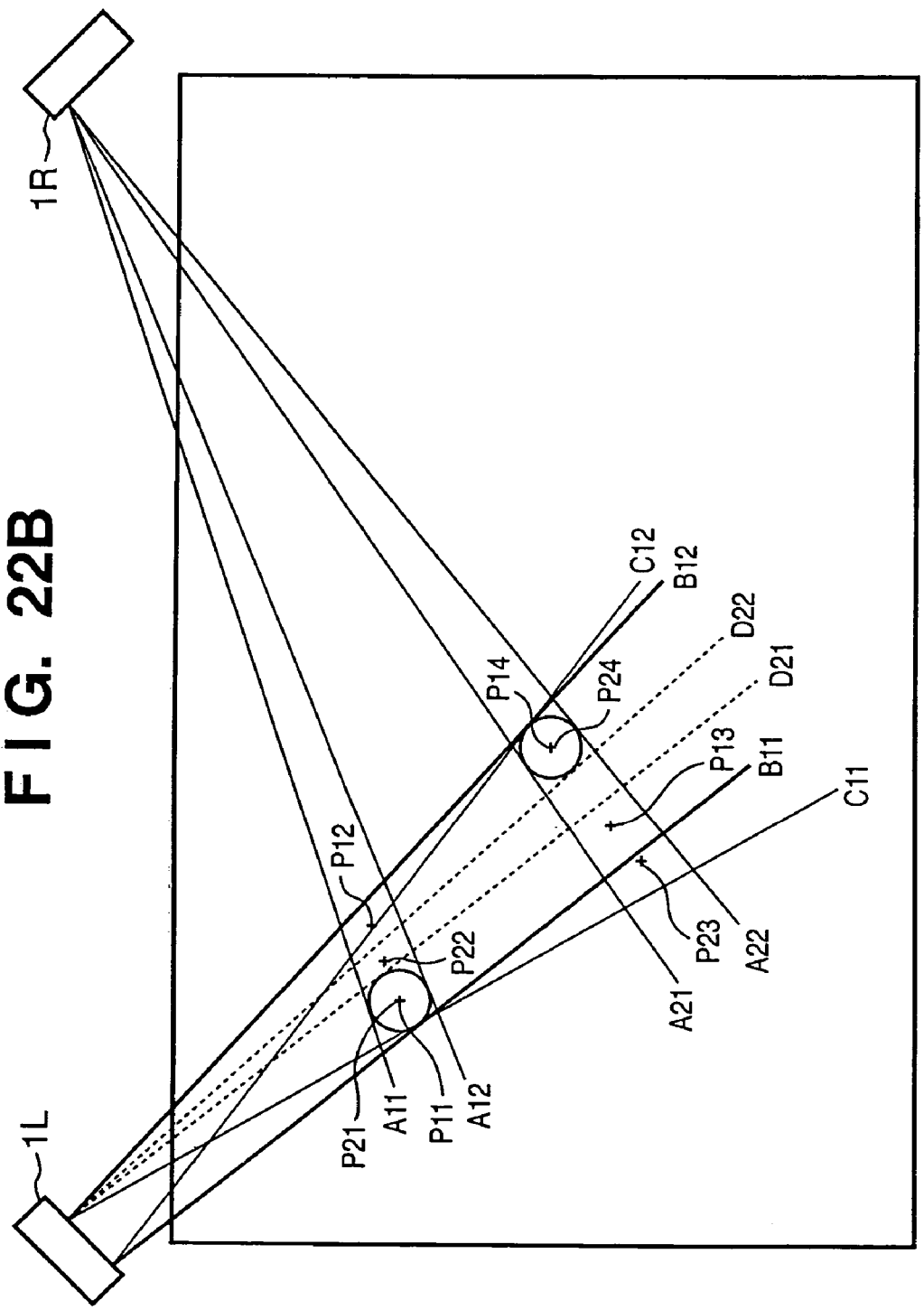

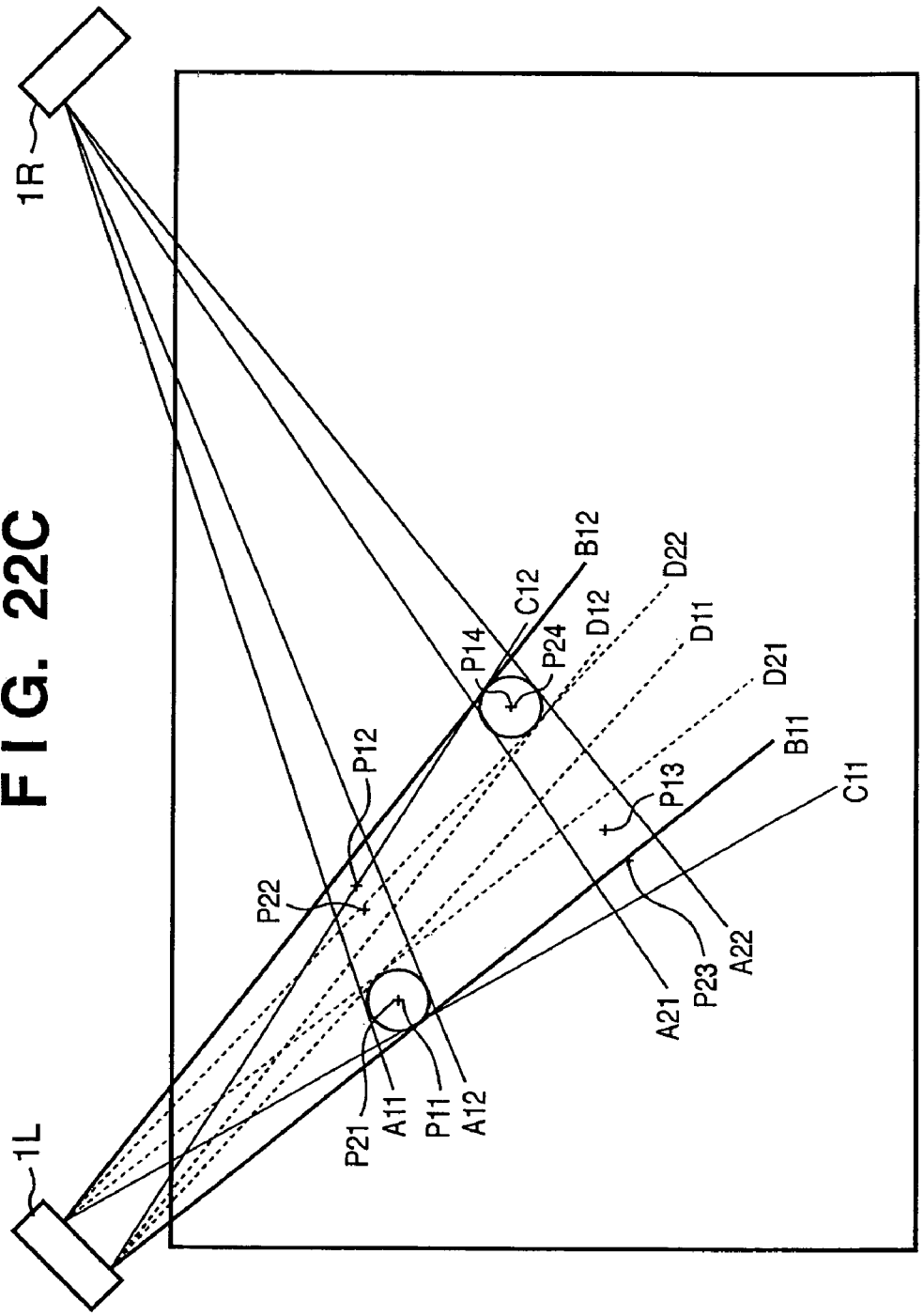

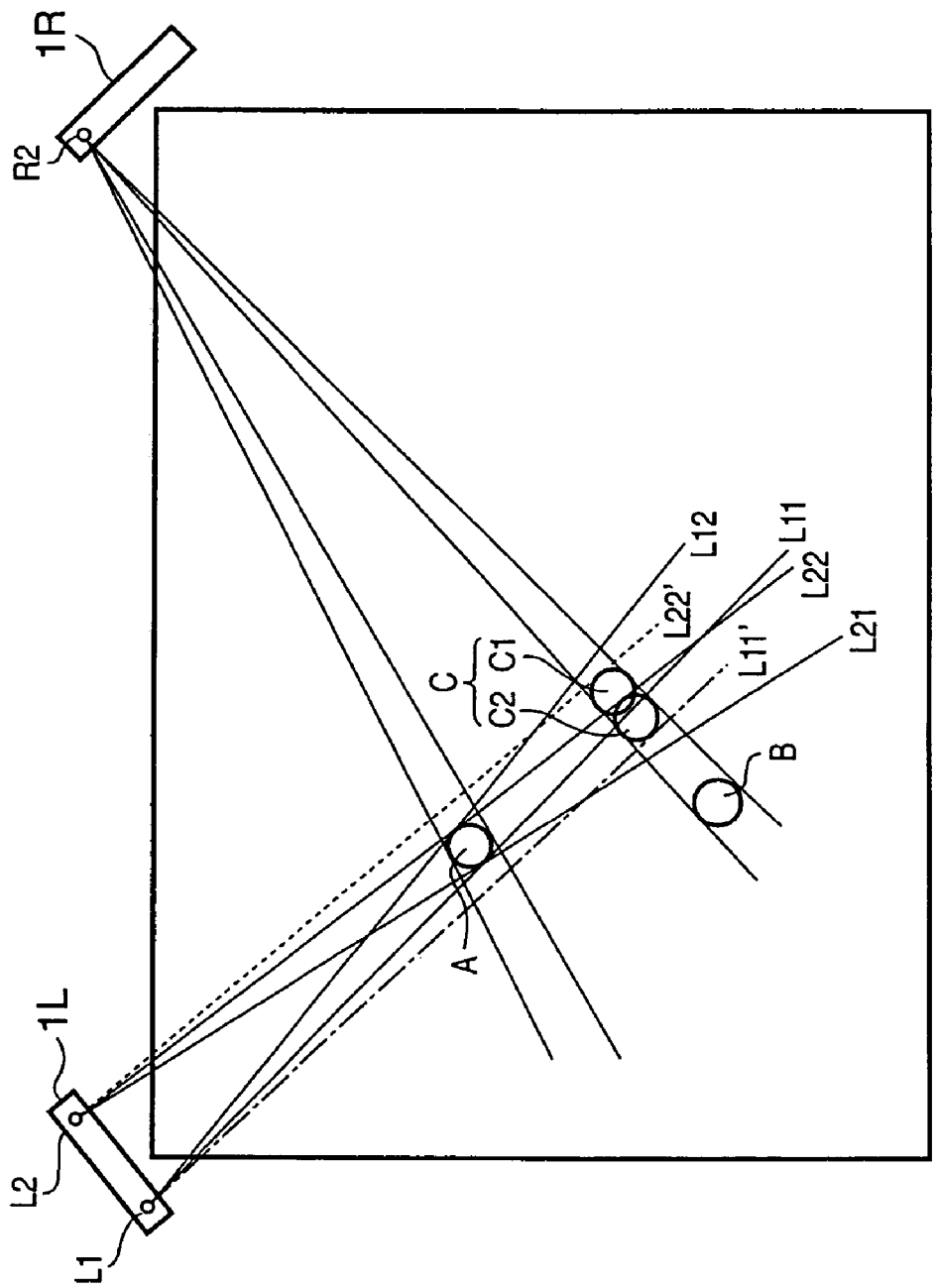
F I G. 26

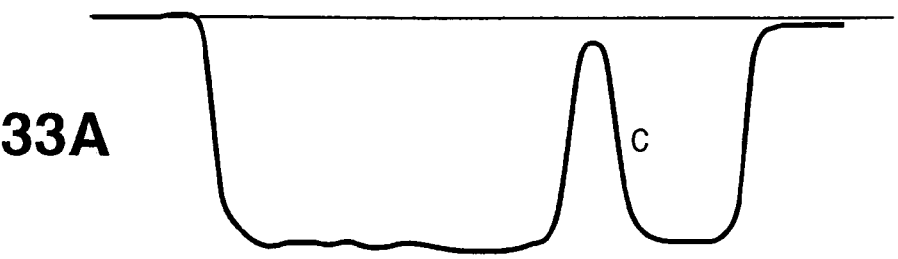
F I G. 33A
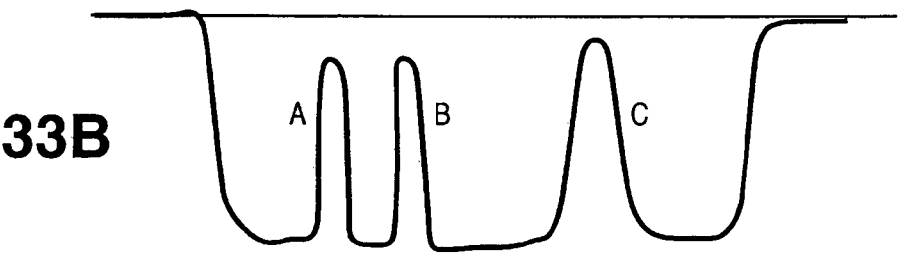
F I G. 33B
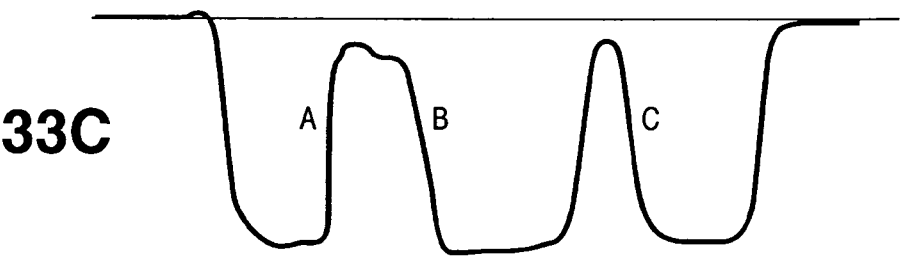
F I G. 33C

COORDINATE INPUT APPARATUS, CONTROL METHOD THEREOF, AND PROGRAM

FIELD OF THE INVENTION

The present invention relates to a coordinate input apparatus for detecting a point position on a coordinate input region, a control method thereof, and a program.

BACKGROUND OF THE INVENTION

There exist coordinate input apparatuses which are used to input coordinates to a coordinate input surface by using a pointer (e.g., a dedicated input pen or finger) to control a connected computer or write characters and graphics.

Conventionally, as coordinate input apparatuses of this type, touch panels of various schemes have been proposed or become commercially available. These apparatuses are widely used because a terminal such as a personal computer can easily be operated on the screen without using any special tool.

There are various coordinate input schemes using, e.g., a resistive film or an ultrasonic wave. A scheme using light is disclosed in, e.g., U.S. Pat. No. 4,507,557. In U.S. Pat. No. 4,507,557, a retroreflecting sheet is provided outside the coordinate input region. By illumination units which are arranged at the corners of the coordinate input region to emit light and light receiving units which receive light, the angles between the light receiving units and a shielding object such as a finger that shields light in the coordinate input region are detected. On the basis of the detection result, the point position of the shielding object is determined.

Japanese Patent Laid-Open No. 2000-105671 or Japanese Patent Laid-Open No. 2001-142642 discloses a coordinate input apparatus which includes a retroreflecting member arranged on the periphery of the coordinate input region and detects the coordinates of a point (light-shielded portion) where retroreflected light is shielded.

In the apparatus of, e.g., Japanese Patent Laid-Open No. 2000-105671, the peak of the light-shielded portion by the shielding object, which is received by the light receiving unit, is detected by waveform processing such as differentiation. The angle of the light-shielded portion with respect to the light receiving unit is detected, and the coordinates of the shielding object are calculated from the detection result. In Japanese Patent Laid-Open No. 2001-142642, comparison with a specific level pattern is done to detect one end and the other end of a light-shielded part, and the center of the coordinates is detected.

The scheme of calculating coordinates by detecting a light shielding position as in U.S. Pat. No. 4,507,557, Japanese Patent Laid-Open Nos. 2000-105671 and 2001-142642 will be referred to as a light shielding scheme hereinafter.

Such a coordinate input apparatus of light shielding scheme is required to allow simultaneous operations of a plurality of operators to increase the convenience for efficient use in, e.g., a conference especially when the size of the coordinate input region is large. Hence, coordinate input apparatuses capable of coping with a plurality of simultaneous inputs have been devised.

To simultaneously input a plurality of coordinate points, in Japanese Patent Laid-Open Nos. 2002-055770, 2003-303046 and Japanese Patent Registration No. 2896183, the angles of a plurality of light-shielded portions are detected by one light receiving sensor. Several input coordinate candidates are calculated on the basis of the combinations of the sensor angles. An actually input coordinate point is determined from the input coordinate candidates.

In, e.g., two-point input, a maximum of four coordinate points are calculated as input coordinate candidates. Of the four points, two actually input coordinate points are determined and output. That is, actual input coordinate points and false input coordinate points are discriminated from the plurality of input coordinate candidates, and final input coordinate points are determined. This determination will be referred to as "truth determination" here.

As a detailed method of truth determination, in Japanese Patent Laid-Open No. 2003-303046 or Japanese Patent Registration No. 2896183, first and second sensors are provided at the two ends of one side of a conventional coordinate input region while being spaced part by a distance enough to accurately calculate coordinates pointed in the coordinate input region. In addition, a third sensor is provided between the first and second sensors while being spaced part from them by a distance enough to accurately calculate coordinates pointed in the input region. On the basis of angle information in the third sensor which is different from those of the first and second sensors, truth is determined for a plurality of pieces of angle information detected by the first and second sensors.

Japanese Application No. 2004 69483 (published as Japanese Patent Laid-Open No. 2005-258811) discloses a method capable of detecting a plurality of point inputs and accurately calculating position coordinates corresponding to each point input. In Japanese Patent Laid Open No. 2005-258811, a coordinate input apparatus has been devised which calculates, for one point target, coordinates as the intersection of bisectors of tangents on the basis of the angle information of at least three light shielded ends of pieces of angle information of light shielded ends serving as a plurality of tangents generated from the light shielding shadows of sensors. This apparatus can calculate coordinates on the basis of not information of two ends but information of one end of a light shielding shadow of the point target. Hence, coordinates can be calculated even when light shield overlap occurs.

However, in the technique such as the conventional light shielding scheme which detects angles from the peak of light amount distribution of a light-shielded portion or the center of light amount distribution, which is defined by the two ends of light amount distribution related to a light shielding shadow, and calculates point coordinates from combinations of angles detected by light receiving units, the following situation may occur. When coordinates are simultaneously input to a plurality of portions, e.g., at least two portions, the two input points may overlap almost linearly from a light receiving unit.

If light shielding shadows corresponding to the two input points overlap in the light receiving unit, it is impossible to separate the light shielding shadows and detect the angle of each input point. Hence, input is disabled.

A detailed example of this will be described with reference to FIG. 32.

For example, assume that coordinates are input by pointers A and B to the positions in the coordinate input region as shown in FIG. 32. Light amount distributions corresponding to the pointers A and B in a light receiving unit S2 are indicated by A and B in FIG. 33B. In this case, light shielding shadows corresponding to the two light shielding positions of the pointers A and B are separated and detected.

FIG. 33A shows a light amount distribution as reference data without point input. Referring to FIG. 33A, the valley of the light amount distribution at a position C is generated due to, e.g., attenuation by the angular characteristic and distance of the retroreflecting member provided around the coordinate input region.

FIG. 33C shows light amount distributions corresponding to the pointers A and B in a light receiving unit S1 shown in FIG. 32. Light shielding shadows corresponding to the two positions of the pointers A and B are detected in an overlapping state. In the information of the light amount distribution (shielded light amount distribution) with overlapping light shielding shadows (light shield overlap), when A and B in FIG. 33B partially overlap (so-called partial eclipse occurs), as shown in FIG. 33C, the end information in the light-shielded range of only one pointer is obtained. For this reason, the coordinates of the pointers A and B cannot be calculated by the conventional method of calculating a position (angle) on the basis of the center or central pixel number of information of two ends of the light-shielded range.

In addition, when the shadow of the first pointer on the near side completely includes the shadow of the second pointer on the far side (so-called total eclipse occurs), the central position (angle) of the first pointer on the near side can be calculated from the two ends of the light shielding shadow. However, no information about the second pointer on the far side can be obtained.

In the prior art, the number of light shielding shadows generated by simultaneous input of a plurality of pointers is detected in advance. For example, if the number of light shielding shadows detected by the second light receiving unit is "2", and that by the first light receiving unit is "1", it is determined that the light shielding shadows corresponding to the pointers overlap in the light amount distribution detected by the first light receiving unit.

In this case, the arrangement disclosed in Japanese Patent Registration No. 2896183 issues a warning indicating generation of the situation to call the user's attention and avoid the situation. In patent Japanese Patent Laid-Open No. 2002-055770 or Japanese Patent Laid-Open No. 2003-303046, the first light receiving unit is switched to the third light receiving unit capable of detecting two separated light shielding shadows without overlap. The angle is detected by the light receiving units (in this case, the first and third light receiving units) capable of detecting the two light shielding shadows. The above-described truth determination is executed for input coordinate candidates obtained from the light receiving units, thereby determining the final actual input coordinates of two points.

In this case, truth determination can be executed sufficiently by using the angle information of the light receiving unit that detects light shield overlap. In Japanese Patent Laid-Open No. 2003-303046 or Japanese Patent Registration No. 2896183, truth determination is executed on the basis of the angle information of the light receiving unit that detects the light shield overlap.

As described above, in the coordinate input apparatus of light shielding scheme, when, e.g., two pointers input positions simultaneously, and light shield overlap occurs even partially with respect to a light receiving unit, the light shielding shadows corresponding to the two pointers may be connected inseparably. If calculation is done regarding the connected light shielding shadows as, e.g., the shadow of one pointer, the coordinate detection accuracy degrades because of the shift from the actual position.

In Japanese Patent Laid-Open No. 2005-258811, in both the complete eclipse and the partial eclipse, coordinates can be calculated as the intersection of bisectors of tangents on the basis of the angle information of at least three light-shielded ends of pieces of angle information of light-shielded ends serving as a plurality of tangents generated from the light shielding shadows of sensors in correspondence with one point target. However, the following problem remains unsolved.

In the coordinate input apparatus of this type, a plurality of sensor units are provided around the input region. In addition, a retroreflecting member is arranged on the left, right, upper, or lower side of the input region. Each sensor unit projects light to the retroreflecting member and receives light reflected by the retroreflecting member. Each sensor unit detects a shadow formed when a pointer shields projected or reflected light, thereby detecting the direction of the input position of the pointer viewed from the sensor unit and detecting the coordinate position indicated by the pointer. For this purpose, all sensor units must accurately detect the number and positions (angles) of shadows formed by shielding light.

However, if an individual characteristic such as the sensitivity of each sensor unit varies, or the light projecting path and light receiving path of each sensor unit change depending on the input region, the following problem may arise. A shadow which is formed by light shielding by the pointer and should be detected simultaneously by a plurality of predetermined sensor units is detected at a predetermined position by a specific sensor unit but not detected at the predetermined position by another specific sensor unit. That is, the timing until the pointer reaches the input surface and completely forms a shadow (this state will be referred to as an "input transition state" hereinafter) may change between the sensor units.

If the shadow that should be detected cannot be detected, as described above, it is impossible to reliably detect the coordinates. The influence of this problem is especially serious when a plurality of inputs are done simultaneously by a plurality of pointers. The numbers of light-shielded ranges detected by the respective sensor units may equal as if partial overlap of the pointers occurred. In some cases, wrong coordinates may be detected as if a pointer inputted at an impossible position.

For example, assume that pointer inputs are done at positions A and B, as shown in FIG. 34. A sensor S2 should detect pieces of light-shielded end information A11, A12, A13, and A14. Similarly, a sensor S1 should detect pieces of light-shielded end information B11, B12, B13, and B14. In the input transition state, however, the sensor S1 may detect only the pieces of light-shielded end information B11 and B12. When calculation is executed by using the center of each light-shielded range, the coordinates of points A and P11 are detected. Even when coordinates are calculated by calculating the intersection of bisectors on the basis of three pieces of light-shielded end information the coordinates of the points A and P21 or P22 are calculated. Hence, the points P11, P21, and P22 are calculated to be different from the point B.

The above-described patent references have no description of a means for solving this problem.

SUMMARY OF THE INVENTION

The present invention has been made to solve the above-described problems, and has as its object to provide a coordinate input apparatus capable of detecting a plurality of point inputs and accurately calculating position coordinates corresponding to the point inputs, a control method thereof, and a program.

According to the present invention, the foregoing object is attained by providing, a coordinate input apparatus for detecting a plurality of point positions on a coordinate input region, comprising:

a plurality of detection means for detecting presence/absence of pointing means on the coordinate input region;

specifying means for specifying a signal change range generated by a pointing operation of the pointing means on the coordinate input region in correspondence with an initial detection signal distribution of the detection means in an initial state without pointing on the coordinate input region;

end information detection means for detecting end information of the signal change range specified by the specifying means;

determination means for determining validity of a detection state in the end information detection means by using a plurality of pieces of end information detected by the end information detection means; and calculation means for calculating coordinates of a point position of the pointing means from the plurality of pieces of end information on the basis of a determination result of the determination means.

In a preferred embodiment, the determination means comprises comparison means for comparing the plurality of coordinates calculated using the plurality of pieces of end information, and the validity of the detection state is determined on the basis of a comparison result by the comparison means.

In a preferred embodiment, the determination means comprises comparison means for comparing intersection coordinates of tangents each of which connects a position of an end indicated by one of the plurality of pieces of end information on the coordinate input region to the detection means corresponding to the end information, and the validity of the detection state is determined on the basis of a comparison result by the comparison means.

According to the present invention, the foregoing object is attained by providing a coordinate input apparatus for detecting a plurality of point positions on a coordinate input region, comprising:

a plurality of detection means for detecting presence/absence of pointing means on the coordinate input region;

specifying means for specifying a signal change range generated by a pointing operation of the pointing means on the coordinate input region in correspondence with an initial detection signal distribution of the detection means in an initial state without pointing on the coordinate input region;

end information detection means for detecting end information of the signal change range specified by the specifying means;

calculation means for calculating coordinates of a point position of the pointing means by using a plurality of pieces of end information detected by the end information detection means;

end information calculation means for calculating new end information on the basis of the coordinates calculated by the calculation means and shape information of the pointing means; and determination means for determining validity of the coordinates calculated by the calculation means, on the basis of the new end information calculated by the end information calculation means.

In a preferred embodiment, the apparatus further comprises control means for controlling, on the basis of a determination result of the determination means, output of the coordinates calculated by the calculation means.

In a preferred embodiment, the determination means comprises:

first calculation means for calculating first angle information with respect to the detection means based on a position, on the coordinate input region, of an end indicated by the end information detected by the end information detection means;

second calculation means for calculating second angle information with respect to the detection means based on the position, on the coordinate input region, of the end indicated by the end information detected by the end information detection means; and comparison means for comparing the first angle information with the second angle information, and the validity of the coordinates calculated by the calculation means is determined on the basis of a comparison result by the comparison means.

According to the present invention, the foregoing object is attained by providing a control method of a coordinate input apparatus which includes a detection unit to detect presence/absence of pointing means on a coordinate input region and detects a point position on the coordinate input region, comprising:

a specifying step of specifying a signal change range generated by a pointing operation of the pointing means on the coordinate input region in correspondence with an initial detection signal distribution of the detection unit in an initial state without pointing on the coordinate input region;

an end information detection step of detecting end information of the signal change range specified in the specifying step;

a determination step of determining validity of a detection state in the end information detection step by using a plurality of pieces of end information detected in the end information detection step; and a calculation step of calculating coordinates of a point position of the pointing means from the plurality of pieces of end information on the basis of a determination result in the determination step.

According to the present invention, the foregoing object is attained by providing a control method of a coordinate input apparatus which includes a plurality of detection units to detect presence/absence of pointing means on a coordinate input region and detects a point position on the coordinate input region, comprising:

a specifying step of specifying a signal change range generated by a pointing operation of a pointing means on the coordinate input region in correspondence with an initial detection signal distribution of the detection unit in an initial state without pointing on the coordinate input region;

an end information detection step of detecting end information of the signal change range specified in the specifying step;

a calculation step of calculating coordinates of a point position of the pointing means by using a plurality of pieces of end information detected in the end information detection step;

an end information calculation step of calculating new end information on the basis of the coordinates calculated in the calculation step and shape information of the pointing means; and a determination step of determining validity of the coordinates calculated in the calculation step on the basis of the new end information calculated in the end information calculation step.

According to the present invention, the foregoing object is attained by providing a program which implements control of a coordinate input apparatus which includes a detection unit to detect presence/absence of pointing means on a coordinate input region and detects a point position on the coordinate input region, comprising:

a program code for a specifying step of specifying a signal change range generated by a pointing operation of the pointing means on the coordinate input region in correspondence with an initial detection signal distribution of the detection unit in an initial state without pointing on the coordinate input region;

a program code for an end information detection step of detecting end information of the signal change range specified in the specifying step;

a program code for a determination step of determining validity of a detection state in the end information detection step by using a plurality of pieces of end information detected in the end information detection step; and a program code for a calculation step of calculating coordinates of a point position of the pointing means from the plurality of pieces of end information on the basis of a determination result in the determination step.

According to the present invention, the foregoing object is attained by providing a program which implements control of a coordinate input apparatus which includes a plurality of detection units to detect presence/absence of pointing means on a coordinate input region and detects a point position on the coordinate input region, comprising:

a program code for a specifying step of specifying a signal change range generated by a pointing operation of a pointing means on the coordinate input region in correspondence with an initial detection signal distribution of the detection unit in an initial state without pointing on the coordinate input region;

a program code for an end information detection step of detecting end information of the signal change range specified in the specifying step;

a program code for a calculation step of calculating coordinates of a point position of the pointing means by using a plurality of pieces of end information detected in the end information detection step;

a program code for an end information calculation step of calculating new end information on the basis of the coordinates calculated in the calculation step and shape information of the pointing means; and a program code for a determination step of determining validity of the coordinates calculated in the calculation step on the basis of the new end information calculated in the end information calculation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a view for explaining light-shielded range detection according to the first embodiment of the present invention;

FIG. 20 is a table showing combinations of the numbers of light-shielded ranges according to the first embodiment of the present invention;

FIG. 22B is a view for explaining an example of coordinate calculation based on light-shielded range end information according to the first embodiment of the present invention;

FIG. 22C is a view for explaining an example of coordinate calculation based on light-shielded range end information according to the first embodiment of the present invention;

FIG. 26 is a view for explaining an example wherein validity of a coordinate value is determined by recalculating the angle of end information on the basis of the coordinate value according to the second embodiment of the present invention;

FIGS. 33A to 33C are views for the distributions of light received by the sensor units according to a prior art.

DETAILED DESCRIPTION OF THE PREFERRED EMBODIMENTS

Preferred embodiments of the present invention will now be described in detail in accordance with the accompanying drawings.

First Embodiment

<Description of Schematic Arrangement of Apparatus>

The schematic arrangement of an overall coordinate input apparatus will be described first with reference to FIG. 1.

Figure 1:
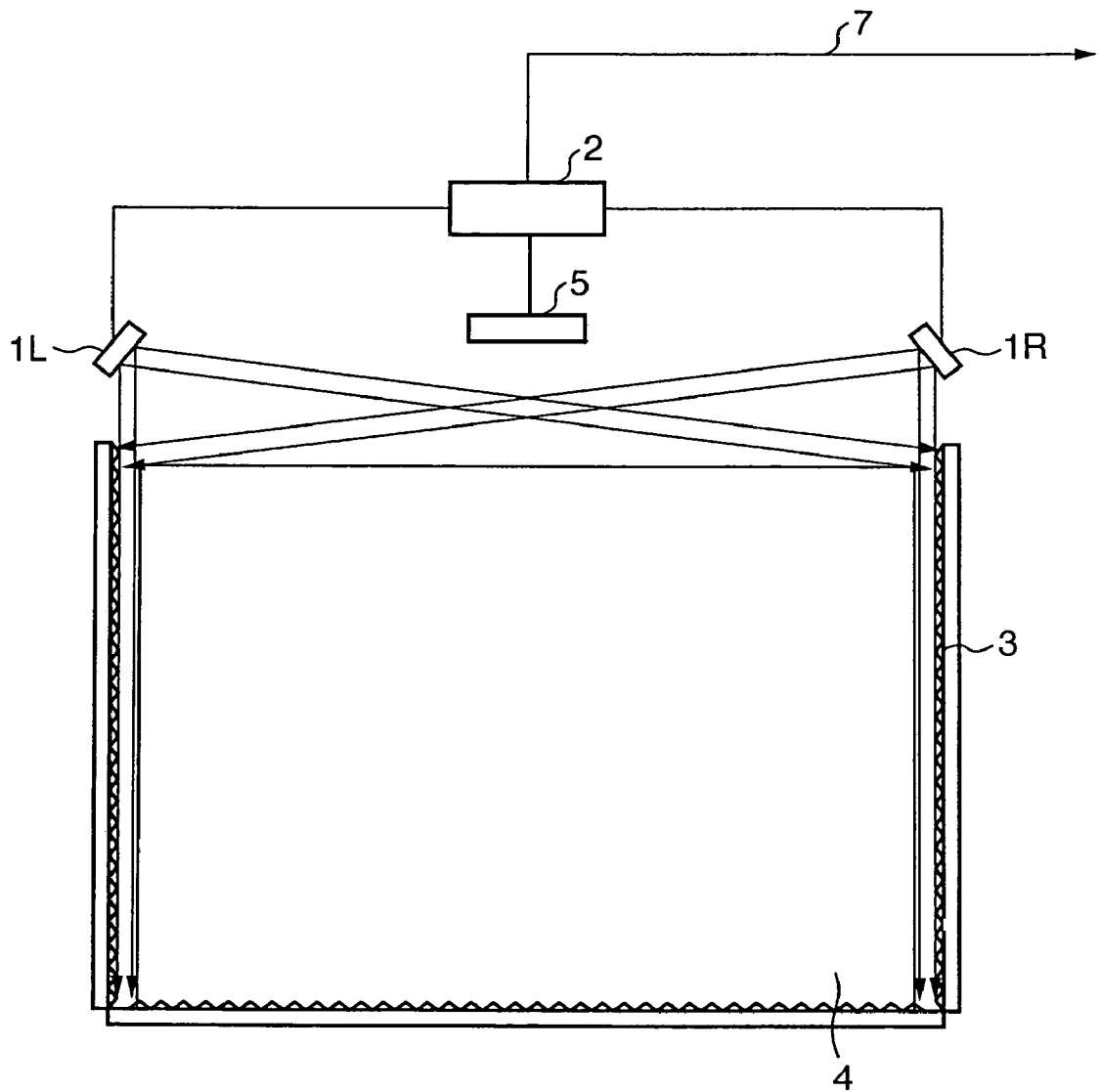
FIG. 1 is a view showing the schematic arrangement of a coordinate input apparatus of light shielding scheme according to the first embodiment of the present invention.

FIG. 1 is a view showing the schematic arrangement of a coordinate input apparatus of light shielding scheme according to the first embodiment of the present invention.

Referring to FIG. 1, sensor units 1L and 1R have light projecting units and light receiving units. In the first embodiment, the sensor units 1L and 1R are arranged parallel to the X-axis of a coordinate input effective region 3 serving as a coordinate input surface and symmetrically about the Y-axis while being spaced apart by a predetermined distance, as shown in FIG. 1. The sensor units 1L and 1R are connected to a control/arithmetic unit 2. Each of the sensor units 1L and 1R receives a control signal from the control/arithmetic unit 2 and transmits a detected signal to the control/arithmetic unit 2.

A retroreflecting member 4 has a retroreflecting surface to reflect incident light in the direction of arrival. The retroreflecting member 4 is arranged on three outer sides of the coordinate input effective region 3, as shown in FIG. 1, to retroreflect, toward the left and right sensor units 1L and 1R, light projected within a range of almost 90° from the sensor units 1L and 1R.

The retroreflecting member 4 has a three-dimensional structure microscopically. A bead-type retroreflecting tape or a retroreflecting tape which causes retroreflection by periodically arraying corner cubes by, e.g., machining is currently known.

The light retroreflected by the retroreflecting member 4 is one-dimensionally detected by the sensor units 1L and 1R, and the light amount distribution is transmitted to the control/arithmetic unit 2.

The coordinate input effective region 3 formed from the display screen of a display device such as a PDP, rear projector, or LED panel can be used as an interactive input device.

In this arrangement, when input by a pointing means such as a finger or pointer is done in the coordinate input effective region 3, light projected from the light projecting units of the sensor units 1L and 1R is shielded (light-shielded portion). The light receiving units of the sensor units 1L and 1R cannot detect the light of the light-shielded portion (reflected light by retroreflection). It is consequently possible to determine the direction of light that cannot be detected.

The control/arithmetic unit 2 detects a plurality of light-shielded ranges of the input portion by the pointer on the basis of a change in light amount detected by the left and right sensor units 1L and 1R. On the basis of the end information of the light-shielded ranges, the direction (angle) of each end of the light-shielded ranges with respect to the sensor units L and 1R is calculated. If the pointer has a signal generation unit, a pen signal receiving unit 5 receives a pen signal from the pointer.

On the basis of the number of detected light-shielded ranges, data obtained from the light-shielded ranges and to be used for coordinate calculation is determined. The light shielding position of the pointer on the coordinate input effective region 3 is geometrically calculated on the basis of, e.g., the calculated direction (angle) and the distance information between the sensor units 1L and 1R. The coordinate value is output, through an interface 7 (e.g., USB or IEEE 1394), to an external terminal such as a host computer connected to the display device.

In this way, the external terminal can be operated by the pointer by, e.g., drawing a line on the screen or manipulating an icon displayed on the display device.

<Detailed Description of Sensor Unit 1>

The arrangement of the sensor units 1L and 1R will be described next with reference to FIG. 2. Each of the sensor units 1L and 1R is roughly divided into a light projecting unit and a light receiving unit.

Figure 2:
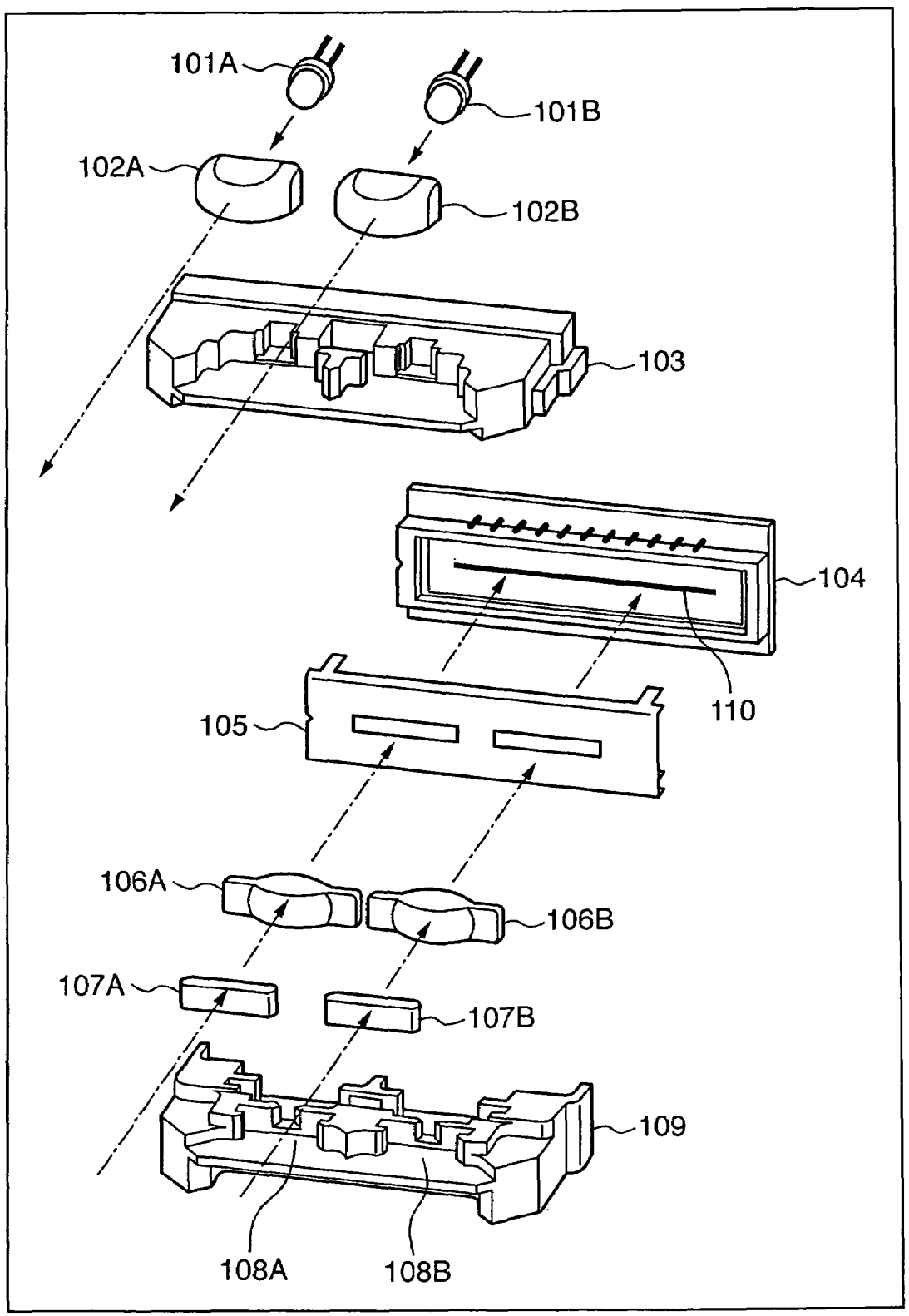
FIG. 2 is an exploded view showing the detailed arrangement of a sensor unit according to the first embodiment of the present invention.

FIG. 2 is an exploded view showing the detailed arrangement of the sensor unit according to the first embodiment of the present invention.

Referring to FIG. 2, infrared LEDs 101A and 101B to emit infrared light project light within a range of almost 90° toward the retroreflecting member 4 through projecting lenses 102A and 102B, respectively. The light projecting units in the sensor units 1L and 1R are implemented by the infrared LEDs 101A and 101B and the projecting lenses 102A and 102B. Hence, two light projecting units are included in each of the sensor units 1L and 1R.

Infrared light projected from the light projecting units is retroreflected by the retroreflecting member 4 in the direction of arrival and detected by the light receiving units in the sensor units 1L and 1R.

The light receiving unit comprises a 1D line CCD 104 with a shield member 105 which limits the visual field of a light beam and electrically shields the light. The light receiving unit also comprises light receiving lenses 106A and 106B serving as a condenser optical system, irises 108A and 108B to roughly restrict the incident direction of incident light, and infrared filters 107A and 107B to prevent incidence of excess light (disturbance light) such as visible light.

The light reflected by the retroreflecting member 4 is focused on the surface of a detection element 110 of the line CCD 104 by the light receiving lenses 106A and 106B through the infrared filters 107A and 107B and the irises 108A and 108B. Hence, two light receiving units are included in each of the sensor units 1L and 1R.

Members 103 and 109 function as upper and lower hoods 103 and 109 which arrange the optical components included in the light projecting units and light receiving units and prevent the light projected by the light projecting units from directly entering the light receiving units or cut extraneous light.

In the first embodiment, the irises 108A and 108B are integrated with the lower hood 109. However, they may be separate components. In addition, a positioning unit of the irises 108A and 108B and light receiving lenses 106A and 106B may be provided on the side of the upper hood 103. In this case, an arrangement to facilitate positioning of each light receiving unit with respect to the light emission center of a corresponding light projecting unit (i.e., an arrangement which allows only the upper hood 103 to arrange all the main optical components) can be implemented.

Figure 3A:
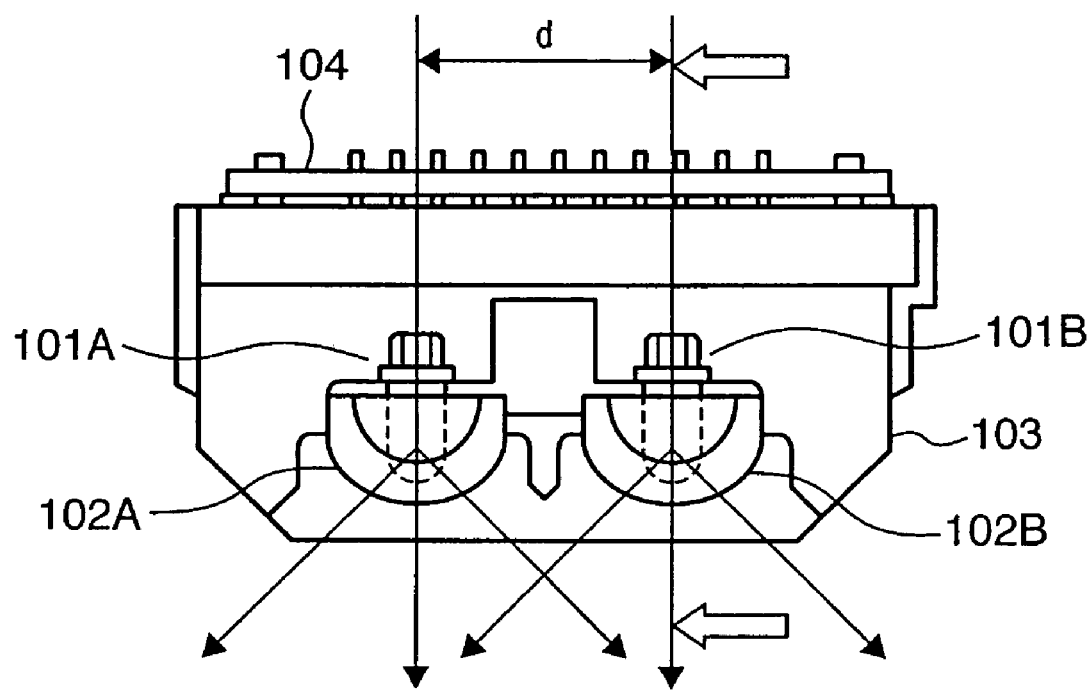
FIG. 3A is a view showing the optical arrangement of the sensor unit according to the first embodiment of the present invention.

FIG. 3A is a view showing the assembled state of the sensor unit 1L (1R) in FIG. 2, which is viewed from the front direction (a direction perpendicular to the coordinate input surface). As shown in FIG. 3A, the two light projecting units in the sensor unit 1L (1R) are spaced part by a predetermined distance d and arranged such that the directions of principal rays are almost parallel. The light projecting units are configured to project light within a range of almost 90° through the projecting lenses 102A and 102B.

Figure 3B:
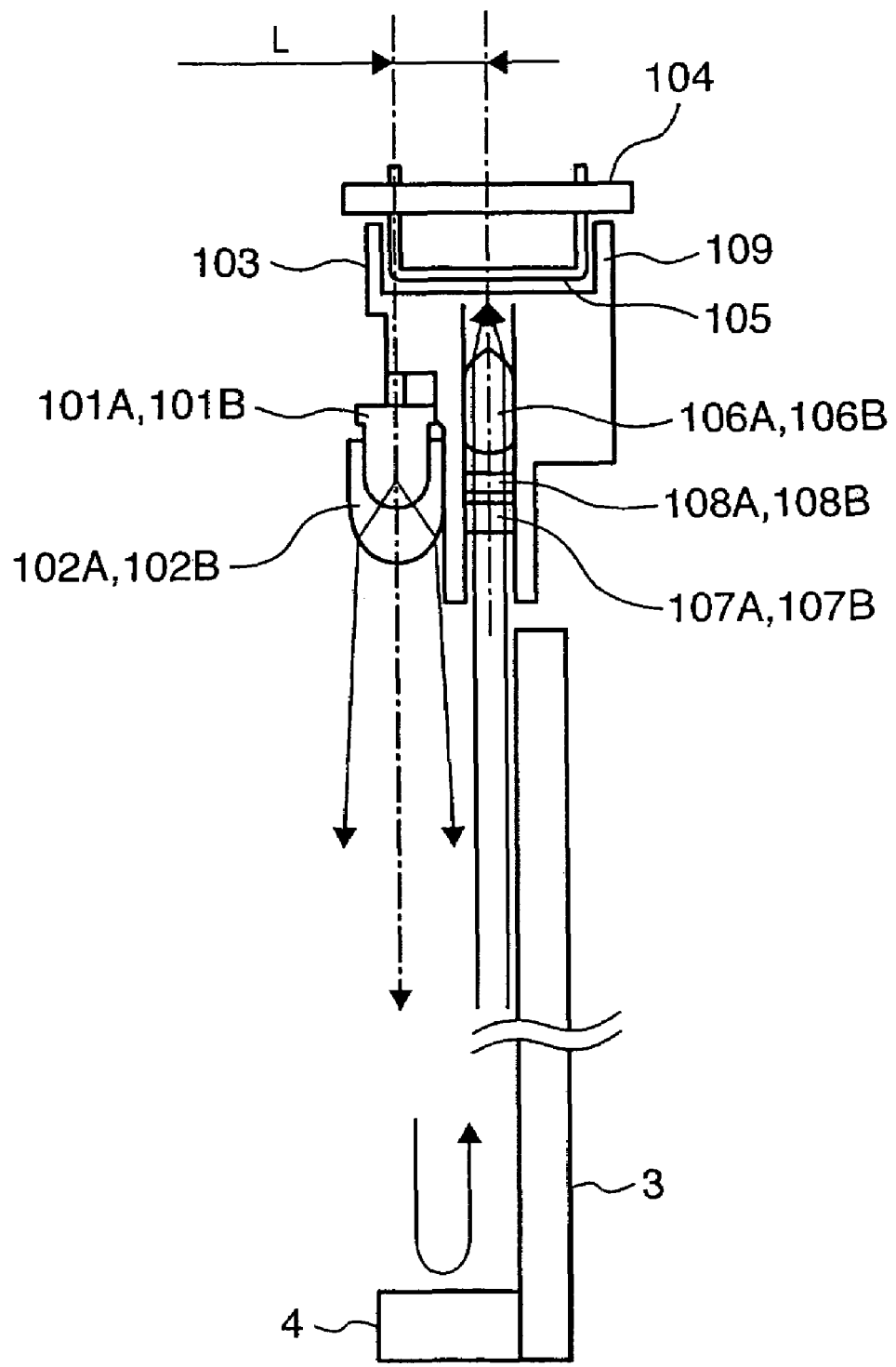
FIG. 3B is a sectional view showing the optical arrangement of the sensor unit according to the first embodiment of the present invention.

FIG. 3B is a sectional view of a portion indicated by open arrows in FIG. 3A. Light from the infrared LED 101A (101B) is projected mainly toward the retroreflecting member 4 as a light beam restricted by the projecting lens 102A (102B) to be almost parallel to the coordinate input surface.

Figure 3C:
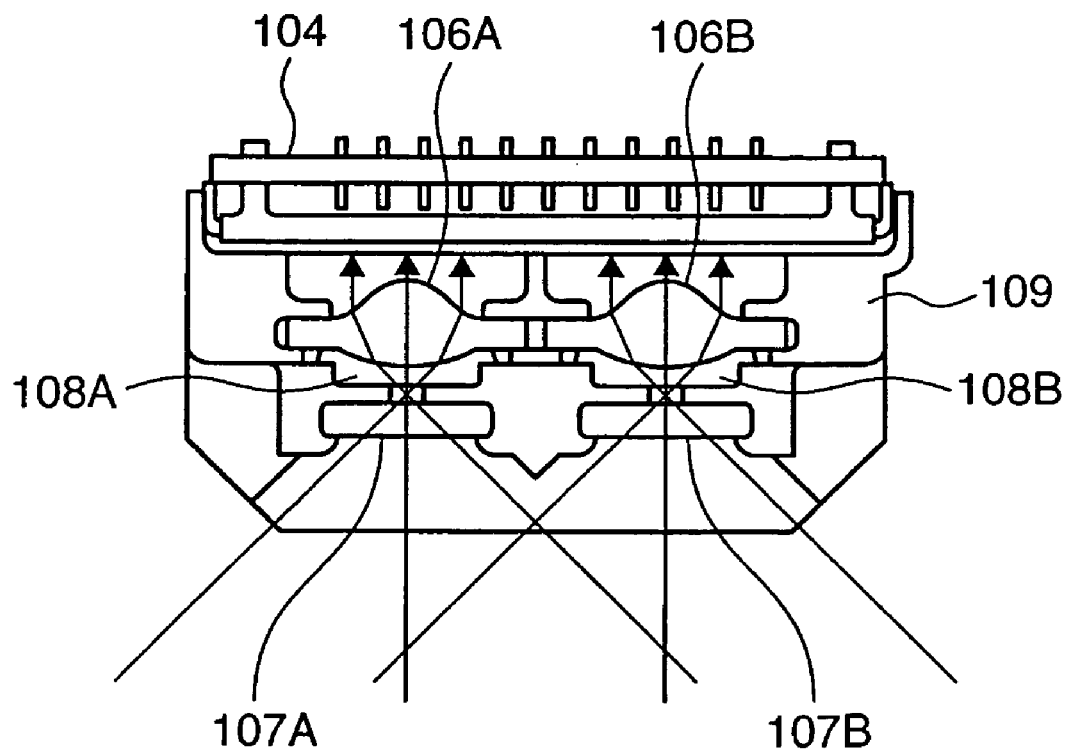
FIG. 3C is a view showing the optical arrangement of the sensor unit according to the first embodiment of the present invention.

FIG. 3C is a view showing the sensor unit without the infrared LEDs 101A and 101B, projecting lenses 102A and 102B, and upper hood 103 in FIG. 3A, which is viewed from the front direction (a direction perpendicular to the coordinate input surface).

In the first embodiment, the light projecting units and light receiving units are stacked in the direction perpendicular to the coordinate input effective region 3 serving as the coordinate input surface (FIG. 3B). When viewed from the front direction (the direction perpendicular to the coordinate input surface), the light emission center of each light projecting unit matches the reference position of a corresponding light receiving unit (the reference position corresponds to a reference point position to measure an angle, i.e., the position of the iris 108A (108B) in the first embodiment where light beams cross in FIG. 3C).

As described above, the two light projecting units are spaced part by the predetermined distance d and arranged such that the directions of principal rays are almost parallel. Hence, the two light receiving units are also spaced part by the predetermined distance d and arranged such that the optical axes (optical symmetry axes) are almost parallel.

The light beam almost parallel to the coordinate input surface, which is projected from a light projecting unit within a range of almost 90° in the in-plane direction, is retroreflected by the retroreflecting member 4 in the direction of arrival of light. The light is focused and forms an image on the surface of the detection element 110 of the line CCD 104 through the infrared filter 107A (107B), iris 108A (108B), and light receiving lens 106A (106B).

The output signal from the line CCD 104 represents the light amount distribution corresponding to the incident angle of reflected light. Hence, the pixel number of each pixel included in the line CCD 104 indicates angle Information.

A distance L between the light projecting unit and the light receiving unit shown in FIG. 3B is much shorter than the distance from the light projecting unit to the retroreflecting member 4. For this reason, even the light receiving unit having the distance L with respect to the light projecting unit can detect sufficient retroreflected light.

As described above, the sensor unit 1L (1R) includes at least two light projecting units and two light receiving units to detect light projected from the light projecting units (in the first embodiment, two sets of light projecting units and two sets of light receiving units are present).

In the first embodiment, the left portion of the detection element 110 that is linearly arranged on the line CCD 104 as part of the light receiving units is defined as the condenser region of the first light receiving unit, and the right portion is defined as the condenser region of the second light receiving unit, thereby sharing the component. However, the present invention is not limited to this. For example, line CCDs may individually be provided for the light receiving units.

<Description of Control/Arithmetic Unit>

The control/arithmetic unit 2 and the sensor units 1L and 1R mainly exchange CCD control signals for the line CCDs 104 in the light receiving units, CCD clock signal and output signal, and driving signals of the infrared LEDs 101A and 101B in the light projecting units.

The detailed arrangement of the control/arithmetic unit 2 will be described with reference to FIG. 4.

Figure 4:
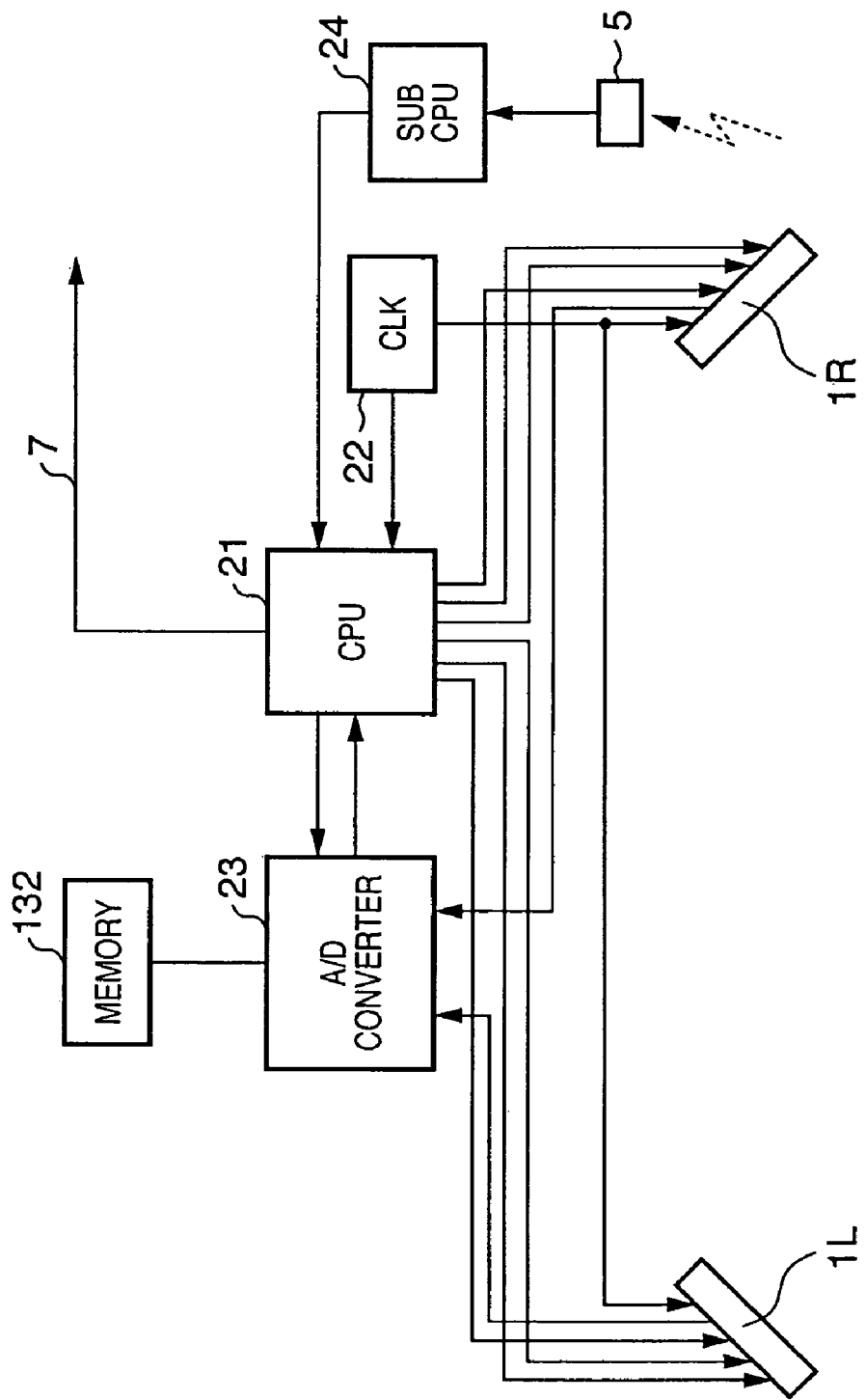
FIG. 4 is a block diagram showing the detailed arrangement of a control/arithmetic unit according to the first embodiment of the present invention.

FIG. 4 is a block diagram showing the detailed arrangement of the control/arithmetic unit according to the first embodiment of the present invention.

A CCD control signal is output from an arithmetic control circuit (CPU) 21 including, e.g., a one-chip microcomputer to control the shutter timing and data output of the line CCD 104.

The arithmetic control circuit 21 operates in accordance with a clock signal from a clock generation circuit (CLK) 22. Clock signals for CCDs are transmitted from the clock generation circuit (CLK) 22 to the sensor units 1L and 1R and also input to the arithmetic control circuit 21 to execute various kinds of control in synchronism with the line CCD 104 in each sensor unit.

LED driving signals to drive the infrared LEDs 101A and 101B of the light projecting units are supplied from the arithmetic control circuit 21 to the infrared LEDs 101A and 101B in the light projecting units in the sensor units 1L and 1R through LED driving circuits (not shown).

A detection signal from the line CCD 104 in each light receiving unit of the sensor units 1L and 1R is input to an A/D converter 23 and converted into a digital value under the control of the arithmetic control circuit 21. The converted digital value is stored in a memory 132 and used to calculate the angle of a pointer. A coordinate value is calculated from the calculated angle and output to an external terminal via a serial interface 7 (e.g., USB, IEEE 1394, or RS232C).

When a pen is used as a pointer, the pen signal receiving unit 5 which receives a pen signal from the pen outputs a digital signal obtained by demodulating the pen signal. This signal is input to a sub CPU 24 serving as a pen signal detection circuit and analyzed. The analysis result is output to the arithmetic control circuit 21.

<Description of Light Amount Distribution Detection>

Figure 5:
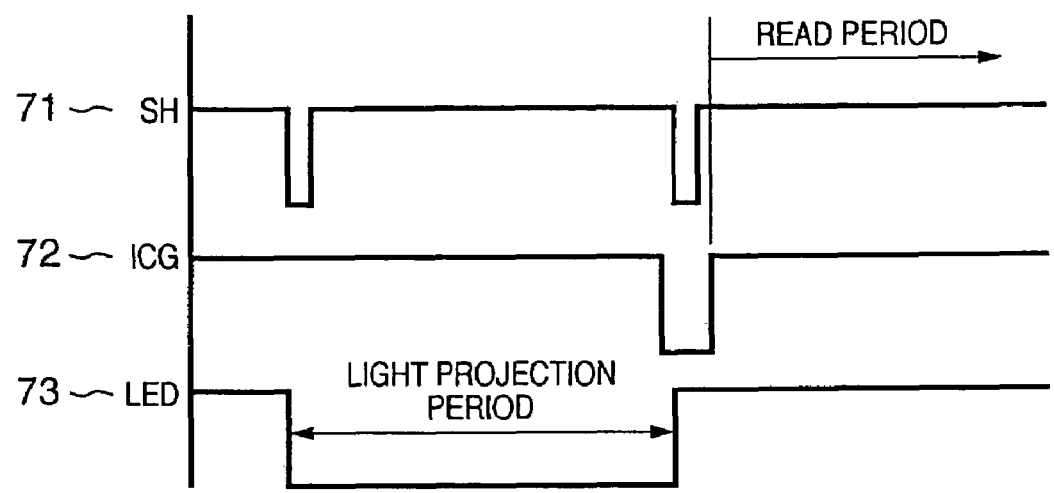
FIG. 5 is a timing chart of control signals according to the first embodiment of the present invention.

FIG. 5 is a timing chart of control signals according to the first embodiment of the present invention.

FIG. 5 particularly shows a timing chart of control signals or one light receiving unit in the sensor unit 1L (1R) and the infrared LED 101A (101B) serving as illumination corresponding to the light receiving unit.

Reference numerals 71 and 72 denote control signals to control the CCD. The shutter open time of the line CCD 104 is determined by the interval of SH signals 71. The ICG signal 72 is a gate signal to the sensor unit 1L (1R) to transfer charges in the photoelectric conversion unit of the internal line CCD 104 to a read unit.

Reference numeral 73 denotes a driving signal of the infrared LED 101A (101B). To turn on the infrared LED 101A (101B), the signal 73 is supplied to the infrared LED 101A (101B) at the period of the SH signal 71.

After driving of the light projecting units of both the sensor units 1L and 1R is ended, the detection signals from the light receiving units (line CCDs 104) of both the sensor units 1L and 1R are read out.

Figure 6:
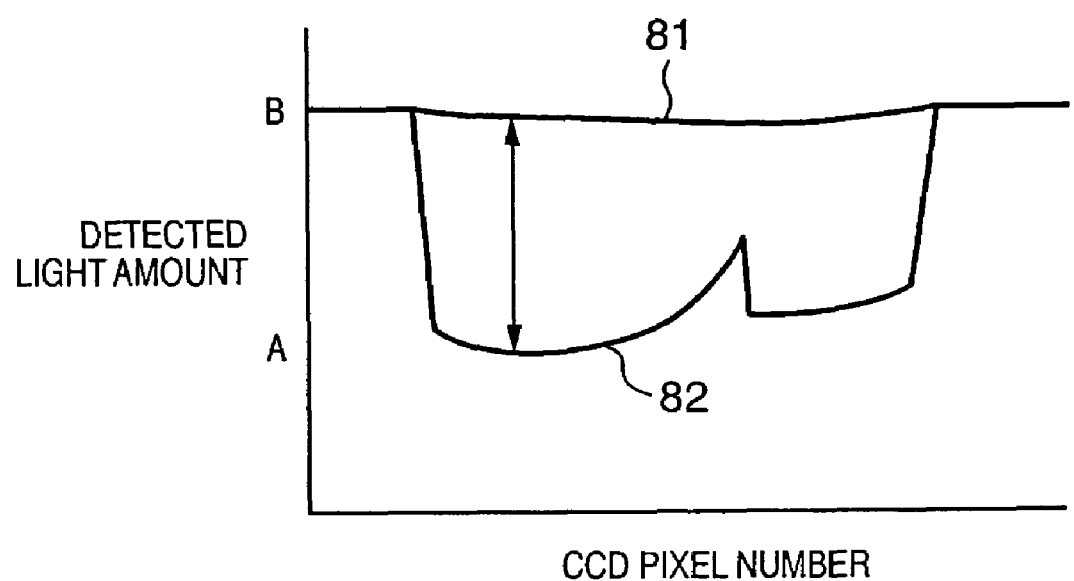
FIG. 6 is a graph for explaining a light amount distribution detected by the sensor unit according to the first embodiment of the present invention.

When no input by a pointer to the coordinate input effective region 3 is present, a light amount distribution shown in FIG. 6 is obtained as the detection signal read out from each of the sensor units 1L and 1R. However, this light amount distribution is not always obtained in any system. The light amount distribution changes depending on the retroreflecting characteristic of the retroreflecting member 4, the characteristic of the light projecting unit, and changes over time (e.g., contamination of the reflecting surface).

Referring to FIG. 6, level A indicates the maximum light amount, and level B indicates the minimum light amount.

When there is no reflected light from the retroreflecting member 4, the light amount level obtained by the sensor units 1L and 1R approaches the level B. As the reflected light amount increases, the light amount level changes to the level A. In this way, the detection signals output from the sensor units 1L and 1R are sequentially A/D-converted by the A/D converter 23 and received by the arithmetic control circuit 21 as digital data.

Figure 7:
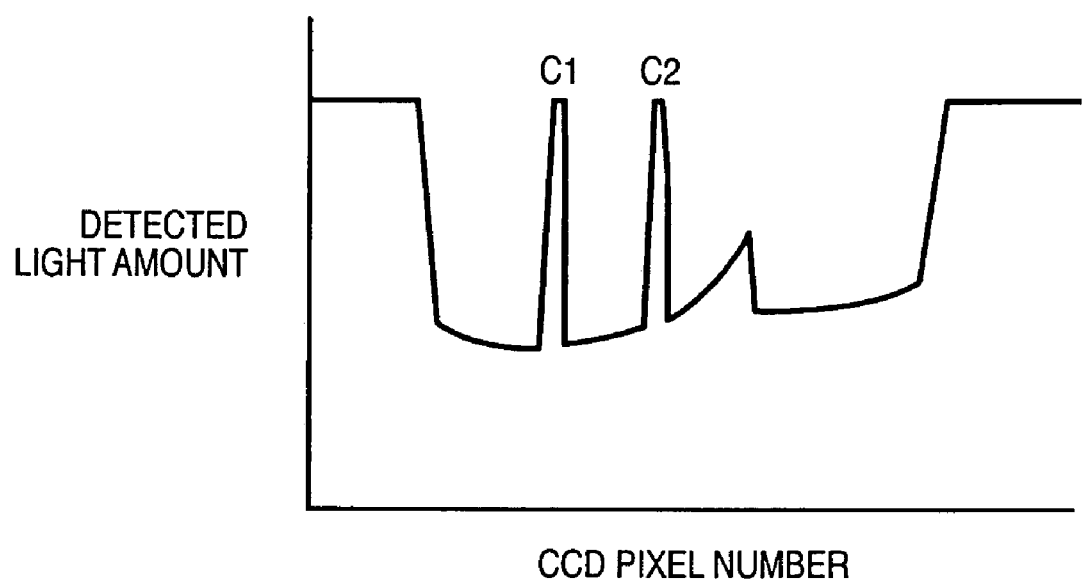
FIG. 7 is a graph for explaining a light amount distribution detected by the sensor unit according to the first embodiment of the present invention.

On the other hand, if there is input to the coordinate input effective region 3 by a pointer, the light amount distribution shown in FIG. 7 is obtained as the output from each of the sensor units 1L and 1R.

At portions C1 and C2 of this light amount distribution, reflected light from the retroreflecting member 4 is shielded by pointers so that the reflected light amount decreases only at these portions (light-shielded ranges). Especially in FIG. 7; since the reflected light from the retroreflecting member 4 is shielded by a plurality of pointers, a plurality of light-shielded ranges are detected.

In the first embodiment, the angles of each pointer with respect to the sensor units 1L and 1R are detected on the basis of the difference between the light amount distribution shown in FIG. 6 without input by pointers and the light amount distribution shown in FIG. 7 with input by pointers.

More specifically, as the light amount distribution in FIG. 6, a light amount distribution 81 without light projection (illumination) by the light projecting units and a light amount distribution 82 without input by pointers (without shields) during light projection (illumination) are stored in the memory 132 in advance as an initial state.

Whether the light amount distribution changes, as shown in FIG. 7, during the sample period of the detection signal from each of the sensor units 1L and 1R is detected on the basis of the difference between the light amount distribution during the sample period and the light amount distribution in the initial state stored in the memory 132. When a change in the light amount distribution is detected, the change portion is defined as the input point of a pointer, and calculation of determining an input angle (determining the ends of the light-shielded range) is executed.

As described above, in the present invention, a plurality of light receiving units are provided in correspondence with one line CCD 104. A light projecting unit is provided in correspondence with each light receiving unit. Hence, to drive the light receiving units (or light projecting units) at different timings, each unit is driven at the above-described signal timing.

Figure 8:
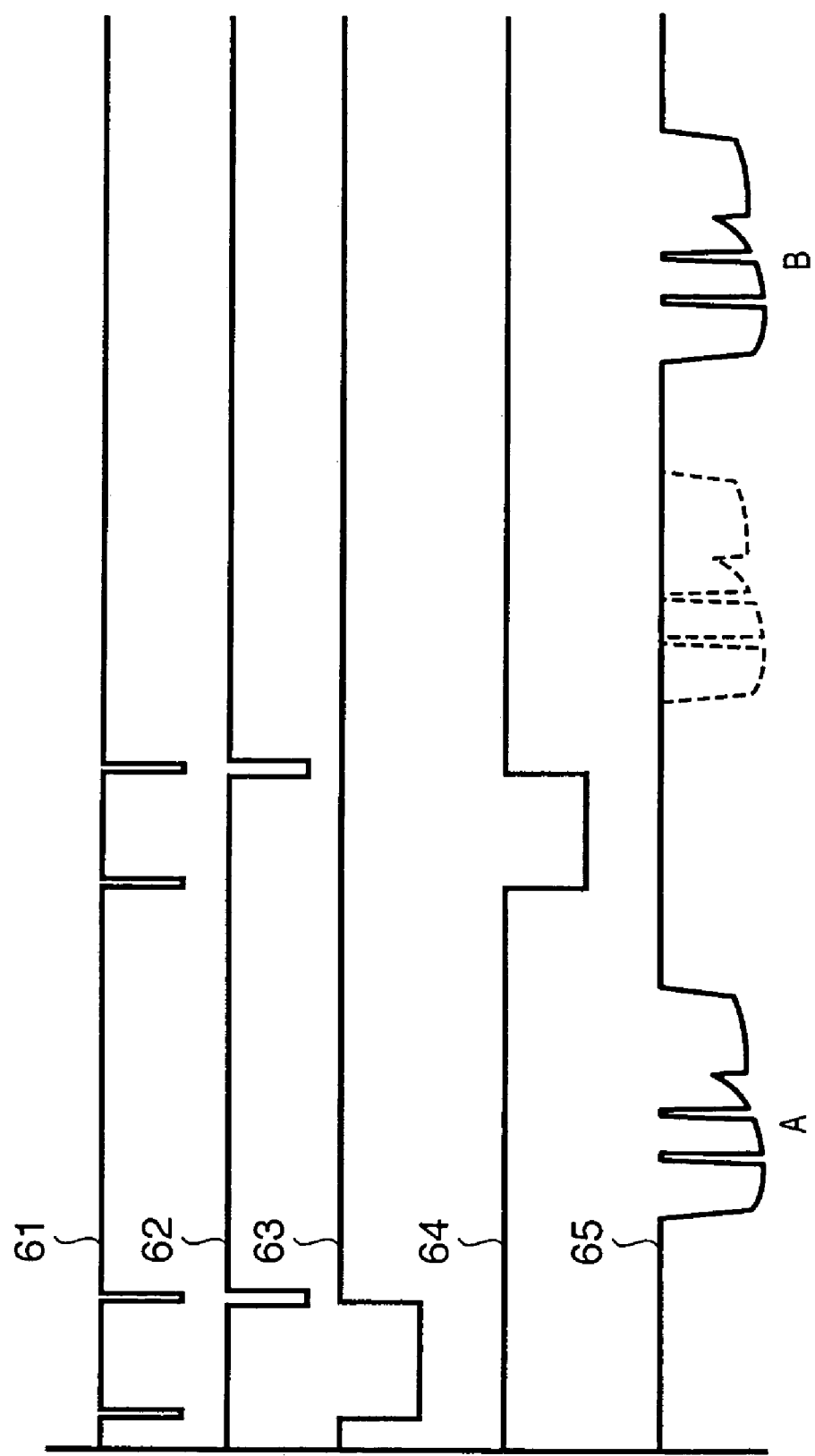
FIG. 8 is a timing chart of signal read according to the first embodiment of the present invention.

FIG. 8 is a timing chart of the signals. First, to cause one light receiving unit in the sensor unit 1L to detect light on the leading edge side of the line CCD 104 in the sensor unit 1L, the infrared LED (e.g., the infrared LED 101A) is driven at the timing of a signal 63 with respect to an SH signal 61. A signal is read out from the line CCD 104 in accordance with an ICG signal 62. At this time, pixel data in the light receiving range on the leading edge side of the line CCD 104 is read out (a portion A in a signal 65).

The SH signal 61 is supplied to the line CCD 104. To cause the other light receiving unit in the sensor unit 1L to detect light, a driving signal 64 is supplied to the infrared LED (e.g., the infrared LED 101B). The light receiving signal is output in a region (a portion B in the signal 65) which does not overlap the previously detected signal (broken line portion) of the leading edge portion.

When the other sensor unit 1R is driven at another timing, CCD signals are read out from the respective sensors. In the present invention, detection signals by a maximum of four light receiving units are acquired.

In the first embodiment, a total of four light receiving units in the left and right sensor units 1L and 1R are driven at different timings. However, the present invention is not limited to this. If light-emitting operations of the sensor units do not affect each other, the light receiving units may be driven simultaneously. Alternatively, the light receiving units may be driven in arbitrary combinations.

<Description of Angle Calculation>

To calculate the angles of a pointer with respect to the sensor units 1L and 1R, the light-shielded range by the pointer needs to be detected first.

Angle calculation of a pointer by one of the sensor units 1L and 1R (e.g., the sensor unit 1L) will be described below. The other sensor unit (sensor unit 1R) also executes the same angle calculation, as a matter of course.

The signals 81 and 82 shown in FIG. 6 are stored in the memory 132 in advance as light amount distributions at the time of power-on. The input range (light-shielded range) of a pointer is detected by comparing the signals with a light amount distribution obtained by actual input using the pointer.

When a light amount distribution with the portions C1 and C2 is input, as shown in FIG. 7, the difference between the light amount distribution and the light amount distribution 82 stored in the memory 132 is calculated. By using the calculation result and the difference between the light amount distributions 82 and 81, the light amount change ratio from the mode without light shield (input) is calculated. When the light amount change ratio is calculated in this way, the influence of, e.g., partial nonuniformity of the light amount distribution can be removed.

A pixel number on the line CCD 104 where the light amount changes is specified by using a threshold value with respect to the calculated light amount change ratio. When information such as a detection signal level is used, finer pixel information than a pixel number can be specified. The ends of the light-shielded range can be determined from the pixel numbers. For example, the median (the pixel number of the line CCD 104) of the light-shielded range is derived as the angle information of the pointer.

To calculate an actual coordinate value from obtained pixel numbers, the pixel numbers must be converted into angle information ($\theta$). Conversion to angle information can be implemented by using, e.g., a polynomial. For example, letting e be the CCD pixel number, n be the order, and Tn be the coefficient of each order, the angle $\theta$ can be calculated by $$\theta = Tn \cdot e^n + T(n-1) \cdot e^{(n-1)} + T^{(n-2)} \cdot e^{(n-2)} + \ldots, + T0 \qquad (1)$$

The coefficient of each order can be determined from the actual measurement value or design value. The order is determined in consideration of the required coordinate accuracy or the like.

As described above, the sensor unit 1L includes two light receiving units L1 and L2. The above-described processing of determining the ends of the light-shielded range is executed first for the light receiving unit L1, i.e., the light receiving unit that detects the light amount distribution of the portion A in FIG. 8. For the portion A, the processing of calculating the light amount distribution difference and the change ratio is executed for all data corresponding to the portion A stored in the memory 132.

For the light amount distribution of the portion B corresponding to the light receiving unit L2, the above-described calculation processing is not executed for all data corresponding to the portion B stored in the memory 132 to shorten the process time. In this case, a limited search range to execute light-shielded range search is determined from the light-shielded range search result of the portion A. The same calculation processing as in the light-shielded range search processing of the portion A is executed in the obtained search range, thereby determining the CCD pixel number corresponding to an end of the light-shielded range and calculating angle information.

Figure 9:
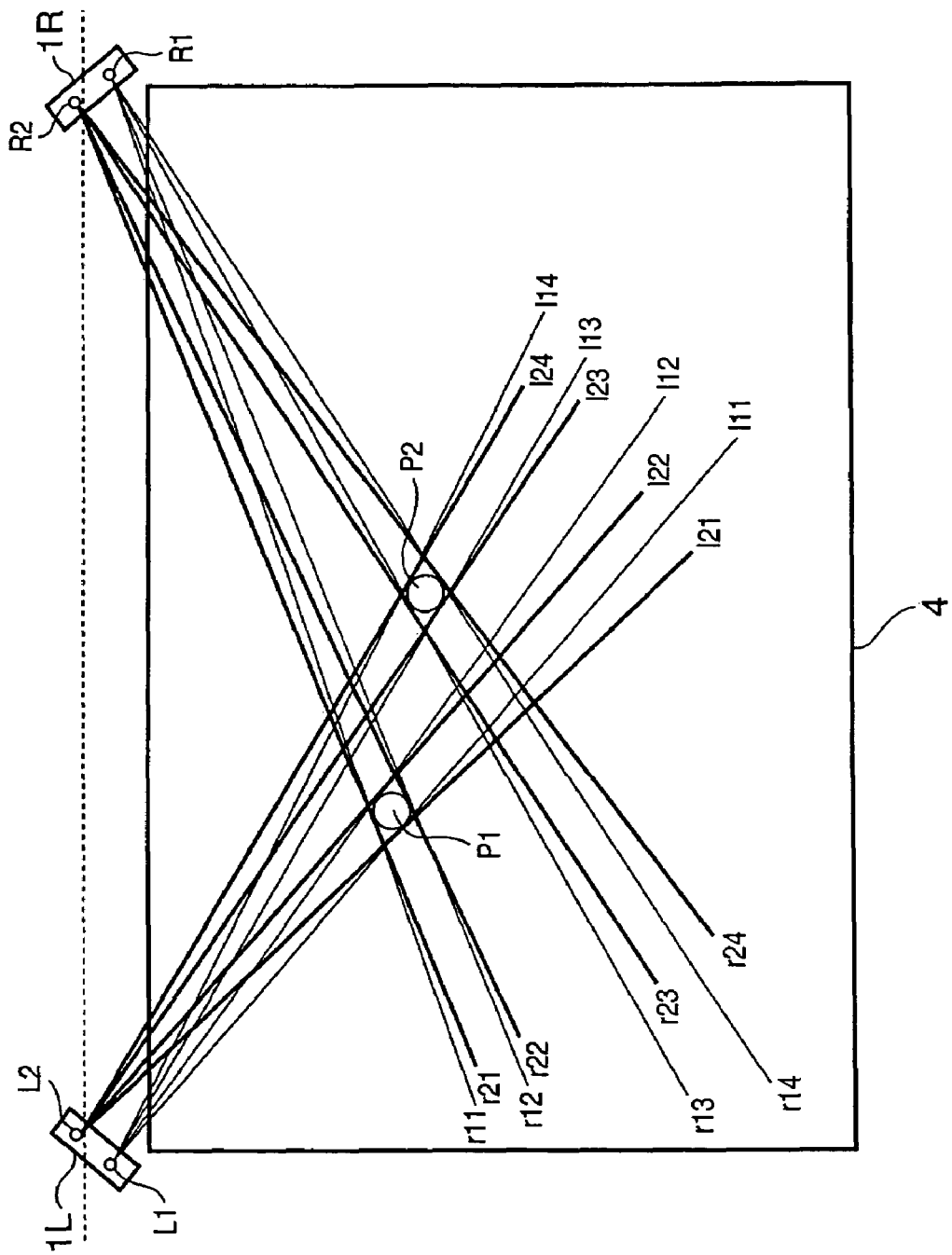
FIG. 9 is a view for explaining light-shielded range detection according to the first embodiment of the present invention.
Figure 10A:
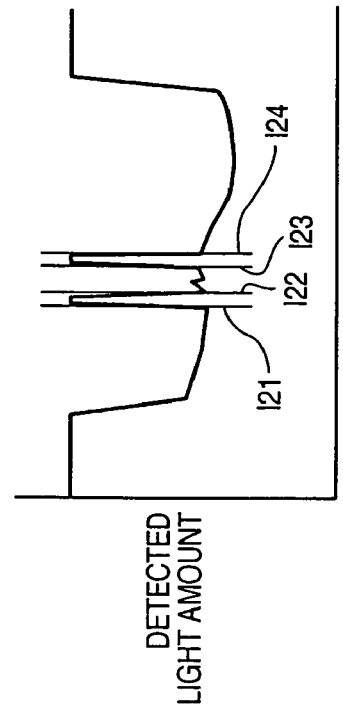
FIGS. 10A to 10D are graphs for explaining light-shielded range detection according to the first embodiment of the present invention.
Figure 10B:
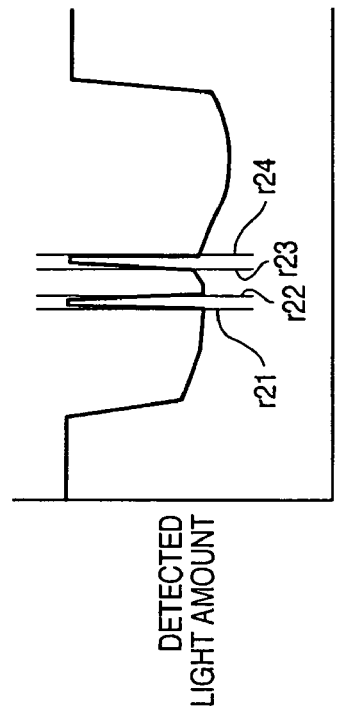

Assume that two points P1 and P2 are input, as shown in FIG. 9. The light receiving unit L1 of the sensor unit 1L corresponding to the light amount distribution of the portion A in FIG. 8 detects two light-shielded ranges, as shown in FIG. 10A. The light receiving unit L1 shown in FIG. 9 detects the light amount distribution data by the above-described calculation processing as pieces of light-shielded range end information 111, 112, 113, and 114, as shown in FIG. 10A. Similarly, a light receiving unit R1 of the sensor unit 1R detects pieces of light-shielded range end information r11, r12, r13, and r14, as shown in FIG. 10B.

Figure 10C:
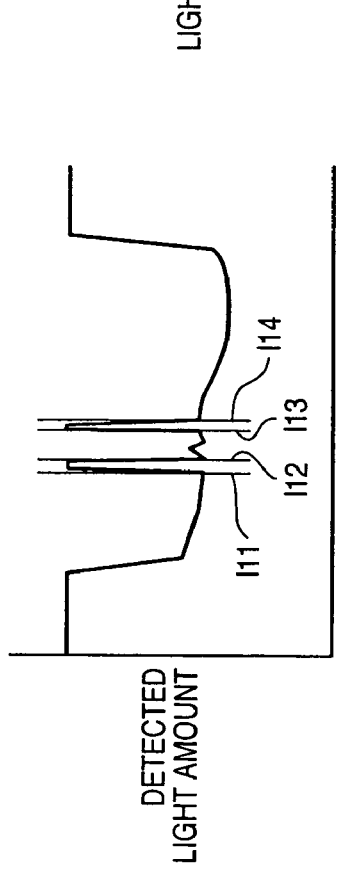

As described above, in each of the sensor units 1L and 1R, two optical systems are formed on the same line CCD while being spaced part by a predetermined distance. Hence, the light-shielded range end information to be detected by the light receiving unit L2 can be predicted from the light-shielded range end information detected by the light receiving unit L1. More specifically, a start poi is determined from the CCD pixel numbers determined by the above-described processing. The ends of the light-shielded range of the portion B, i.e., CCD pixel numbers corresponding to 121, 122, 123, and 124 (FIG. 10C) in FIG. 9 are determined by the same calculation processing as in the light-shielded range search processing of the portion A, and angle information is calculated.

Figure 10D:
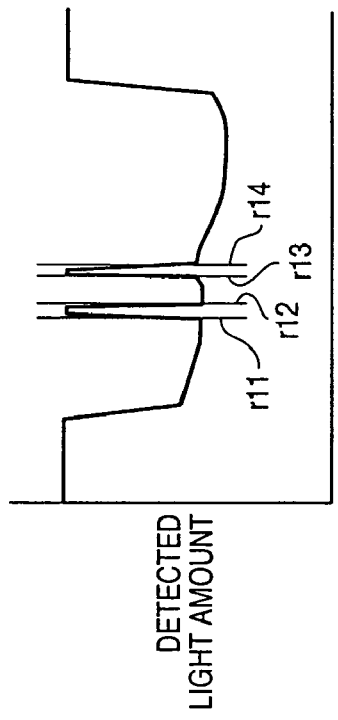
Figure 12A:
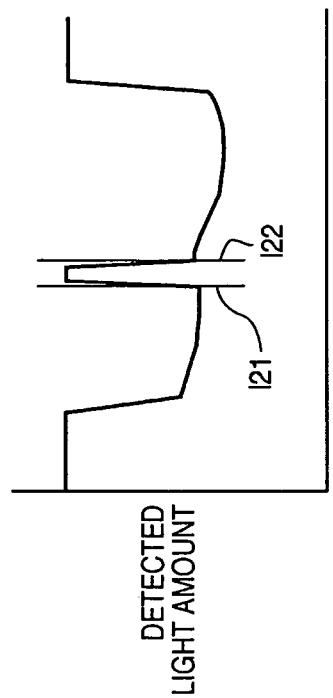
FIGS. 12A to 12D are graphs for explaining light-shielded range detection according to the first embodiment of the present invention.
Figure 12B:
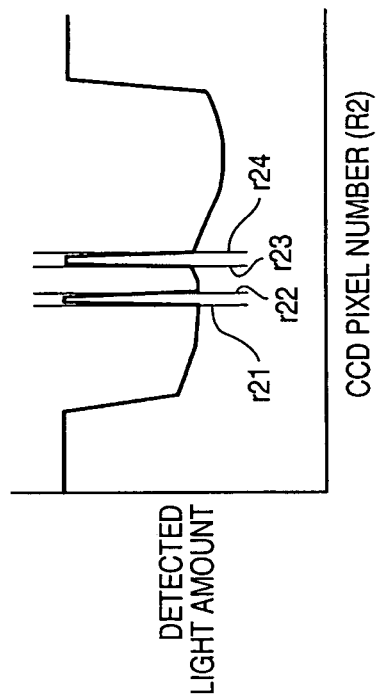
Figure 12C:
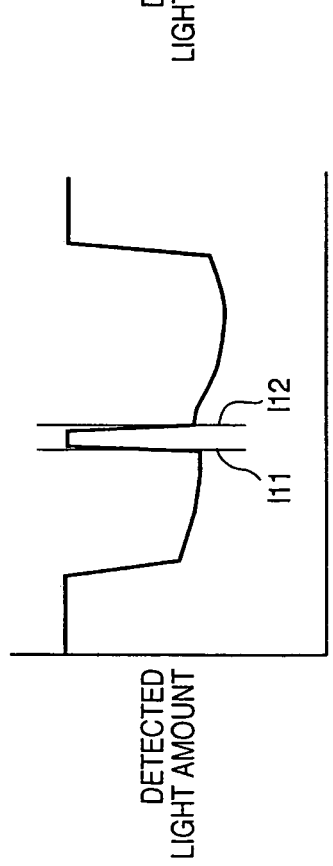
Figure 12D:
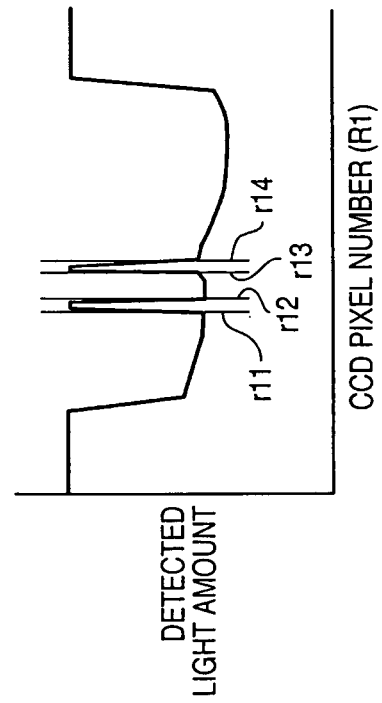

The same light-shielded range search processing as described above is executed for the light receiving unit R2 to determine CCD pixel numbers corresponding to r21, r22, r23, and r24 (FIG. 10D) and calculate angle information. In the above-described way, the angle information of the light-shielded range ends to calculate the plurality of input points P1 and P2 can be detected.

After the light-shielded range search start point is determined, the light-shielded range search processing is executed continuously until the two light-shielded range ends are detected. The light-shielded ranges detected by the light receiving units L1 and L2 and light receiving units R1 and R2 are almost equal. For this reason, after one light-shielded range end is detected, data of a predetermined number of pixels (width information calculated from the light-shielded range ends of each of the light receiving units L1 and R1) may be skipped, and the light-shielded range search processing may be started again. This processing is particularly effective when the distance between an input point and a sensor unit is relatively short, and the light-shielded range is wide.

A "partial eclipse" state will be described next with reference to FIGS. 11 and 12A to 12D, in which light-shielded ranges detected by the light receiving unit L1 are recognized as one light-shielded range because the input points P1 and P2 overlap.

In this case, one light-shielded range is detected by the light receiving unit L1. First, CCD pixel numbers corresponding to the ends 111 and 112 (FIG. 12A) of the light-shielded range are determined to calculate angle information. The light-shielded range search start point of the light receiving unit L2 is determined by using 111 and 112. CCD pixel numbers corresponding to the ends 121 and 122 (FIG. 12B) of the light-shielded range detected by the light receiving unit L2 are determined to calculate angle information.

Similarly, CCD pixel numbers corresponding to the ends r11, r12, r13, and r14 (FIG. 12C) of the light-shielded ranges detected by the light receiving unit R1 are determined to calculate angle information. The light-shielded range search start point of the light receiving unit R2 is determined. CCD pixel numbers corresponding to the ends r21, r22, r23, and r24 (FIG. 12D) of the light-shielded ranges detected by the light receiving unit R2 are determined to calculate angle information.

The light-shielded range search processing, i.e., CCD read is executed first for the light receiving unit L1 and then for the light receiving unit L2. However, the order is not limited to this. For example, if one of the two light receiving units can receive light all over the coordinate input effective region, and the other can secondarily receive light in a limited region of the coordinate input effective region, the light-shielded range search processing may be executed first for the data of the light receiving unit capable of receiving light all over the coordinate input effective region. This arrangement is advantageous in increasing the sampling rate if it is mainly used for simple one-point input because the light-shielded range search processing need be executed for only the data of the light receiving unit capable of receiving light all over the coordinate input effective region.

<Description of Coordinate Calculation Method>

A coordinate calculation method of calculating the position coordinates of a pointer on the basis of angle information (θ) converted from pixel numbers will be described next.

When the pointer inputs one point, coordinates can be calculated by using the angle of the center of the light-shielded range obtained on the basis of the output results of the sensor units 1L and 1R.

The positional relationship between coordinates defined on the coordinate input effective region 3 and the sensor units 1L and 1R and the coordinate system will be described with reference to FIG. 13.

Figure 13:
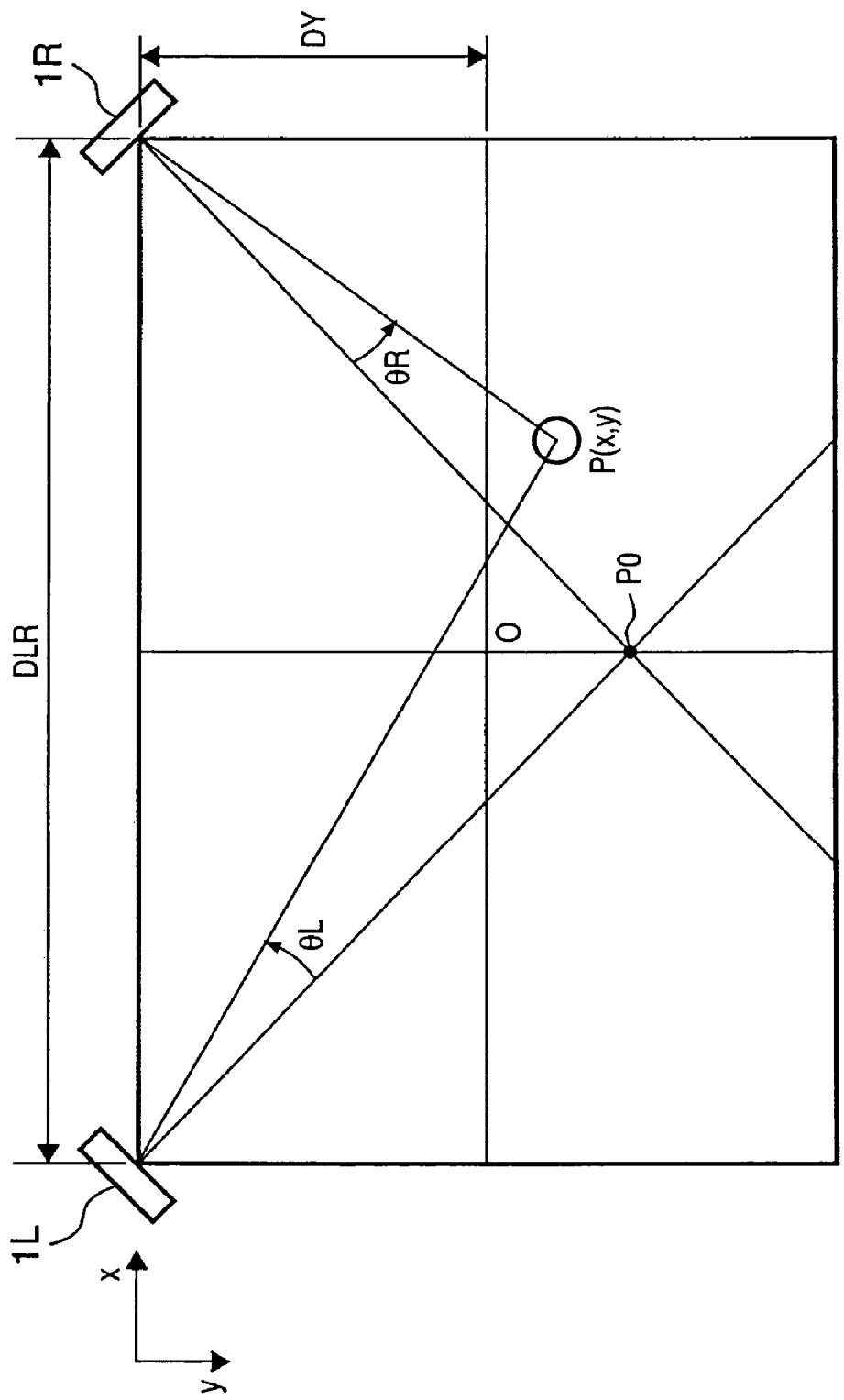
FIG. 13 is a view showing the positional relationship between coordinates defined on a coordinate input effective region and sensor units 1L and 1R according to the first embodiment of the present invention.

FIG. 13 is a view showing the positional relationship between coordinates defined on the coordinate input effective region and the sensor units 1L and 1R according to the first embodiment of the present invention.

Referring to FIG. 13, the X-axis is defined in the horizontal direction of the coordinate input effective region 3, and the Y-axis is defined in the vertical direction of the coordinate input effective region 3. The center of the coordinate input effective region 3 is defined to an origin position O(0,0). The sensor units 1L and 1R are attached to the left and right ends of the upper side of the coordinate input range of the coordinate input effective region 3 to be symmetrical about the Y-axis. The distance between the sensor units 1L and 1R is DLR.

The light receiving-surface of each of the sensor units 1L and 1R is arranged such that its normal direction makes an angle of 45° with respect to the X-axis. The normal direction is defined as 0°.

As for the sign of the angle, the clockwise direction is defined as "+"+for the sensor unit 1L arranged on the left side, and the counterclockwise direction is defined as "+" for the sensor unit 1R arranged on the right side.

P0 is the intersection of the normals to the sensor units 1L and 1R, i.e., the intersection of the reference angle. The Y-coordinate distance from the sensor unit 1L (1R) to the origin is set to DY. At this time, letting θL and θR be angles obtained by the sensor units 1L and 1R, coordinates P(x,y) of a point P to be detected are given, using tan θL and tan θR, by $$x = DLR/2 * (\tan \theta L + \tan \theta R)/(1 + (\tan \theta L * \tan \theta R)) \quad (2)$$

$$y = DLR/2 * ((1 + \tan \theta L)(1 + \tan \theta R))/(1 + (\tan \theta L * \tan \theta R)) - DY \quad (3)$$

Angle data is acquired as an angle from the reference angle. When the angle is thus set, the value tan θ falls within the range of ±π/4 so that coordinates can stably be calculated. If calculation is stable even when θ=π/2, calculation may be done by using an angle with respect to the line connecting the light receiving units at the same height (same level). For example, the following correction calculation can be done on the basis of such angle definition.

The two light receiving units of the sensor unit 1L (1R) are actually not provided on the same line with respect to the coordinate input surface. For this reason, if data of the light receiving units at different positions are to be used in calculating coordinates, the position shift need be corrected.

Figure 14:
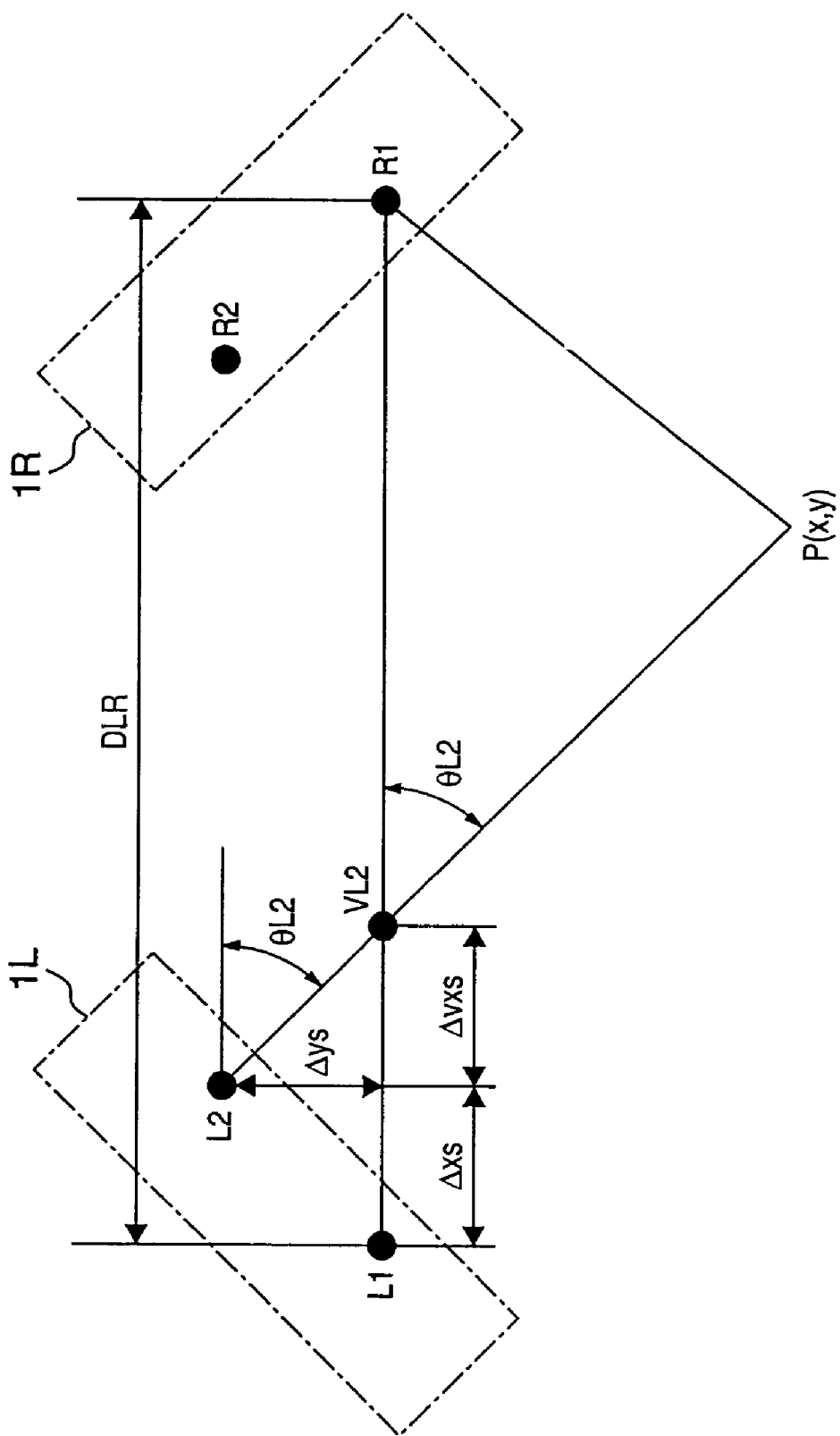
FIG. 14 is a view for explaining coordinate calculation in sensor units each having a plurality of light receiving units according to the first embodiment of the present invention.

As shown in FIG. 14, let L1 and L2 be the pupil positions of the two light receiving units of the sensor unit 1L and R1 and R2 be the pupil positions of the two light receiving units of the sensor unit 1R. Let Δxs be the X-direction distance, i.e., the X-direction difference between L1 and L2, and Δys be the Y-direction distance, i.e., the Y-direction difference between L1 and L2.

Assume that data detected at L2 is θL2. The sensor unit 1L can virtually be regarded to be present at a position VL2 when viewed from the same level as R1 in the X-direction. Hence, Δvxs can be calculated by using θL2.

For conversion to the same level as R1, the distance is given, by using the distance Δys in the height direction and the obtained angle θL2, by $$\Delta vxs = \Delta ys / \tan \theta L2$$

The distance DLR between the sensor units represented by equations (2) and (3) can be corrected by the X-direction distance Δxs between the pupil positions L1 and L2 of the light receiving unit and the calculated distance Δvxs. Hence, a temporary coordinate value can be calculated. The x-coordinate of the temporarily calculated coordinate value is calculated by setting the intermediate point between VL2 and R1 to the origin. When (Δxs+Δvxs)/2 is further corrected on the basis of the x-coordinate, coordinates can be calculated by using the data of the light receiving unit at a different position.

When one point is input, coordinates can be calculated even by using the angle of the center of the light-shielded width (light-shielded range). However, this method cannot be used for calculation if there are inputs from a plurality of pointers, and detection signals (light amount distributions (light-shielded ranges)) of the two light receiving units in the sensor unit 1L overlap, as shown on the upper side of FIG. 15.

Figure 15:
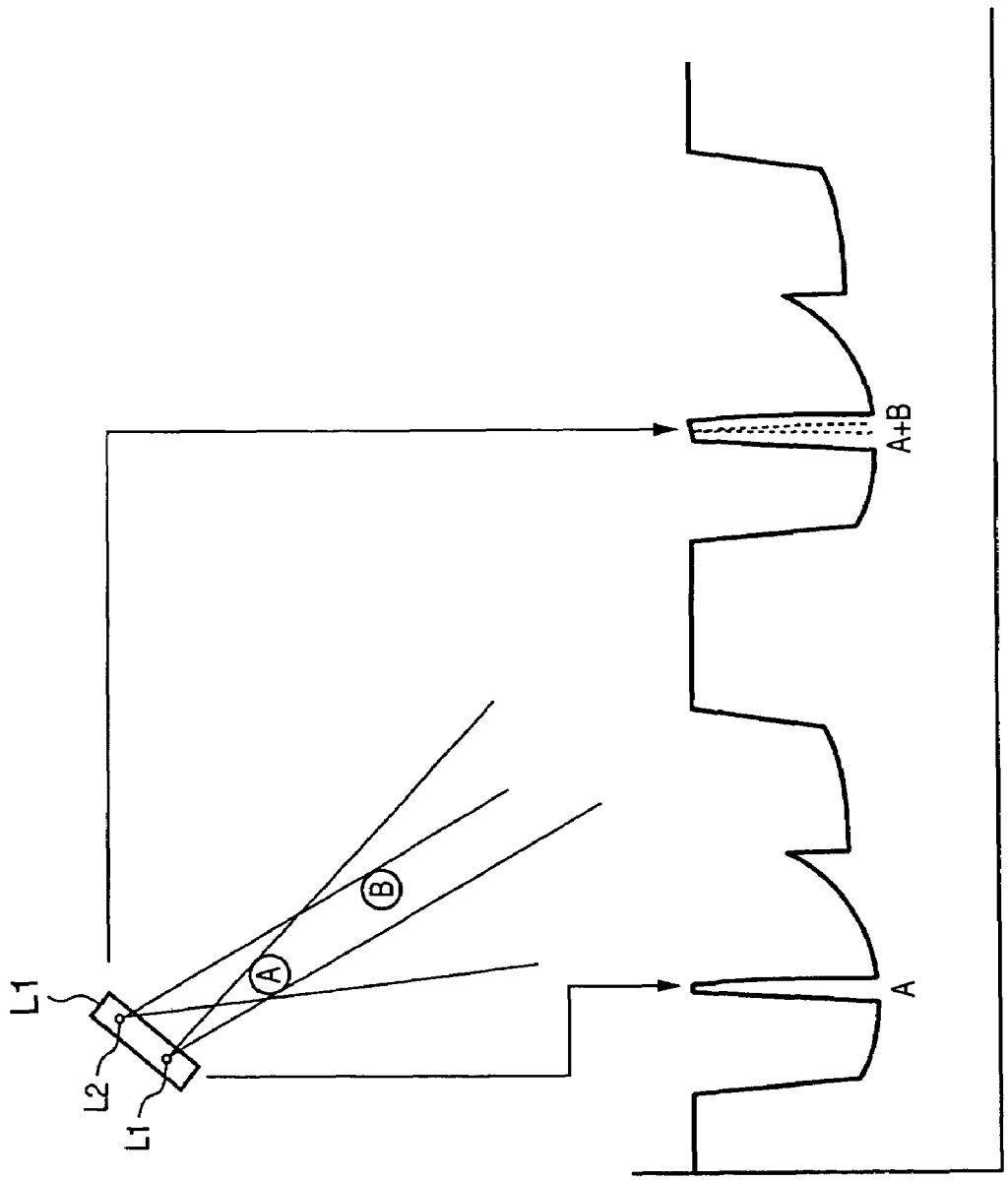
FIG. 15 is a view showing an example of the positional relationship and detection signal in an input operation from a plurality of pointers according to the first embodiment of the present invention.

For example, in the state shown on the upper side of FIG. 15, the pointer B is completely hidden by the pointer A for the left light receiving unit L1 of the sensor unit 1L. For the other light receiving unit L2, the light-shielded ranges of the pointers B and A continue.

The output signal at this time is shown on the lower side of FIG. 15. The output signal from the light receiving unit L1 contains only the light-shielded range (A) of the pointer A. The output signal from the light receiving unit L2 indicates that the light-shielded ranges (A+B) of the pointers A and B are connected. In such a case, accurate input coordinates cannot be calculated by the method using the center of the light-shielded range.

In this case, coordinates are calculated by using the angle information of the ends of light-shielded ranges detected by the sensor units 1L and 1R.

Figure 16:
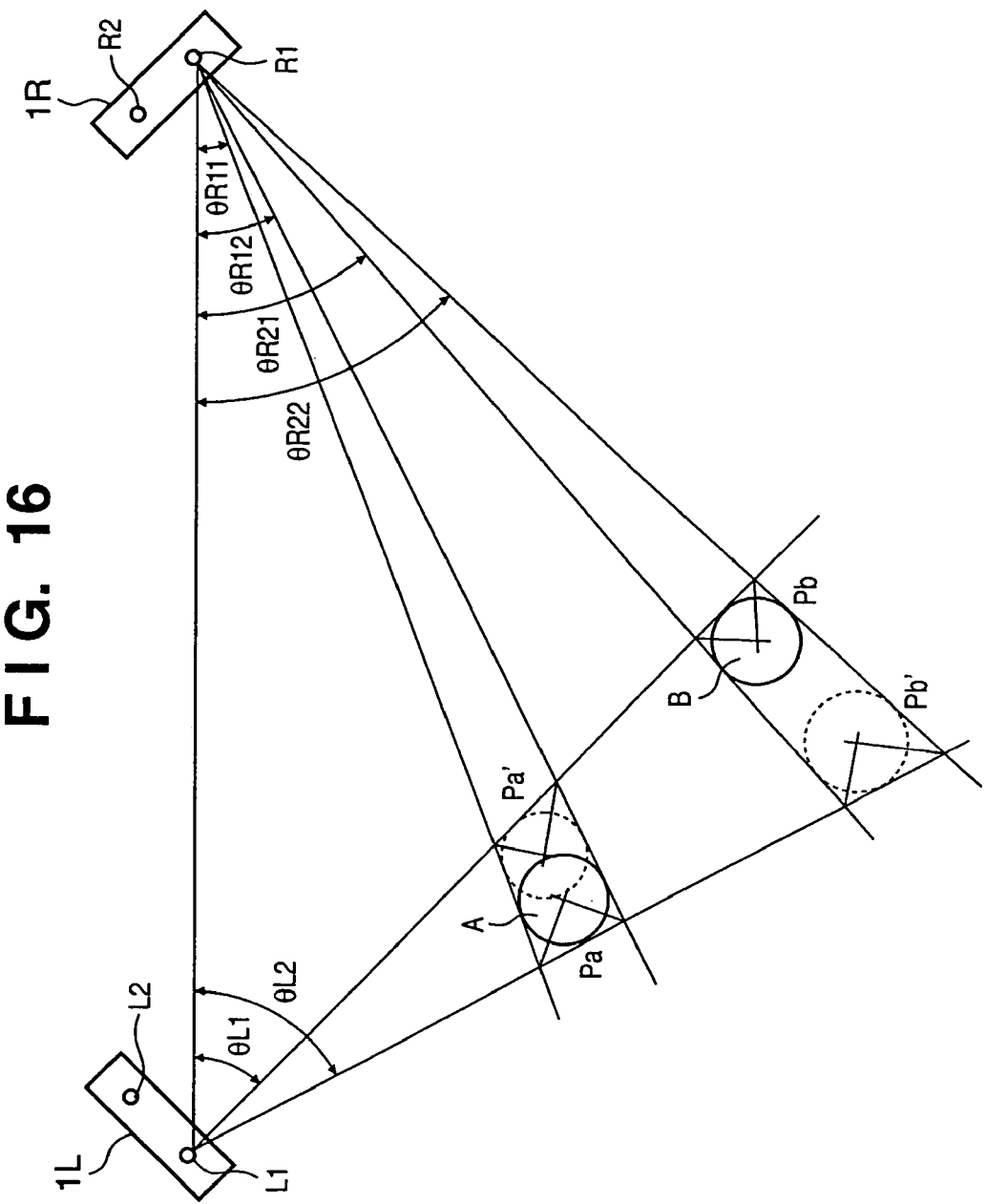
FIG. 16 is a view for explaining truth determination according to the first embodiment of the present invention.

The input shape of the pointer is almost circular. Assume that the pointers A and B partially overlap with respect to one light receiving unit L1 in the sensor unit 1L, as shown in FIG. 16. That is, the light receiving unit L1 observes a light-shielded range defined by θL1 and θL2.

Of the pieces of angle information of the ends of two light-shielded ranges obtained by each light receiving unit, the minimum angle θL2 in the light receiving unit L2 and the maximum angle θL1 in the light receiving unit L1 with respect to angles viewed from the horizontal direction are selected.

Angles observed by, e.g., the light receiving unit R1 in the sensor unit 1R correspond to the ends of light-shielded ranges formed by the pointers. For angles θR11 to θR22 are observed.

Figure 17:
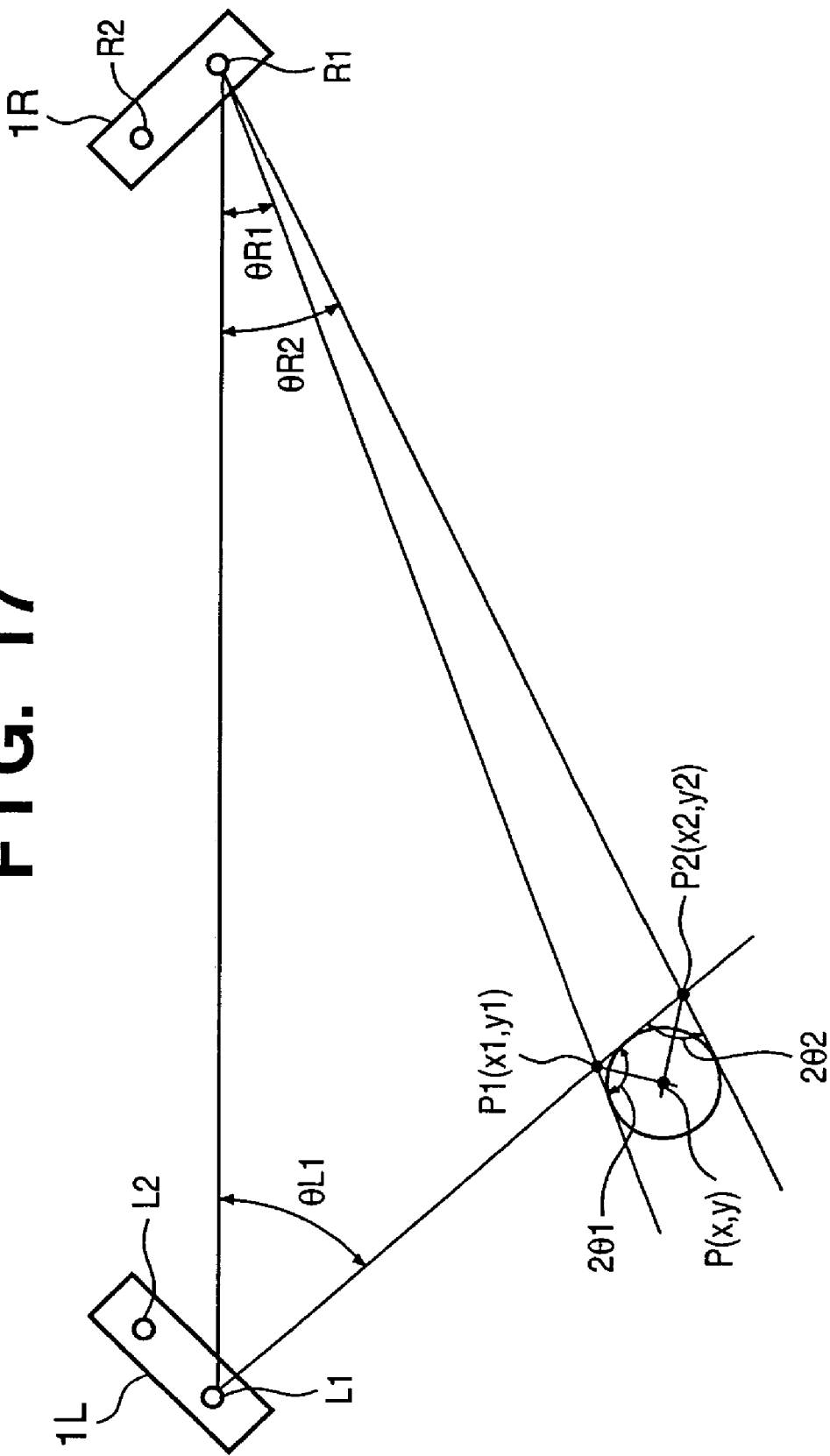
FIG. 17 is a view for explaining an example of coordinate calculation based on the end information of a light-shielded range according to the first embodiment of the present invention.

FIG. 17 is a view for explaining coordinate calculation using the ends of a light-shielded range.

For example, assume that the point P is input. Let P1(x1, y1) and P2(x2,y2) be the intersections between θL1, θR1, and θR2. The coordinate point P of the input position can be calculated as the intersection of bisectors of angles 2θ1 and 2θ2 at the respective intersections.

The coordinate values of P1 and P2 can be calculated by the same equations (2) and (3) as those used to calculate the above-described coordinates of the intersections of the angles. Hence, the input coordinates P(x,y) can be calculated by using the coordinate values and angle information.

As described above, when the pieces of end information of light-shielded ranges detected by the left and right sensor units 1L and 1R are used, the coordinates of an input point can be calculated without using the median of the light-shielded range.

Figure 18:
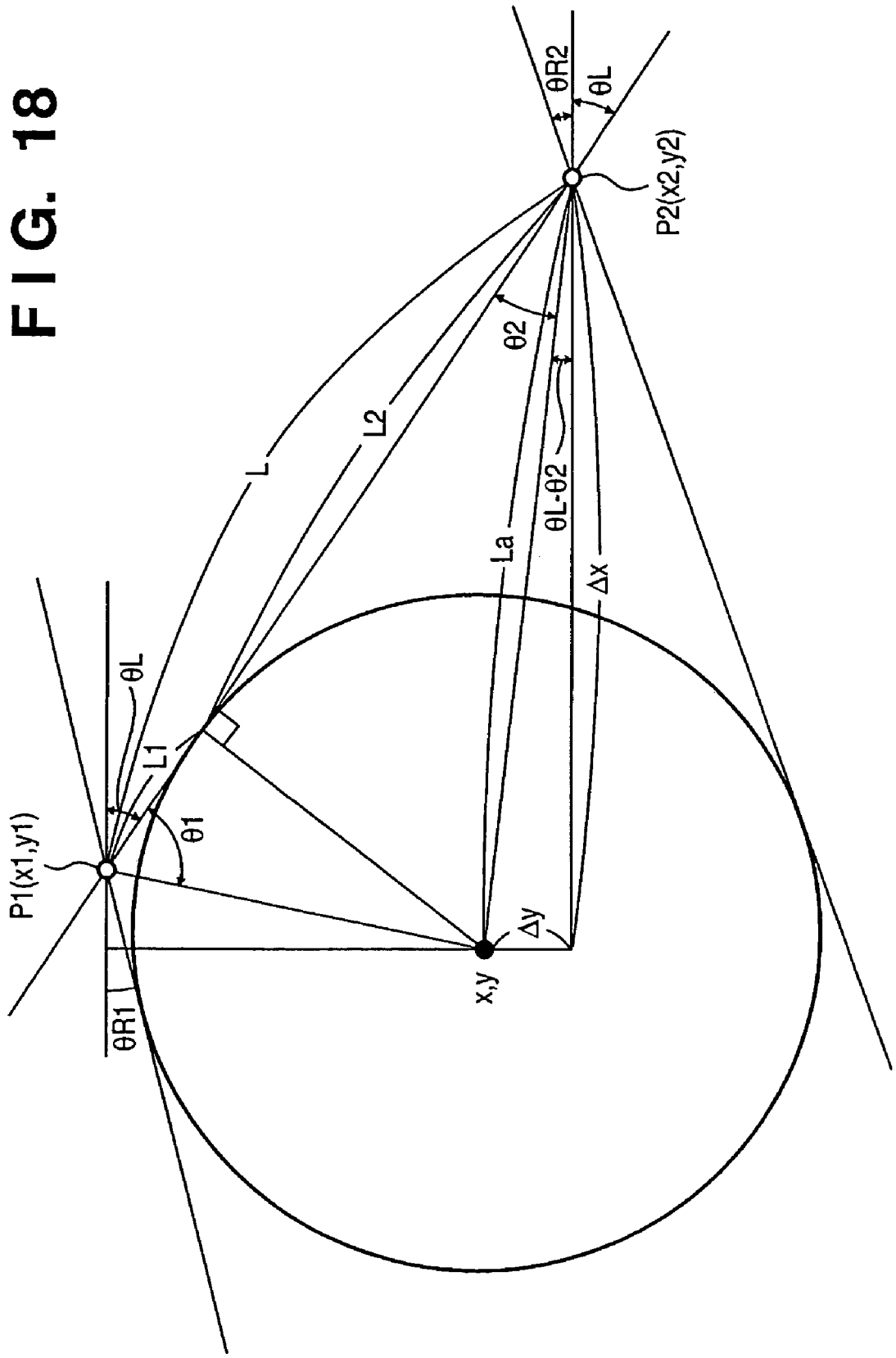
FIG. 18 is a view for explaining the relationship between the coordinate values and the bisectors of a light-shielded range end information (angle) overlap portion according to the first embodiment of the present invention.

FIG. 18 is a view for explaining an example of the calculation procedure.

As shown in FIG. 18, let L be the distance between the points P1(x1,y1) and P2(x2,y2), and θ1 and θ2 be the angles of bisectors of the angles at these points.

$$L=((x2-x1)^2+(y2-y1)^2)^{0.5} \quad (4)$$

$$θ1=(π-(θL+θR1))/2 \quad (5)$$

$$θ2=(θL+θR2)/2 \quad (6)$$

In this case, $$L1·\tan θ1 = L2·\tan θ2 \quad (7)$$

Hence, $$L2=L1·\tan θ1/(\tan θ1+\tan θ2) \text{ (where } \tan θ1+\tan θ2≠0) \quad (8)$$

$$La=L2/\cos θ2 \text{ (where } \cos θ2≠0) \quad (9)$$

From the above conditions, Δx and Δy are given by $$Δx=La·\cos(θL-θ2) \quad (10)$$

$$Δy=La·\sin(θL-θ2) \quad (11)$$

The input coordinates P(x,y) are given by $$x=x2-Δx \quad (12)$$

$$y=y2-Δy \quad (13)$$

In a partial eclipse state as shown in FIG. 16, i.e., when the input point on the rear side viewed from, e.g., the sensor unit 1L is not completely hidden by a shadow, unlike a so-called total eclipse state, the input points are defined by the combination of points Pa and Pb or points Pa' and Pb'.

The above-described calculation corresponding to the intersection of bisectors is executed for combinations of θL1, θL2, θR11, θR12, θR21, and θR22. The coordinates of points Pa and Pb or points Pa' and Pb' are calculated, and the combination corresponding to the correct input coordinates is determined.

The combination can be determined by using angle information different from those selected by the light receiving units L1 and L2 in FIG. 16.

Figure 19:
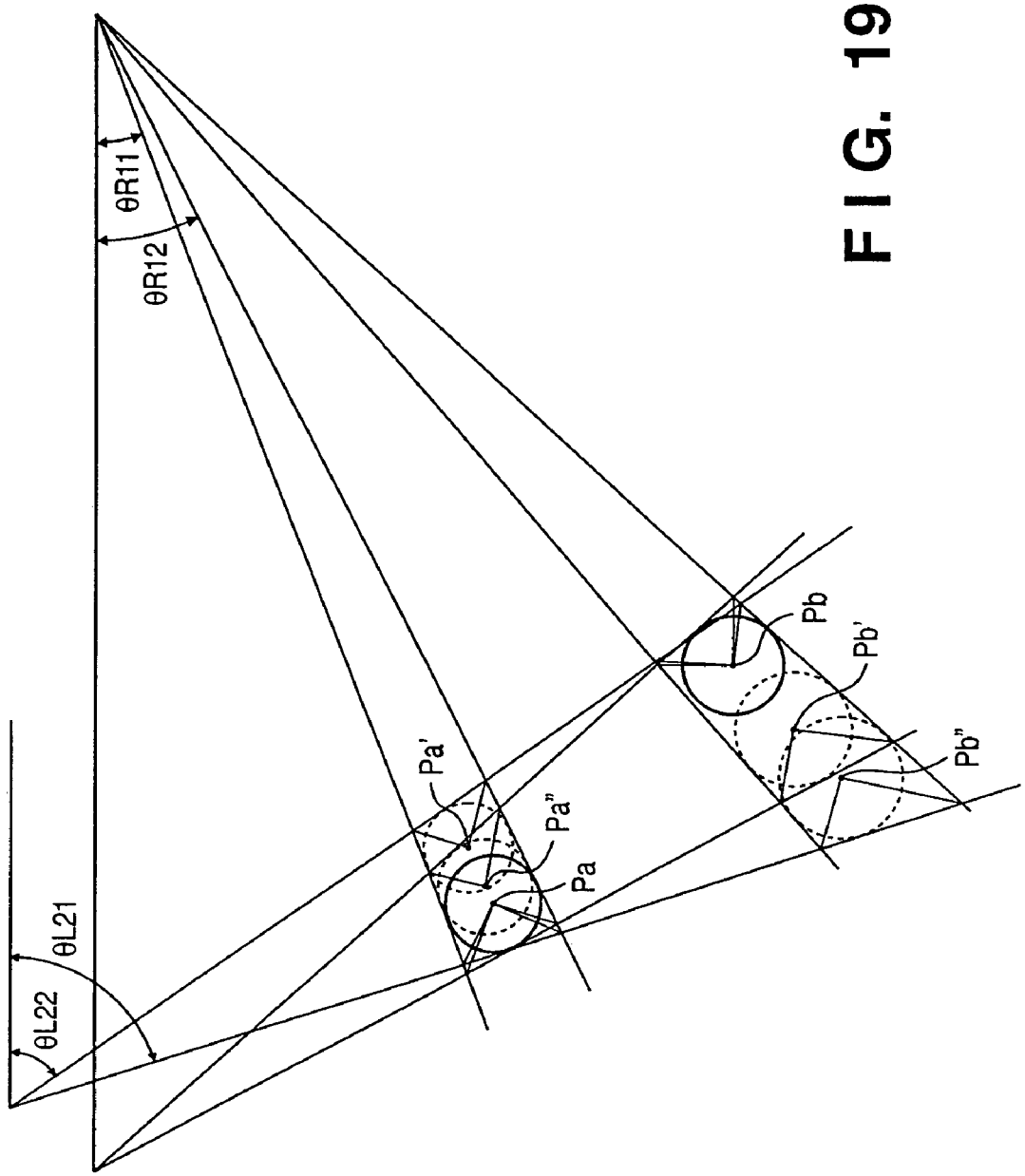
FIG. 19 is a view for explaining truth determination according to the first embodiment of the present invention.

For example, as shown in FIG. 19, the coordinate calculation result by data θL21 and θL22 of the other light receiving unit and θR11 and θR12 is compared with the coordinate calculation result by the above-described light receiving units. Whether the data overlaps Pa or Pa' is determined on the basis of the distances of the points, thereby determining which one of Pa and Pa' is correct. If Pa is employed, Pb is automatically employed as a counterpart.

For more reliable calculation, calculation may be executed for Pb by using the coordinate calculation result by θR21 and θR22.

As described above, in the "partial eclipse" state in which two light-shielded ranges detected by the sensor unit 1L (1R) partially overlap the angles of the ends of the light-shielded ranges are detected, and pieces of information corresponding to bisectors at the intersection are obtained. Hence, a plurality of input point positions can be specified.

In the so-called "total eclipse" state, the position of the input of a pointer hidden by a shadow cannot be specified even by using the end information of light-shielded ranges. To avoid the "total eclipse" state, the distance between the plurality of light receiving units in each sensor unit 1L (1R) is set to an optimum value. In this case, the "partial eclipse" state wherein the regions partially overlap can be obtained in one optical system.

In the present invention, the optical layout of the light receiving units in the sensor unit 1L (1R) is set such that at least one of the two light receiving units provided in the sensor unit 1L (1R) can always detect a "partial eclipse" state or two separated light-shielded ranges regardless of the regions of a plurality of pointers.

As already described above, when both light receiving units in one sensor unit are in an "eclipse" state, a single light-shielded range is detected by both light receiving units of one sensor unit. The number of light-shielded ranges detected by both light receiving units in one sensor unit can be one even in a state (input transition state) until a pointer reaches the input surface and completely forms a shadow. Hence, to calculate the correct coordinates of the pointer, whether it is in an "eclipse" state or "input transition state" must be determined.

Actual calculation will be described below.

As described above, light amount distribution data is acquired from each light receiving unit.

The number of light-shielded ranges is calculated on the basis of the obtained light amount distribution data by using a threshold value or the like. On the basis of the number of light-shielded ranges, a case without input, a case wherein input (single point input) is done at one portion, and a case wherein input (multiple point input) is done at least at two portions can be determined, and data to be used for calculation can also be selected.

FIG. 20 shows combinations of the numbers of light-shielded ranges detected by the light receiving units, in which L1 and L2 represent the two light receiving units in the sensor unit 1L, and R1 and R2 represent the two light receiving units in the sensor unit 1R. When the maximum number of inputs is 2, there are 17 possible combinations of the numbers of light-shielded ranges including a case without input.

When the input is "1" in all the light receiving units L1, L2, R1, and R2, single point input and contact of two inputs are possible. In the first embodiment, the contact will also be handled as single point input. However, if the shape information of a pointer such as the input width of a pointer is known, contact of two inputs may be detected on the basis of the shape information.

When the number of light-shielded ranges is counted, the input state can be determined as "no input", "single point input", or "multiple point input". In "single point input" wherein only one light-shielded range is detected by each sensor unit, coordinate calculation may be done by the coordinate calculation method using the end information of the light-shielded range. Alternatively, coordinate calculation may be executed by calculating the center of the light-shielded range as usual.

In "multiple point input", two light-shielded ranges are detected as separate inputs, or one light-shielded range is detected because of the "eclipse" of input positions with respect to a sensor unit.

In this case, the combination of light-shielded ranges to be used for coordinate calculation is determined from the number of light-shielded ranges.

First, a light receiving unit that has detected two light-shielded ranges is selected. The detection signal from the selected light receiving unit is defined as coordinate-calculation first data. If a plurality of light receiving units have detected two light-shielded ranges, one of them is selected in accordance with a predetermined priority order.

Next, give attention to the detection signals of the light receiving units in the sensor unit different from the sensor unit including the light receiving unit selected as coordinate-calculation first data. Of the pieces of angle information of the ends of the plurality of light-shielded ranges obtained by each light receiving unit, angle information representing the minimum angle in the light receiving unit L2 (or R2) and angle information representing the maximum angle in the light receiving unit L1 (or R1) with respect to angles viewed from the horizontal direction are selected as coordinate-calculation second data that is, of the plurality of pieces of end information detected by the sensor unit, the pieces of angle information of two ends are selected as coordinate-calculation second data.

Of the pieces of angle information of the ends of the plurality of light-shielded ranges obtained by each light receiving unit in the very sensor unit that includes the light receiving unit selected as coordinate-calculation second data, for example, angle information representing the maximum angle in the light receiving unit L2 (or R2) and angle information representing the minimum angle in the light receiving unit L1 (or R1) with respect to angles viewed from the horizontal direction are selected as truth determination data.

This data is used to determine true coordinates because, in the multiple point input mode, imaginary coordinates generated by a combination of detection signals are calculated in addition to actually input coordinates (true coordinates), as described above.

The above-described coordinate-calculation first data, coordinate-calculation second data, and truth determination data are also used to determine whether the detected state is an "eclipse" state or input transition state, as described above.

Determination of the input transition state (determination of validity of a detection state) will be described with reference to FIG. 21.

Figure 21:
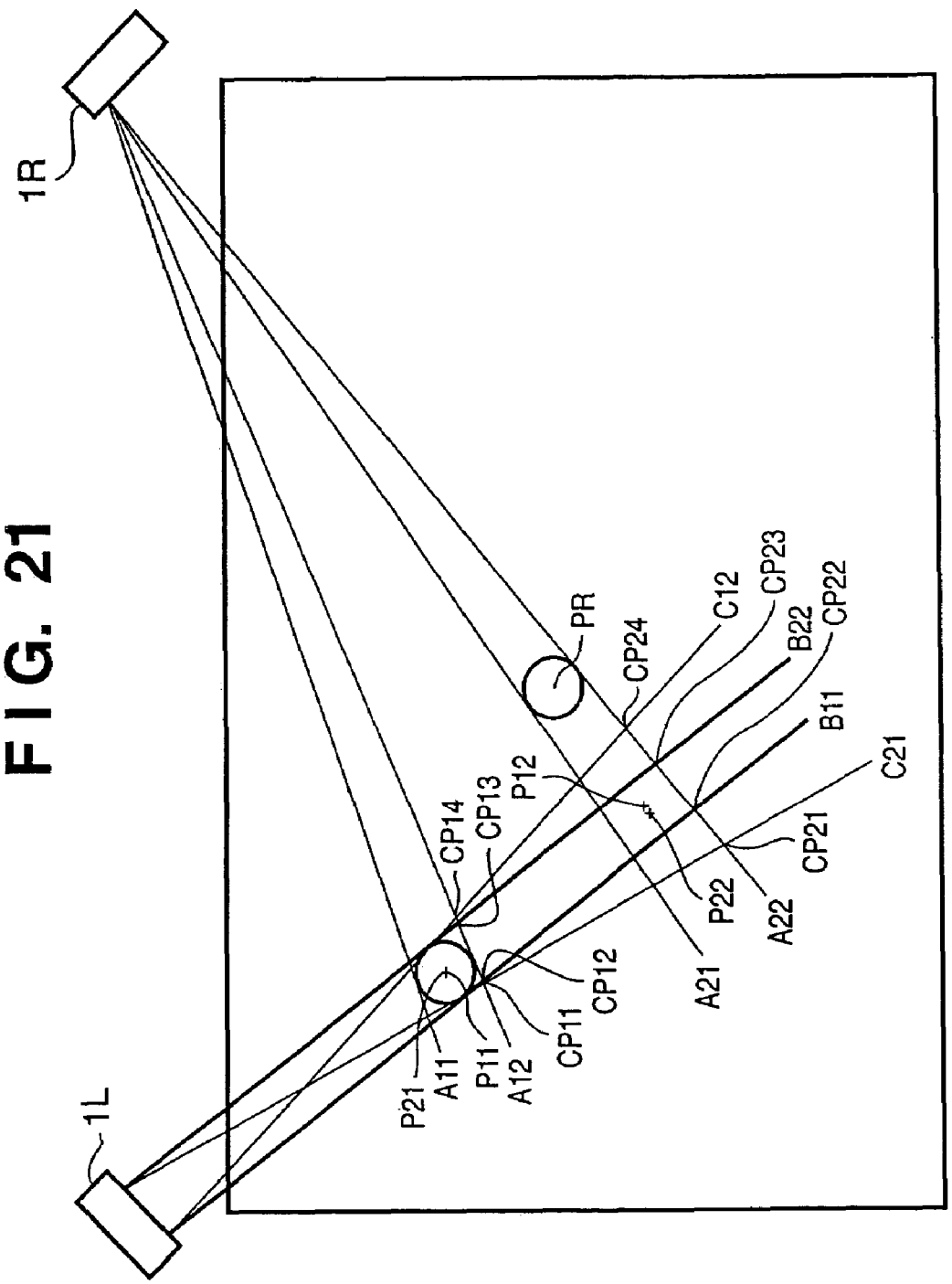
FIG. 21 is a view for explaining input transition state determination based on light-shielded range end information according to the first embodiment of the present invention.

Referring to FIG. 21, tangents A indicate coordinate-calculation first data, tangents B indicate coordinate-calculation second data, and tangents C indicate truth determination data. The input transition state is determined by using these data.

A coordinate value calculated on the basis of pieces of angle information A11, A12, and B11 of the ends of light-shielded ranges is defined as P11. A coordinate value calculated on the basis of pieces of angle information A11, A12, and B22 is defined as P21. As the simplest method, the input transition state can be determined by comparing the two coordinate values P11 and P21. More specifically, when it is determined by comparing the two position coordinates that the distance between the points is shorter than a predetermined distance, the state can be determined as the input transition state. If the points are spaced part by the predetermined distance or more, the state can be determined as normal input.

A more detailed input transition state determination method will be described next.

Intersection coordinate values CP11, CP12, CP13, and CP14 are calculated as the intersections between the previously selected coordinate-calculation first data A12 and the coordinate-calculation second data B11 and B22 and truth determination data C21 and C12.

More specifically, of the light receiving unit data selected as the coordinate-calculation first data, the second angle information from a side near to the other sensor unit is selected. Intersections between this angle information and all pieces of angle information obtained by the selected sensor unit as the coordinate-calculation second data and truth determination data are calculated.

Regarding the obtained intersection coordinates, the distance between CP11 and CP12 and the distance between CP13 and CP14 are calculated. Whether the input transition state is set is determined by comparing the distances.

Let $\Delta L1$ be the distance difference between the intersections CP12 and CP11, and $\Delta L2$ be the distance difference between the intersections CP14 and CP13. In the input transition state, a relationship given by $$\Delta L1 \approx \Delta L2 < K1$$

holds. That is, when both $\Delta L1$ and $\Delta L2$ are smaller than a predetermined value, it is determined that the input transition state is set.

Alternatively, of the coordinate-calculation first data, the angle information A22 which is farthest from the sensor unit different from that selected as the coordinate-calculation first data may be selected, and intersections of the angle information may be calculated in the same way as described above. In this case, the input transition state can be determined when each of the distances to be compared has a predetermined value or more.

Let $\Delta L3$ be the distance difference between intersections CP22 and CP21, and $\Delta L4$ be the distance difference between intersections CP24 and CP23. In the input transition state, a relationship given by $$\Delta L4 \approx \Delta L4 > K2$$

holds. That is, when both $\Delta L3$ and $\Delta L4$ are larger than a predetermined value, it is determined that the input transition state is set.

The values K1 and K2 are predetermined constants which are calculated on the basis of a predetermined diameter of a pointer and the coordinate input effective region and can appropriately be set in determining whether the state is the input transition state. These constants are stored in the memory in shipment from the factory and occasionally read out and used for determination.

Instead of using the constants K1 and K2, determination may be done by comparing the distance differences $\Delta L1$, $\Delta L2$, $\Delta L3$, and $\Delta L4$ between the intersections. In the input transition state, the distance differences $\Delta L1$, $\Delta L2$, $\Delta L3$, and $\Delta L4$ have relationships given by $$\Delta L3 > \Delta L1, \text{ and } \Delta L4 > \Delta L2$$

That is, when the above-described relationships are obtained by comparing the distance differences between the intersections and the coordinate-calculation first data corresponding to each end information of the input nearer to the sensor unit of the coordinate-calculation second data, the state can be determined as the input transition state.

The above-described plurality of kinds of input transition state determination methods are appropriately selected depending on the apparatus in consideration of the determination accuracy and calculation amount.

The above-described input transition state determination can also be used as "total eclipse" state determination. For example, in the above-described coordinate input apparatus, a predetermined coordinate input pointer is used. The distance between the light receiving units in a sensor unit is set to an appropriate value with respect to the diameter of a portion light-shielded by the pointer so that at least one light-shielded end can be detected by each light receiving unit.

However, if input is not done by the predetermined pointer, the input on the rear side may be hidden by a pointer nearer to the sensor unit and detected by neither light receiving units in the sensor unit. That is, a total eclipse may occur. Whether a total eclipse has occurred can also be determined by using the same method as the above-described input transition state determination. If the state is determined as a total eclipse state, the operator is prompted to execute input by using an adequate input pointer by, e.g., notifying him/her of the total eclipse state.

If it is determined by the above-described input transition state determination that not the input transition state but an appropriate coordinate calculation enable state is set, the following processing is executed.

As shown in FIG. 20, a plurality of light shielded ranges are always detected by the light receiving unit selected as the coordinate-calculation first data. However, the light receiving unit selected as the coordinate-calculation second data detects a single light-shielded range or a plurality of light-shielded ranges. That is, there are three types: both of the light receiving units in the sensor unit selected as the coordinate-calculation second data detect a single light-shielded range, one of the light receiving unit detects a single light-shielded range (one of the light receiving unit detects a plurality of light-shielded ranges), and both of the light receiving units detect a plurality of light-shielded ranges.

Figure 22A:
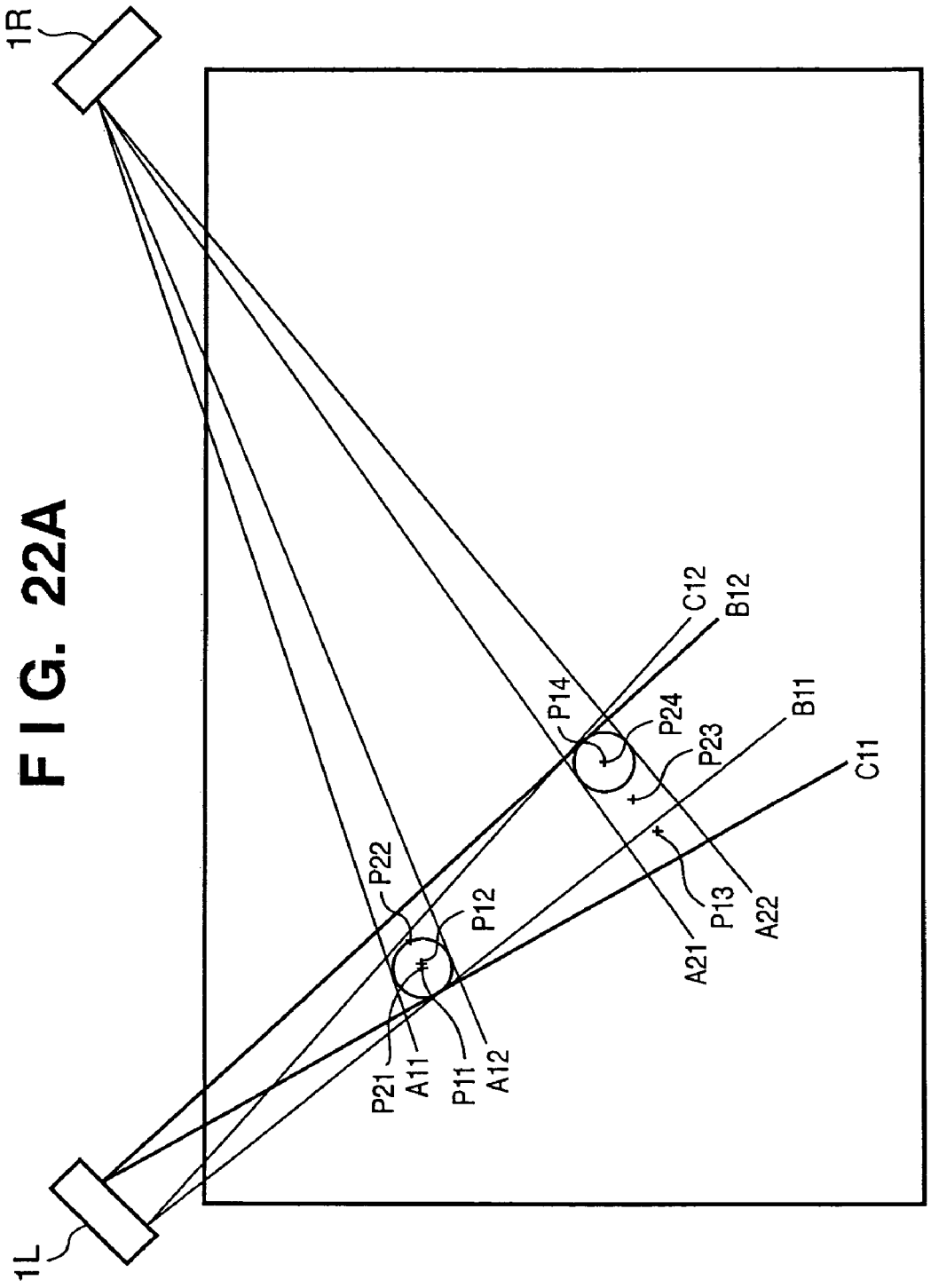
FIG. 22A is a view for explaining an example of coordinate calculation based on light-shielded range end information according to the first embodiment of the present invention.

FIGS. 22A to 22C show examples of input states corresponding to the three types.

Referring to FIGS. 22A to 22C, tangents A indicate coordinate-calculation first data, tangents B indicate coordinate-calculation second data, tangents C indicate truth determination data, and tangents D indicate truth determination spare data (FIGS. 22B and 22C).

First, coordinate calculation is executed by using the above-described end information of light-shielded ranges on the basis of a combination of one light-shielded range of the coordinate-calculation first data, e.g., A11 and A12 in FIG. 22A and the coordinate-calculation second data B11 and B12 and truth determination data C11 and C12.

Let P11 and P12 be the coordinate values calculated by the coordinate-calculation second data B11 and B12, and P21 and P22 be the truth determination coordinate values calculated by the truth determination data C11 and C12. At least two of the four calculated coordinate values almost equal and indicate the position coordinates of a pointer.

The light receiving unit selected as the coordinate-calculation second data detects a plurality of light-shielded ranges or a single light-shielded range. When both light receiving units detect a single light-shielded range, a "total eclipse" state can be included in one of the light receiving units. In this case, some selected angle information can be used for total eclipse on a side near to the sensor unit but not for a far side.

However, as described above, of the plurality of pieces of light-shielded range end information of the selected sensor unit, pieces of angle information corresponding to the data of the two ends are selected as the coordinate-calculation second data. Hence, coordinate candidates can be calculated accurately regardless of a partial or total eclipse.

Next, truth determination of coordinates is executed. This processing may be executed after the coordinates of all combinations are calculated. However, when truth determination is executed for one coordinate value in advance, the processing time can be shortened by omitting unnecessary coordinate calculation.

Which one of the coordinate values P11, P12, P21, and P22 is correct is determined on the basis of the distances therebetween.

The distances between the point P11 and the points P21 and P22 and the distances between the point P12 and the points P21 and P22 are calculated. One of P11 and P12 is selected from the nearest combination as a true coordinate value.

If P11 is selected as the true coordinate value by the truth determination, the remaining uncalculated coordinate value is P14. The coordinate value is calculated. If P12 is selected as the true coordinate value by the truth determination, the coordinates of P13 are calculated.

In this way, the coordinates of an actual input can be determined (truth determination).

Even in the cases shown in FIGS. 22B and 22C, coordinate calculation can be done by executing the same processing as described above. In coordinate calculation, when each of the two light receiving units of one sensor unit detects a plurality of light-shielded ranges, coordinates may be calculated on the basis of either both pieces of end information of the light-shielded ranges or only a piece of end information. Alternatively, the center of a light-shielded range may be calculated and used for coordinate calculation as usual.

Truth determination may be executed by using the angle information of the truth determination spare data D as needed.

Data assignment depending on the number of light-shielded ranges detected by each light receiving unit in a sensor unit will be described. Which light receiving unit and angle information of each sensor unit should be assigned to the coordinate-calculation first data, coordinate-calculation second data, and truth determination data can be calculated by using any one of the combination of L1 and R1 and the combination of L2 and R2 in the single point input mode.

When both of the two light receiving units in each sensor unit detect a plurality of light-shielded ranges, any one of the detection signals can be used as the coordinate-calculation first data.

In the above-described example, angle information different from that selected as the coordinate-calculation second data by the sensor unit different from the sensor unit selected in the coordinate-calculation first data is used as the truth determination data. However, angle information detected by a light receiving unit different from the light receiving unit of the sensor unit selected in the coordinate-calculation first data may be used.

Figure 22D:
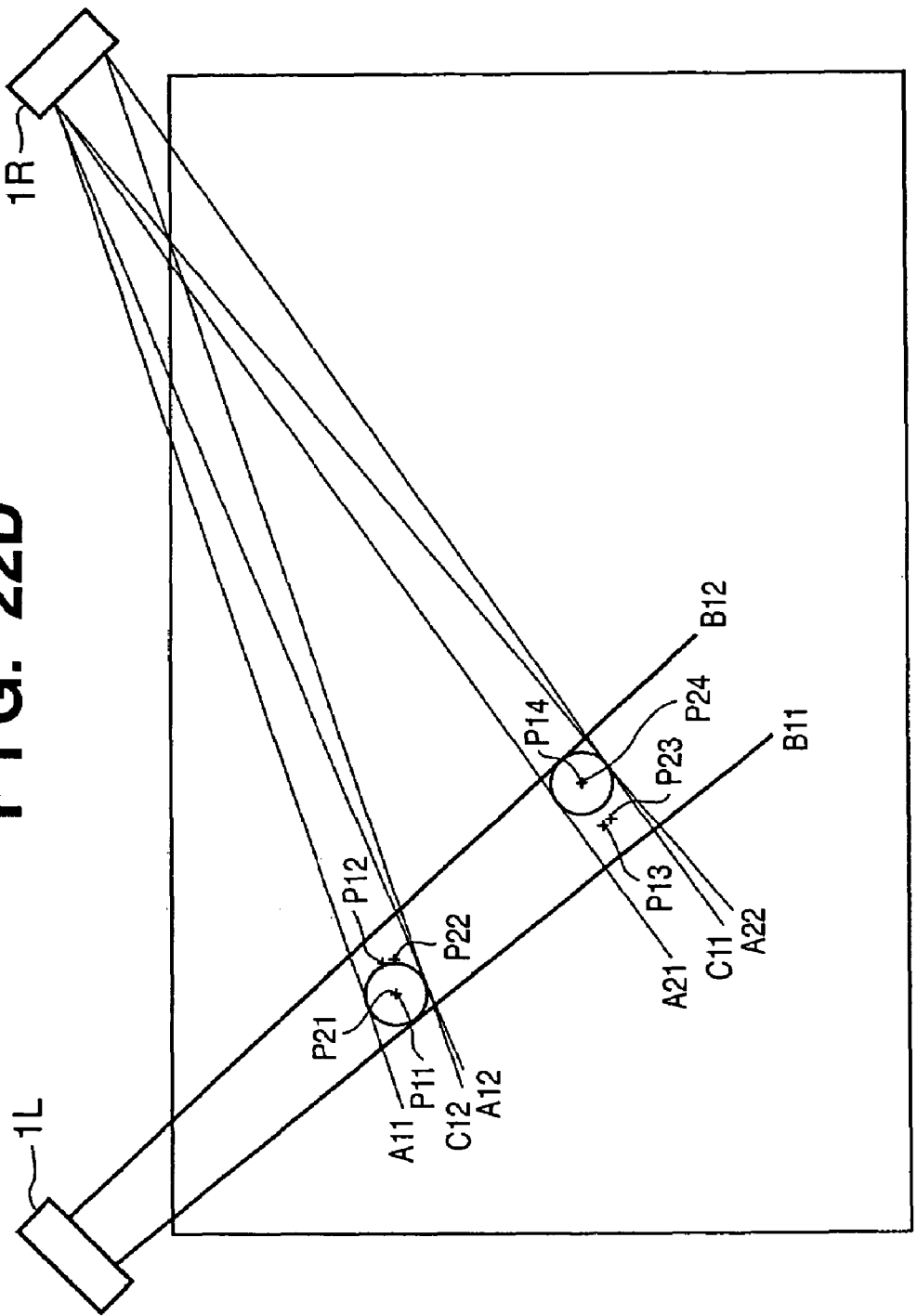
FIG. 22D is a view for explaining an example of coordinate calculation based on light-shielded range end information according to the first embodiment of the present invention.

In this case, P11 and P12 are calculated by using A11, A12, B11, and B12. P21 and P22 are calculated by using B11, B12, C11, and C12, as shown in FIG. 22D.

Which one of the coordinate values P11, P12, P21, and P22 is correct is determined on the basis of the distances therebetween.

As described above, even when the data of the light receiving unit of the same sensor unit as the coordinate-calculation first data is used, the coordinates of an actual input can be determined (truth determination).

<Determination of Continuity of Coordinate Values>

As described above, when sensor units each including a plurality of light receiving units are used, and coordinate calculation and truth determination of coordinates are executed by using the end information of light-shielded ranges, the coordinate values of a plurality of inputs can be determined.

When the plurality of obtained coordinate values are directly output, the receiving-side external terminal may make no distinction between the coordinate values and connect them.

To discriminate two coordinate values, an identifier that indicates the continuity of coordinates is added to each coordinate value to be output.

The continuity of a plurality of coordinate values can be determined by calculating the difference from a previous coordinate value in every sampling and selecting a closer coordinate value.

When a light-shielded range is detected for the first time, e.g.,. an ID number (flag) is added in the order of detection.

Figure 23:
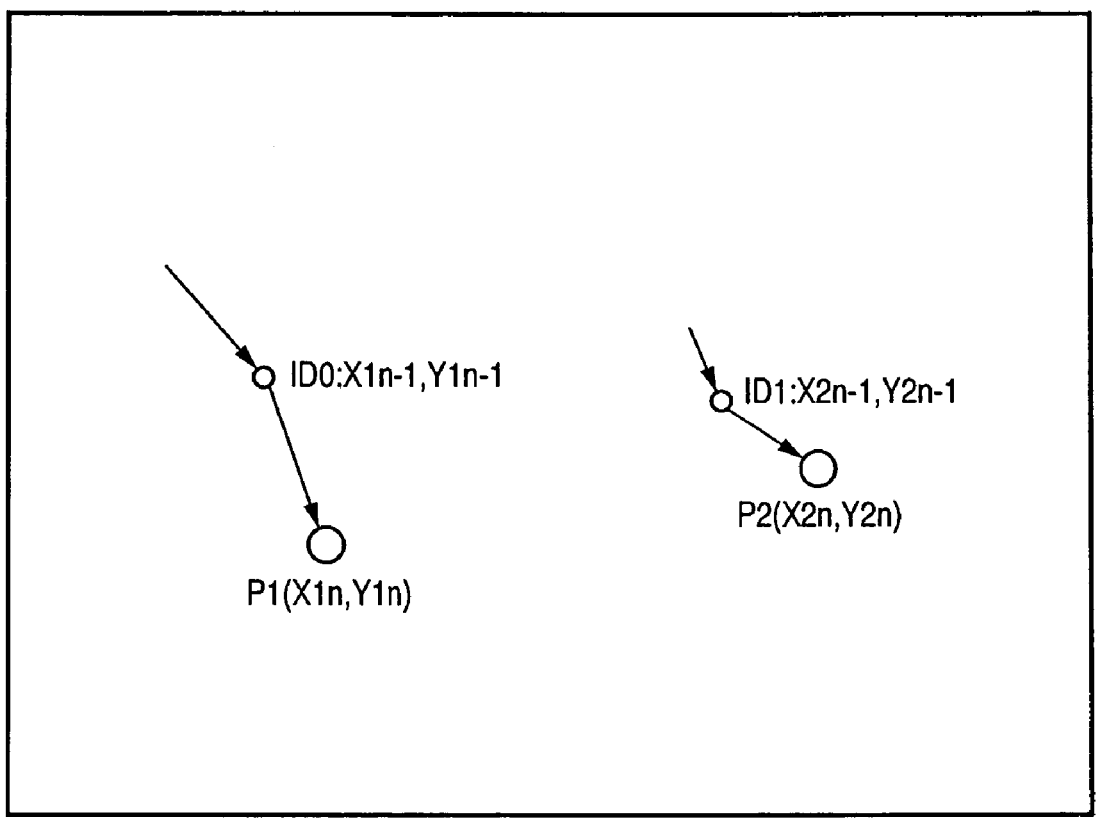
FIG. 23 is a view for explaining coordinate continuity determination according to the first embodiment of the present invention.

Assume that two coordinate values P1(X1$n$,Y1$n$) and P2(X2$n$,Y2$n$) are obtained, and coordinate values in the previous sampling are ID0:X1$n$−1,Y1$n$−1 and ID1:X2$n$−1,Y2$n$−1, as shown in FIG. 23. The differences between each previous coordinate value and the coordinate values P1 and P2 are calculated, and closer coordinate values are employed. P1 is set to ID0, and P2 is set to ID1. In this way, the continuity of coordinate values is determined, and each coordinate value assigned an ID is output.

The external terminal side determines the continuity of coordinate values by referring to the IDs and executes drawing processing by, e.g., connecting the two points by a line.

<Detection of Pen Signal>

When a pen having, e.g., a signal generation unit such as a switch is used as a pointer, smooth input can be performed without a problem of "tailing" in, e.g., character input.

"Tailing" is a phenomenon that in inputting, e.g., character "A", excess loci are displayed immediately before and after touch on the coordinate input surface, and loci different from those intended by the operator are displayed.

Information output from the coordinate input apparatus to the external terminal includes not only coordinate values, as described above, but also switch information (e.g., up-down information S0 corresponding to, e.g., the information of the left button of a mouse and pen side switch information S1 corresponding to the right button of a mouse) obtained from the pointer and the above-described identifier ID representing the continuity of coordinates. Pen ID information unique to each pointer is also included.

The switch information can be output by using a sonic wave, radio wave, or light.

The pen signal receiving unit 5 shown in FIG. 1 receives a signal from a pointer and determines the coordinate value indicated by the signal. The signal is used as a pen up-down signal in transmitting a coordinate value or a button signal of a mouse.

Assignment of information from a pointer to a coordinate value is executed in the following way. When, e.g., light is used, a plurality of pen signal receiving units are provided in correspondence with the coordinate input effective region 3 to obtain signals from different regions.

In this arrangement, when coordinate values by a plurality of pointers are obtained, one of the different regions which corresponds to each coordinate value is determined. Information (switch signal or pen ID information of the pointer) of the signal obtained in that region is associated with the coordinate value. The switch information, pen ID information unique to the pointer, or ID information representing the continuity of coordinate values is added to the coordinate value as supplementary information and output to the external terminal.

Figure 24:
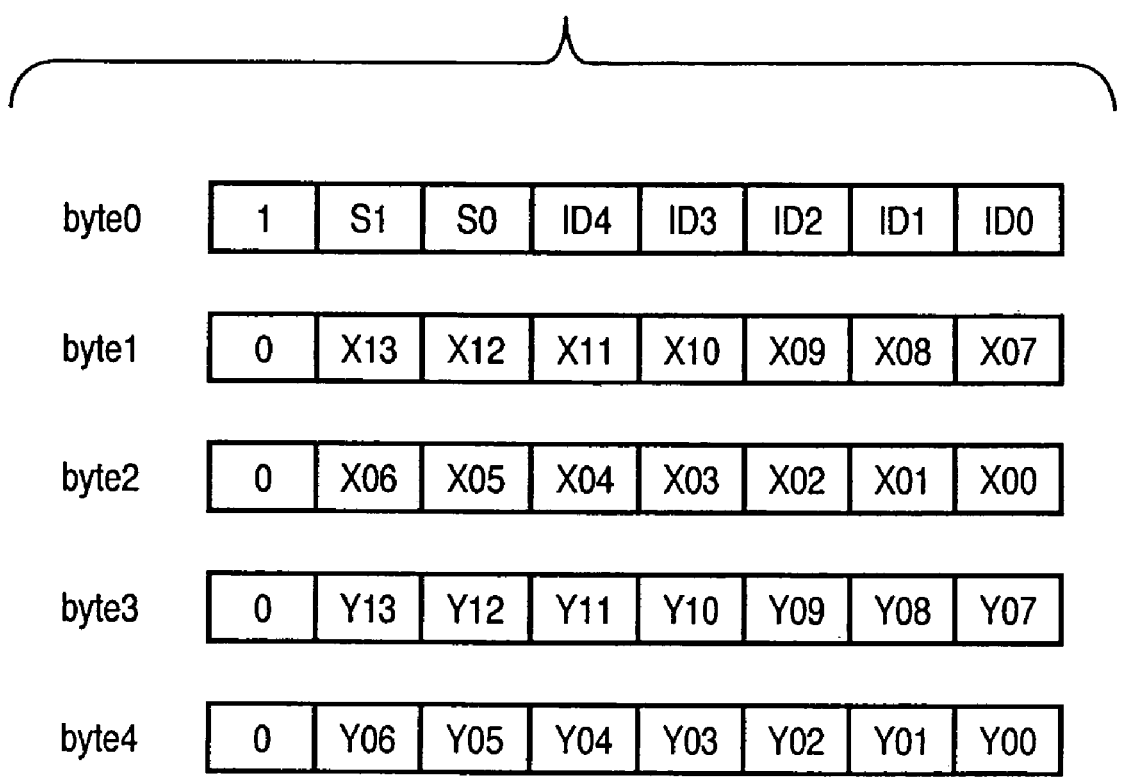
FIG. 24 is a view showing data format examples in coordinate output according to the first embodiment of the present invention.

FIG. 24 shows format examples in outputting such supplementary information and a coordinate value.

Referring to FIG. 24, switch information and pen ID information are added to byte0 as supplementary information. The coordinate values of coordinates (x,y) as the point position of the pointer are stored in byte1 to byte4 and output to the external terminal. The external terminal side analyzes the received data and controls execution of locus drawing and menu operation.

<Description of Coordinate Calculation Processing Flow>

Figure 25:
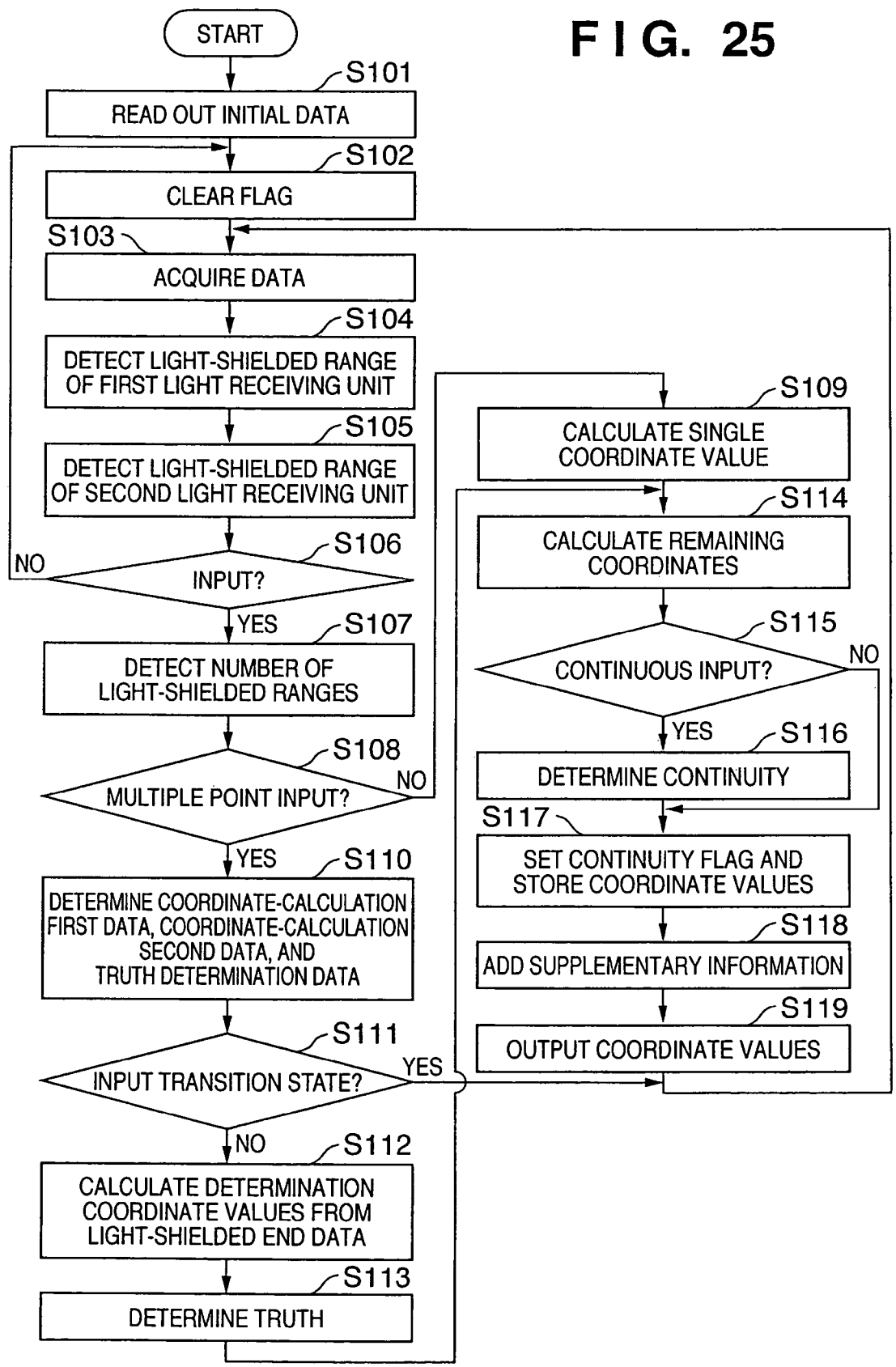
FIG. 25 is a flowchart showing coordinate calculation processing executed by the coordinate input apparatus according to the first embodiment of the present invention.

FIG. 25 is a flowchart showing coordinate calculation processing executed by the coordinate input apparatus according to the first embodiment of the present invention.

FIG. 25 shows procedures from data acquisition to coordinate calculation in the sensor unit.

When the apparatus is powered on, various kinds of initialization of the coordinate input apparatus are executed in step S101, including port setting and timer setting of the control/arithmetic unit 2. Initial data such as reference data and correction constants are read out from a nonvolatile memory and the like and stored in the memory 132 of the control/arithmetic unit 2.

The light amount distribution data 81 without illumination and the light amount distribution data 82 without initial input as shown in FIG. 6 are acquired for each sensor unit and stored in the memory 132 as initial data.

The above-described processing is the initial setting operation upon power-on. This initial setting operation may be performed in accordance with the operator's discretion by operating, e.g., a reset switch provided on the coordinate input apparatus. Next to the initial setting operation, a coordinate input operation by a normal pointer starts.

In step S102, a flag representing whether coordinate input is continuously executed is initialized (cleared). In step S103, the light projecting units of each sensor unit are turned on, and light amount distribution data are acquired by the light receiving units.

In step S104, the difference and ratio of the light amount distribution data acquired by one (first light receiving unit) of the two light receiving units in each of the sensor units 1L and 1R to the above-described initial data are calculated. Light-shielded range detection is executed by, e.g., determining whether the difference or ratio exceeds a threshold value.

In step S105, the light-shielded range search start point (pixel number) of data corresponding to the other light receiving unit (second light receiving unit) is calculated on the basis of the angle information of the light-shielded range detected in step S104. The light-shielded range of the data of the other light receiving unit is detected, as in step S104.

In step S106, the presence/absence of input by the pointer is determined on the basis of the light-shielded range detection result. If no input is present (NO in step S106), the flow returns to step S101. If an input is present (YES in step. S106), the flow advances to step S107.

In step S107, the number of light-shielded ranges for each light receiving unit of the sensor units is detected on the basis of the light-shielded range detection result. In step S108, it is determined on the basis of the detection result of the number of light-shielded ranges whether the input by the pointer is multiple point input. If the input is not multiple point input (NO in step S108), i.e., the input is single point input, the flow advances to step S109 to execute CCD pixel number in the single point input mode. Coordinate calculation at this time can be executed by using either the end information of the light-shielded range or the center of the light-shielded range.

If the input is multiple point input (YES in step S108), the flow advances to step S110 to determine coordinate-calculation first data, coordinate-calculation second data, and truth determination data in accordance with the number of light-shielded ranges. These data are stored in the memory 132.

In step S111, the input transition state is determined on the basis of the data determined in step S110. In the input transition state (YES in step S111), the data in that cycle are invalidated, and the flow returns to step S103. If it is not the input transition state (NO in step S111), i.e., an adequate input state (valid input state), the flow advances to step S112.

In step S112, the end data of each light-shielded range are calculated. Coordinate values and determination coordinate values are calculated from the end data.

When a plurality of light-shielded ranges (input points) are detected, actually input real points and imaginary points are calculated as coordinate values. In step S113, truth determination of coordinate values is executed on the basis of the coordinate values and determination coordinate values.

When true coordinates are determined by truth determination, remaining coordinate values of a counterpart are calculated in step S114. When the coordinate values are determined, the presence/absence of continuous input is determined in step S115. This determination is executed on the basis of a flag representing the presence/absence of continuous input.

If no continuous input is present (NO in step S115), the flow advances to step S117. If continuous input is present (YES in step S115), the flow advances to step S116.

In step S116, continuity is determined on the basis of, e.g., the difference from a coordinate value (e.g., a previous coordinate value) stored before then.

When continuity determination is done, a continuous input flag is set, and the current coordinate value is stored in the memory 132 for the next continuity determination in step S117.

In step S118, supplementary information such as an ID is added to each coordinate value. Especially, the same ID as that for a previous coordinate value is added to a coordinate value determined as having continuity. An unassigned ID is added to a newly detected coordinate value. If switch information and the like are available, these pieces of information are added, too.

The coordinate value having supplementary information is output to the external terminal in step S119. Then, the loop of data acquisition is repeated until power-off.

As described above, the presence/absence of the coordinate input operation by a pointer can easily be determined. When the coordinate input operation by one pointer is being performed, the position coordinates of the pointer can easily be derived by using, e.g., a light receiving unit which has the overall coordinate input effective region 3 as the effective visual field.

In coordinate calculation using the end information of light-shielded ranges according to the first embodiment, coordinate values can be calculated in an overlap state of a plurality of pointers. Hence, each sensor unit need not always have a plurality of light receiving units if the light receiving unit can implement coordinate calculation using the end information of light-shielded ranges, depending on the specifications of the system.

In the first embodiment, light is projected toward the retroreflecting member 4, and a light-shielded range where the reflected light is shielded is detected. However, the retroreflecting member is not indispensable. The present invention can also be applied even when a continuous light emitting unit is provided around the coordinate input region.

In the first embodiment, a line CCD is used as a light receiving element in a sensor unit. However, an area CCD sensor or CMOS sensor may be used. Especially, a CMOS sensor can read a specific part of an exposure area. Since no unnecessary area need be read, the read speed can be increased.

In the first embodiment, on the basis of the light-shielded range detected by one of the plurality of light receiving units in each sensor unit, the read start position of the data of the other light receiving unit is determined. When only the data in the limited range is transferred to the memory, the operation speed of the entire system can be increased.

The coordinate input effective region 3 of the coordinate input apparatus is formed from, e.g., a large-screen display device, and the coordinate values of pointers are displayed on the display screen. With this arrangement, an electronic whiteboard that allows simultaneous input by a plurality of persons can be implemented.

As described above, according to the first embodiment, even when a plurality of coordinate points are input simultaneously by a plurality of pointers, any detection error in the input transition state can be prevented, and the positions of the plurality of pointers can be detected at a high accuracy.

Second Embodiment

As described in the first embodiment, coordinate calculation can be executed by counting the number of light-shielded ranges for each sensor unit. On the other hand, as described in the "Background of the Invention", in the input transition state, the pointer detection state changes between the sensor units so the actual number of inputs may not match the number of light-shielded ranges.

In this case, a coordinate calculation error may occur, and a wrong coordinate value may be output.

Assume a transition state wherein one input is present, and another input is being executed. Assume that a sensor unit 1L detects only one shadow although a sensor unit 1R detects two light-shielded ranges. If truth determination is executed in this state simply on the basis of the number of detected light-shielded ranges, it is determined that the sensor unit 1L detects an eclipse state while the sensor unit 1R detects a separation state.

FIG. 26 shows an example of this state.

Referring to FIG. 26, points A and B are input. Assume that a light receiving unit R2 detects both light-shielded ranges, and the sensor unit 1L detects only the light-shielded range of the point A.

In this case, if coordinate calculation is executed simply on the basis of the end information of the light-shielded ranges, coordinates are calculated assuming an input in a range C shown in FIG. 26.

To avoid such a detection error, the validity of the calculated coordinate value is preferably determined.

The validity can be determined by, e.g., calculating the positions of the light-shielded ends on the basis of the calculated coordinate value, calculating the angles of the light-shielded ends with respect to the sensor unit, and comparing the angles with the actual angles with respect to the light-shielded ends.

Referring to FIG. 26, the coordinate value that can be calculated in the transition state corresponds to, e.g., a point C1 or C2 in the range C.

The point C1 is a calculation result obtained for a minimum angle L11 of the light-shielded range detected by a light receiving unit L1. The point C2 is a calculation result obtained for a maximum angle L22 for a light receiving unit L2.

The thickness of the pointer is calculated in correspondence with the calculated coordinate value. The thickness information, e.g., the radius information of the pointer can be calculated by multiplying L2 in FIG. 18 by tan θ2.

On the basis of the radius information and obtained coordinate value, the angle information with respect to the sensor unit is calculated. This will be described with reference to FIG. 27.

Figure 27:
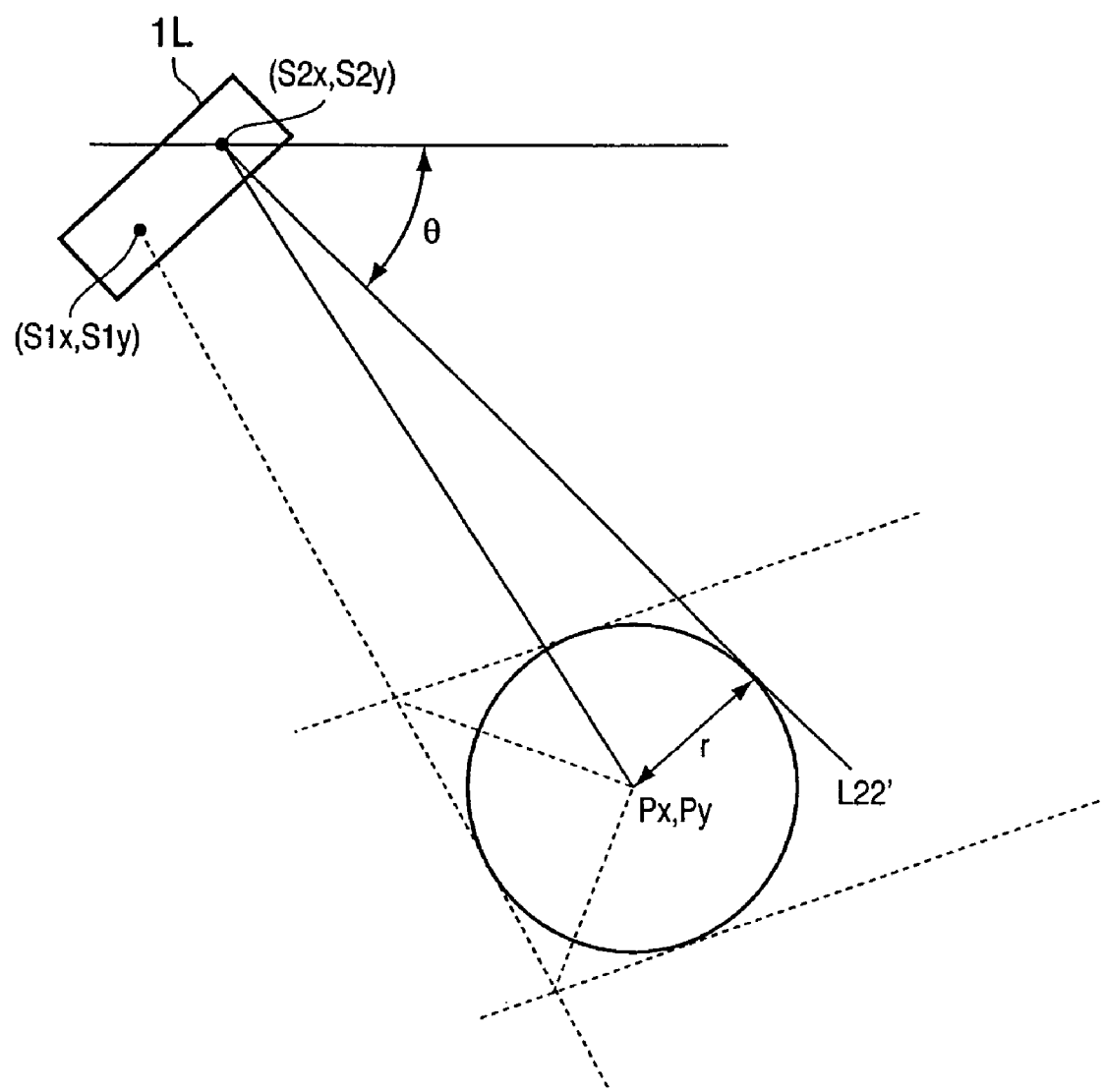
FIG. 27 is a view for explaining an example of an arrangement which recalculates the angle of end information on the basis of the coordinate value and the radius of a pointer according to the second embodiment of the present invention.

FIG. 27 is a view for explaining an example of an arrangement which recalculates (inversely calculates) the angle of end information on the basis of the coordinate value and radius information according to the second embodiment of the present invention.

The coordinates of light receiving points in the sensor unit 1L are (S1$x$,S1$y$) and (S2$x$,S2$y$). A coordinate value calculated from light-shielded end information indicated by dotted lines in FIG. 27.

As shown in FIG. 27, if a radius r of the pointer is known, an angle θ of the light-shielded end can newly be calculated (recalculated) as the angle of the tangent for the coordinates (S2$x$,S2$y$) on the basis of the radius r and the coordinate value calculated from the coordinates (S1$x$,S1$y$).

L22' in FIG. 26 indicates the tangent at the angle θ.

The angle information L22' is compared with the angle information L22 actually detected by the sensor unit 1L. If the input is actually detected, L22 almost matches L22'.

If a total eclipse state is erroneously calculated in the transition state, L22 does not match L22'.

When the recalculated angle information does not match the detected angle information, it is determined that the obtained coordinate value is erroneously calculated. By, e.g., inhibiting coordinate output, output of an invalid coordinate value and a decrease in accuracy can be prevented.

In the example described in FIG. 26, calculation is executed for the point C1. The same calculation can be done even for the point C2. Validity determination can be executed by executing calculation for either coordinates.

The validity determination can also be applied to the point A.

In this case, the tangent of the light-shielded end on the opposite side is calculated in correspondence with the coordinate value of the pointer calculated for, e.g., L11. It is determined whether the angle of the calculated tangent matches L22. In this case, however, the same state as the total eclipse state is detected when the angles match, and the state is determined as the transition state.

As described above, even a determination method other than the transition state determination method can be used as the eclipse state determination method.

<Determination of Continuity of Coordinate Values>

The coordinate value continuity determination of the first embodiment can be used to determine a transition state.

For example, in a transition state wherein inputs are continuously done, i.e., pen-up occurs, and pen-down occurs then in a short time, the second input is assumed to be done at a position not so far from the previous coordinate value. Hence, if a wrong coordinate value is calculated at a position spaced apart by a predetermined distance or more, the state may be determined as a transition state, and NG processing may be executed.

<Detection of Pen Signal>

In the first embodiment, when a pen having, e.g., a signal generation unit such as a switch is used as a pointer, detection in the transition state may be inhibited on the basis of pen-down information obtained from the pointer.

A detection error in the transition state often occurs because reaction in the depth direction of the coordinate input effective region changes in inserting the pointer in the coordinate input effective region.

If the pointer reaches the pen-down state, it can be determined as an almost light-shielded state. When coordinate output is permitted only in this state, errors in the transition state can be suppressed.

In this case, the arrangement may be configured to always output a calculation result in a single point input mode independently of the pen-down state and suppress output except the pen-down state only when one of the sensor units detects a plurality of inputs.

<Description of Coordinate Calculation Processing Flow>

Coordinate calculation processing according to the second embodiment will be described next. In the second embodiment, processing of determining the validity of a calculated coordinate value will particularly be explained.

Figure 28:
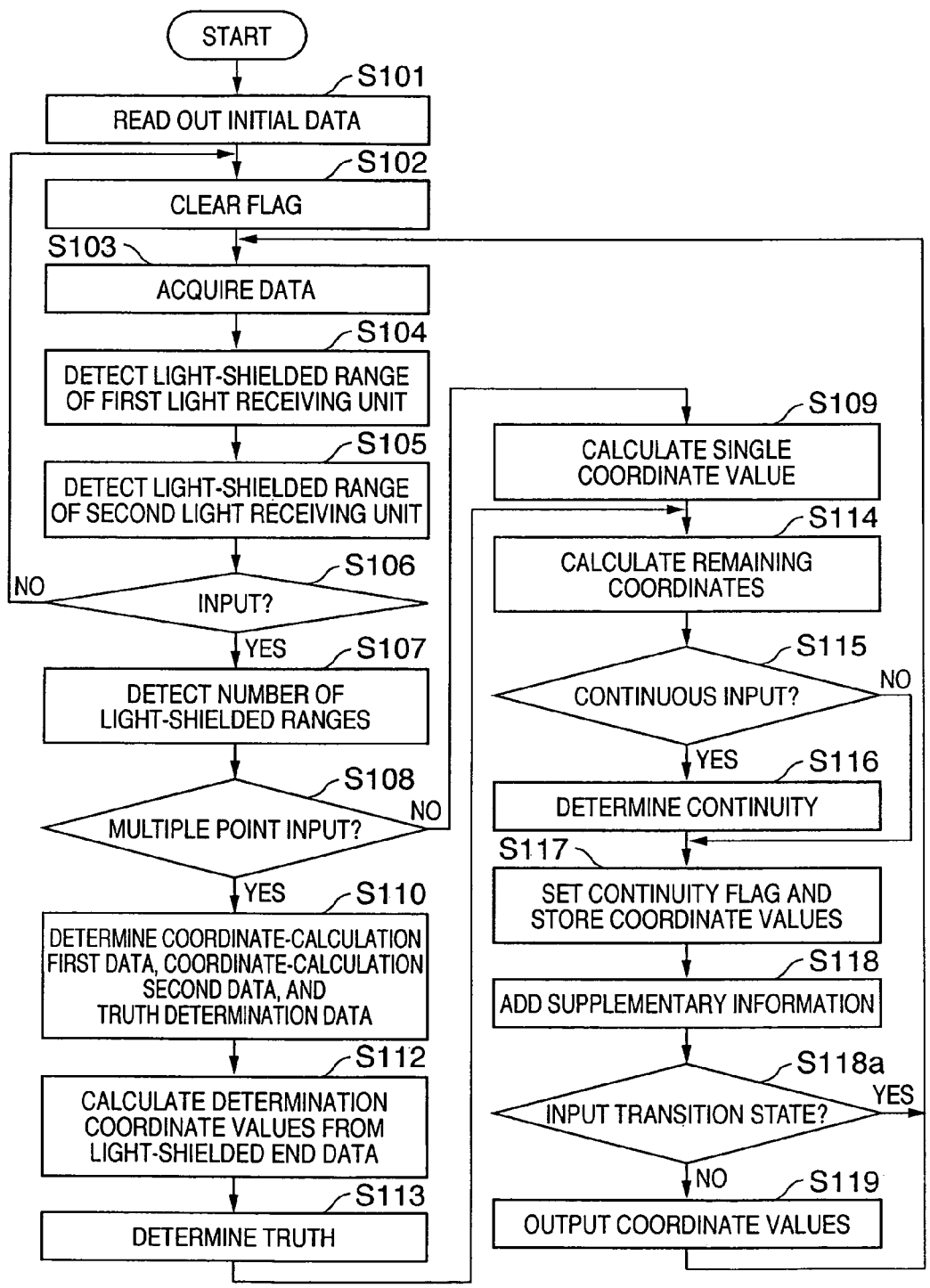
FIG. 28 is a flowchart showing coordinate calculation processing executed by a coordinate input apparatus according to the second embodiment of the present invention.

FIG. 28 is a flowchart showing coordinate calculation processing executed by the coordinate input apparatus according to the second embodiment of the present invention.

The same step numbers as in the flowchart of the first embodiment shown in FIG. 25 denote the same processes in the flowchart shown in FIG. 28, and a detailed description thereof will be omitted. Especially, in the second embodiment, processing in step S111 of the flowchart in FIG. 25 is omitted, and processing in step S118$a$ (input transition state determination (validity determination)) is executed after processing in step S118. That is, it is determined whether a calculated coordinate value is obtained in the input transition state (it is determined whether the coordinate value is valid).

In this determination method, as described above, the angle to a sensor unit is recalculated on the basis of a calculated coordinate value. The validity is determined by comparing angle information at an end of a light-shielded range detected by the sensor unit with angle information at an end of the light-shielded range derived from the thickness of the pointer. This determination will be described later in detail. Alternatively, output may be permitted only in the pen-down state on the basis of supplementary information (switch information) added in step S177.

If no validity is present (the input transition state is set) in step S118$a$ (YES in step S118$a$), the flow returns of step S103 to continue the loop of data acquisition until power-off. If validity is present (no input transition state is set) (NO in step S118$a$), the flow advances to step S119.

If a coordinate value having supplementary information is determined to be valid, the coordinate value is output to an external terminal in step S119. Then, the loop of data acquisition is repeated until power-off.

Details of the processing in step S118$a$ will be described next with reference to FIG. 29.

Figure 29:
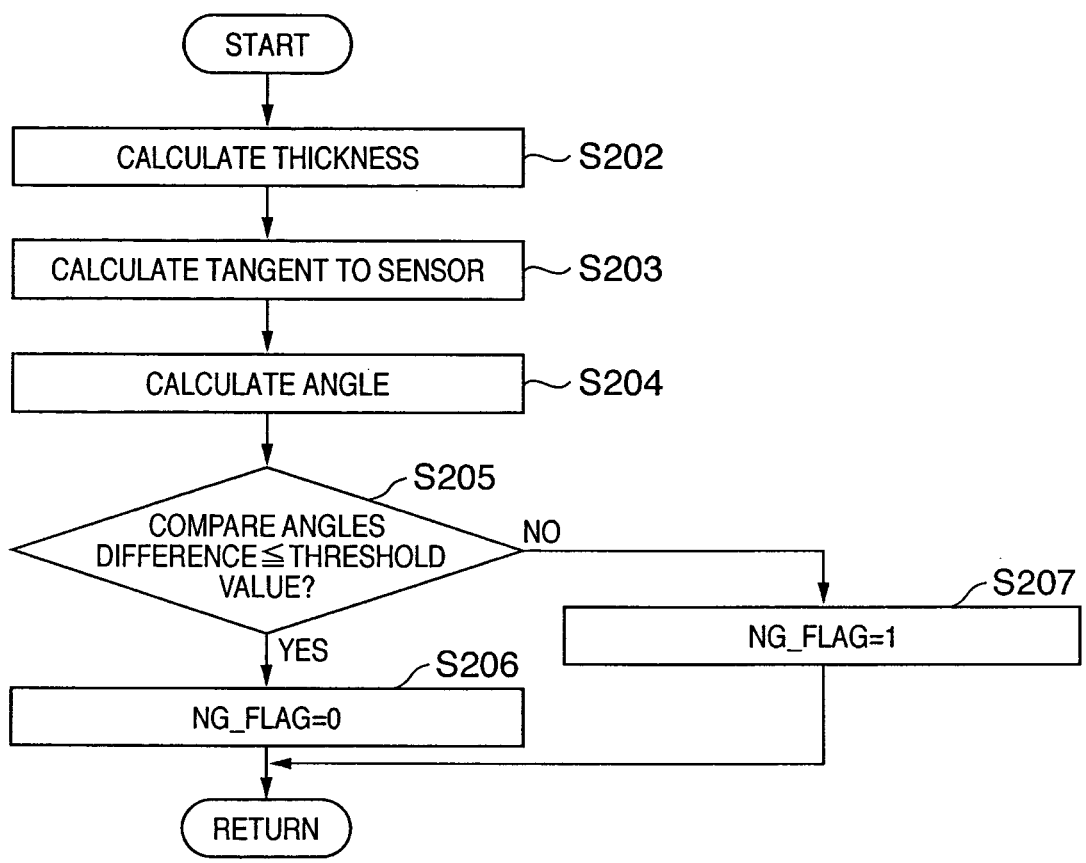
FIG. 29 is a flowchart showing details of processing in step S118a according to the second embodiment of the present invention.

FIG. 29 is a flowchart showing details of the processing in step S118$a$ according to the second embodiment of the present invention.

An example will be described with reference to FIG. 29 in which validity of a coordinate value is determined by recalculating the angle to a sensor unit on the basis of a calculated coordinate value and comparing angle information at an end of a light-shielded range detected by the sensor unit with angle information at an end of the light-shielded range derived from the thickness of the input pointer.

In step S202, the thickness (shape information) of the pointer at the coordinate position is calculated. For example, information stored in a memory 132 in advance is used. In step S203, the tangent to the pointer and the position coordinates of the sensor unit is calculated on the basis of the coordinate value and thickness information of the pointer, as described above. The tangent can be obtained by using, e.g., a tangent equation for a circle and a point outside the circle in normal graphic calculation.

In the second embodiment, the input pointer is assumed to have a circular shape in the axial direction. The size (diameter) of the circle is calculated as shape information. The axial-direction shape of the input pointer is not limited to a circle and can be a polygon such as a square or any other shape. If the polygon satisfies the specifications of the coordinate accuracy in the system, the size of the circumcircle of the shape is used as shape information.

In step S204, the angle at the sensor unit is calculated from the obtained tangent equation.

In step S205, the calculated angle is compared with angle information at an end of the actual light-shielded range detected by the sensor unit. It is determined whether the difference is equal to or less than a predetermined threshold value. If the difference is equal to or less than the predetermined threshold value (YES in step S205), the flow advances to step S206 to determine that the coordinate value is valid and set an NG flag (NG_FLG flag) representing the validity/invalidity to 0. If the difference is larger than the predetermined threshold value (NO in step S205), the flow advances to step S207 to determine that the coordinate value is not valid (the input transition state is present at a high probability) and set the NG_FLG flag to 1.

By executing this processing, invalid coordinate output in the input transition state can be inhibited.

The flowchart shown in FIG. 29 need not always be executed every time and may be executed only when a fear of the transition state is present.

For example, the processing may be executed only when it is determined by continuity determination in step S115 that coordinate values do not continue, and one sensor unit detects a plurality of light-shielded ranges while the other sensor unit detects one light-shielded range.

Figure 30:
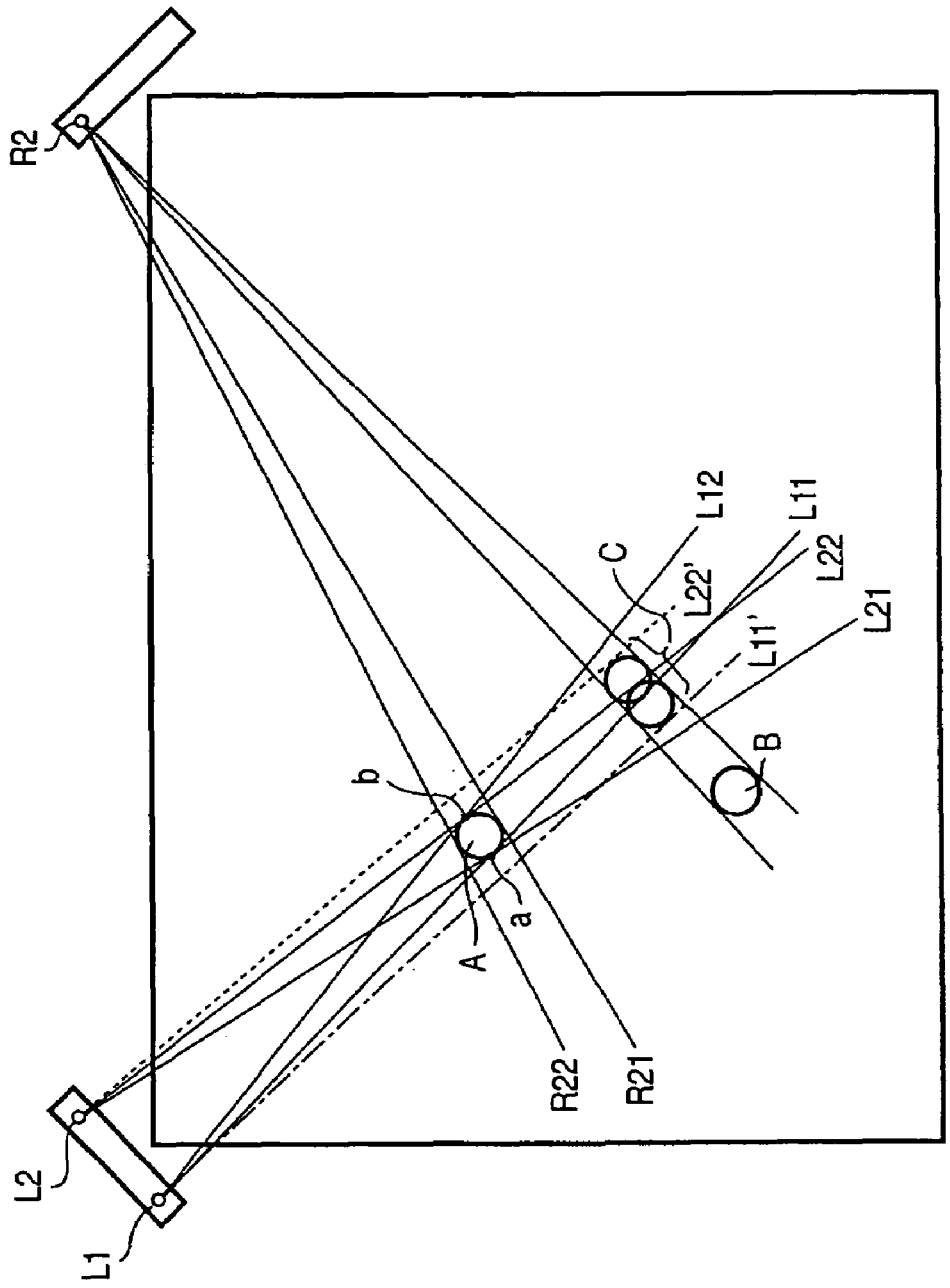
FIG. 30 is a view for explaining execution of validity determination according to the second embodiment of the present invention.

Alternatively, it is determined whether the coordinates of points a and b in FIG. 30 are included in the light-shielded range defined by R21 and R22. If the coordinates are present in the light-shielded range, the state is close to the total eclipse state. In this case, the processing in FIG. 29 may be executed because the state can be determined at a high probability as the transition state.

Figure 31:
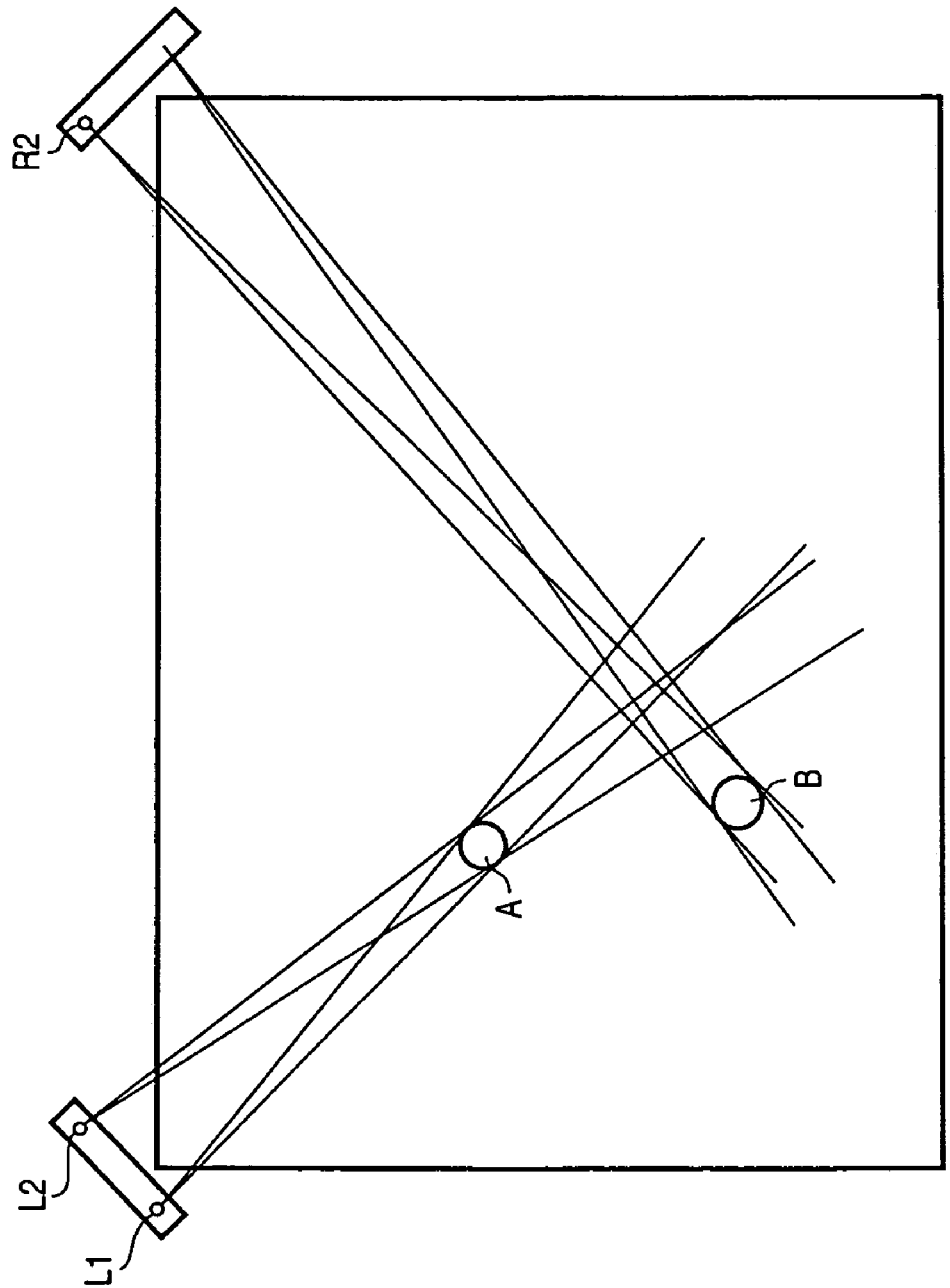
FIG. 31 is a view for explaining execution of validity determination according to the second embodiment of the present invention.
Figure 32:
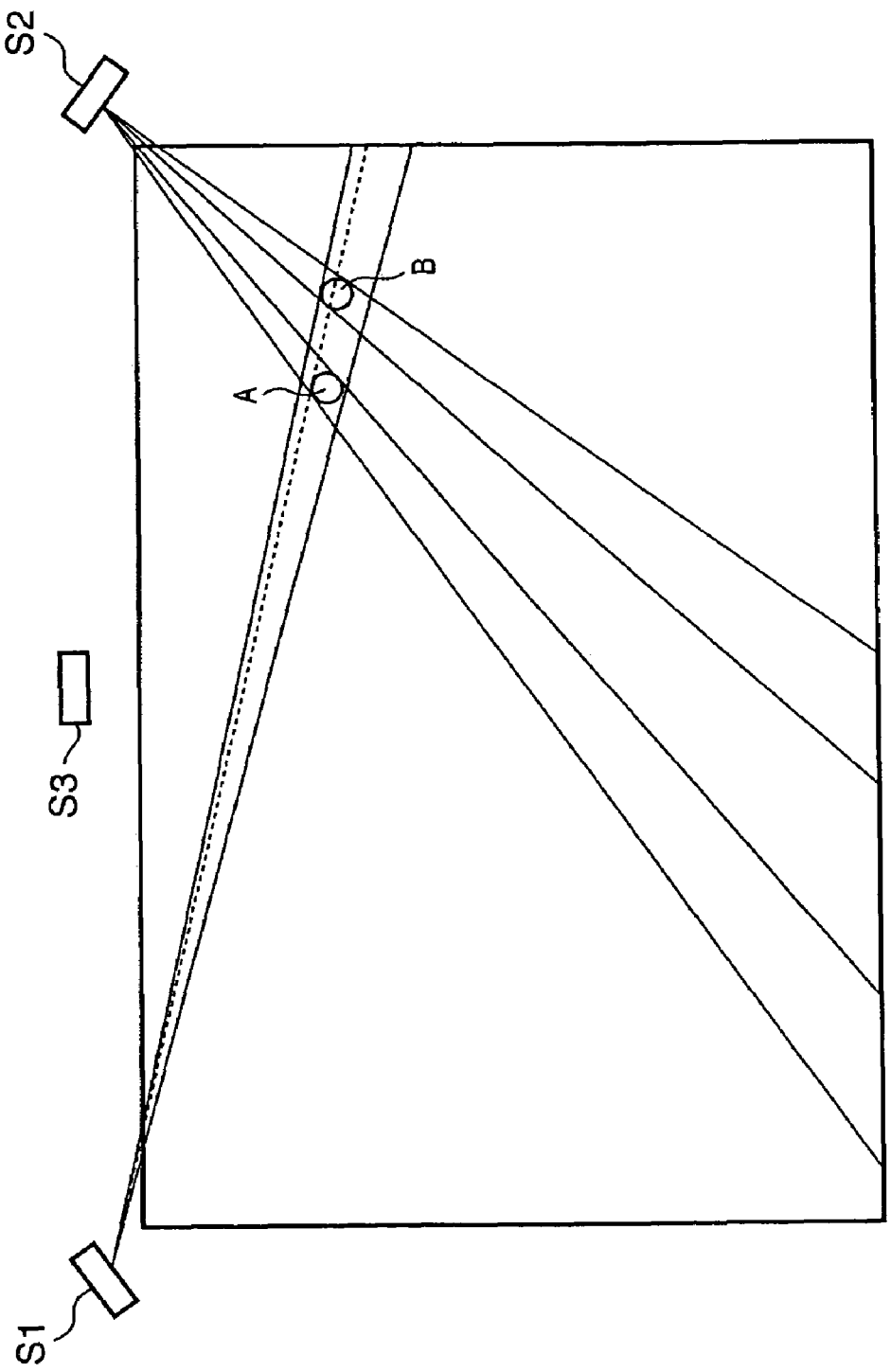
FIG. 32 is a view for explaining the relationship between sensor unit positions and light-shielded ranges in two-point input according to a prior art.
Figure 34:
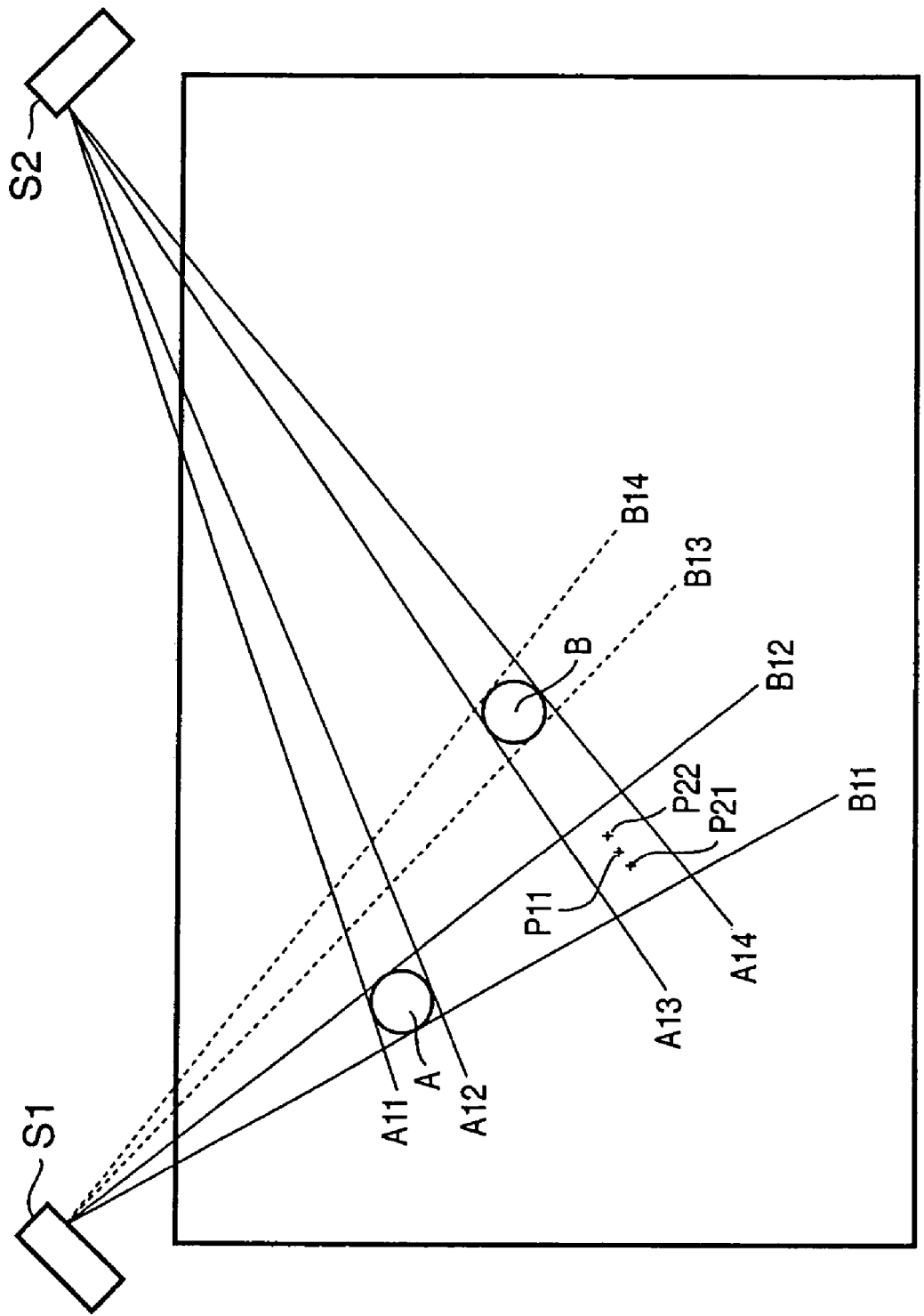
FIG. 34 is a view for explaining an example of an input transition state according to a prior art.

Alternatively, each sensor unit may detect a single light-shielded range, and the light-shielded ranges may indicate different points, as shown in FIG. 31. Hence, when the two sensor units detect a single point input in a "no input" state, the processing in FIG. 29 may be executed. Even in this case, determination can be done by the above-described comparison of calculated angles at light-shielded ends.

As described above, according to the second embodiment, even when a plurality of coordinate points are simultaneously input by a plurality of pointers, the validity of each temporarily calculated coordinate value is determined. On the basis of the determination result, whether the calculated coordinate value is resulted from the input transition state can be determined. Hence, any detection error in the input transition state can be prevented, and the positions of the plurality of pointers can be detected at a high accuracy.

The processing of the first embodiment shown in FIG. 25 and the processing of the second embodiment shown in FIG. 29 may be executed in combination. That is, the validity of a coordinate value may be determined in both step S111 in FIG. 25 and step S118a in FIG. 29.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

While the present invention has been described with reference to exemplary embodiments, It is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-118981, filed Apr. 15, 2005, which is hereby incorporated by reference herein in its entirety.

What is claimed is:

1. A coordinate input apparatus for detecting a plurality of point positions on a coordinate input region, comprising:
    a plurality of detection means for detecting pointing means on the coordinate input region;
    specifying means for specifying a range where a detection signal from each of said plurality of detection means is changed; and
    determination means for determining whether an input transition state exists when a first detection means of the plurality of detection means has detected two ranges and a second detection means of the plurality of detection means has detected one range.

2. The apparatus according to claim 1, wherein said determination means determines whether an input transition state exists, on a basis of a plurality of coordinates calculated by using end information of one of the two ranges and end information of the one range.

3. The apparatus according to claim 1, wherein said determination means determines whether an input transition state exists, on a basis of four intersection coordinates intersecting two tangents each of which connects a position corresponding to each of two ends of one of the two ranges to said first detection means with two tangents each of which connects a position corresponding to each of two ends of the one range to said second detection means.

4. A coordinate input apparatus for detecting a plurality of point positions on a coordinate input region, comprising:
    a plurality of detection means for detecting pointing means on the coordinate input region;
    specifying means for specifying a range where a detection signal from each of said plurality of detection means is changed; and
    determination means for determining whether an input transition state exists when one of said plurality of detection means has detected the range, on a basis of whether or not a width of the range corresponds to a predetermined value.

5. The apparatus according to claim 4, further comprising control means for controlling, on a basis of a determination result of said determination means, output of coordinates calculated on basis of the range where a detection signal from each of said plurality of detection means is changed.

6. The apparatus according to claim 4, wherein said determination means determines whether an input transition state exists, on a basis of an angle with respect to said one of said plurality of detection means and two ends of the range where a detection signal from each of said plurality of detection means is changed.

7. A control method of a coordinate input apparatus which includes a plurality of detection units to detect pointing means on a coordinate input region and to detect a point position on the coordinate input region, comprising:
    a specifying step of specifying a range where a detection signal from each of said plurality of detection units is changed; and
    a determination step of determining whether an input transition state exists when a first detection unit of the plurality of detection units has detected two ranges and a second detection unit of the plurality of detection units has detected one range.

8. A control method of a coordinate input apparatus which includes a plurality of detection units to detect pointing means on a coordinate input region and to detect a point position on the coordinate input region, comprising:
    a specifying step of specifying a range where a detection signal from each of said plurality of detection units is changed; and
    a determination step of determining whether an input transition state exists when one of said plurality of detection means has detected the range, on a basis of whether or not a width of the range corresponds to a predetermined value.

9. A computer-readable medium on which is stored a program which implements control of a coordinate input apparatus which includes a plurality of detection units to detect pointing means on a coordinate input region and to detect a point position on the coordinate input region, comprising:
    a program code for a specifying step of specifying a range where a detection signal from each of said plurality of detection units is changed; and
    a program code for a determination step of determining whether an input transition state exists when a first detection unit of the plurality of detection units has detected two ranges and a second detection unit of the plurality of detection units has detected one range.

10. A computer-readable medium on which is stored a program which implements control of a coordinate input apparatus which includes a plurality of detection units to detect pointing means on a coordinate input region and to detect a point position on the coordinate input region, comprising:
    a program code for a specifying step of specifying a range where a detection signal from each of said plurality of detection units is changed; and
    a program code for a determination step of determining whether an input transition state exists when one of said plurality of detection means has detected the range, on a basis of whether or not a width of the range corresponds to a predetermined value.

11. The apparatus according to claim 1, further comprising control means for controlling, on a basis of a determination result of said determination means, output of coordinates calculated on basis of the range where a detection signal from each of said plurality of detection means is changed.

12. The apparatus according to claim 4, wherein said determination means comprises calculation means for calculating coordinates of a point position of the pointing means on a basis of end information of the range detected by the one of said plurality of detection means and end information of a range detected by an other of said plurality of detection means; and
    wherein said determination means determines, when the pointing means points the coordinates calculated by said calculation means, whether the range specified by said specifying means is changed or not.

13. The method according to claim 7, further comprising a control step for controlling, on a basis of a determination result in said determination step, output of coordinates calculated on a basis of the range where a detection signal from each of said plurality of detection units is changed.

14. The method according to claim 8, further comprising a control step for controlling, on a basis of a determination result in said determination step, output of coordinates calculated on a basis of the range where a detection signal from each of said plurality of detection units is changed.

15. The computer-readable medium according to claim 9, further comprising a control step for controlling, on a basis of a determination result in said determination step, output of coordinates calculated on a basis of the range where a detection signal from each of said plurality of detection units is changed.

16. The computer-readable medium according to claim 10, further comprising a control step for controlling, on a basis of a determination result in said determination step, output of coordinates calculated on a basis of the range where a detection signal from each of said plurality of detection units is changed.

* * * * *